(12) United States Patent
Wei et al.

(10) Patent No.: US 12,539,304 B2
(45) Date of Patent: Feb. 3, 2026

(54) COMBINATION OF AN ANAPLASTIC LYMPHOMA KINASE INHIBITOR AND A CYCLIN DEPENDENT KINASE INHIBITOR

(71) Applicant: Pfizer Inc., New York, NY (US)

(72) Inventors: Ping Wei, San Diego, CA (US); Scott Lawrence Weinrich, San Diego, CA (US)

(73) Assignee: Pfizer Inc., New York, NY (US)

( * ) Notice: Subject to any disclaimer, the term of this patent is extended or adjusted under 35 U.S.C. 154(b) by 761 days.

(21) Appl. No.: 17/905,532

(22) PCT Filed: Mar. 2, 2021

(86) PCT No.: PCT/IB2021/051729
§ 371 (c)(1),
(2) Date: Sep. 2, 2022

(87) PCT Pub. No.: WO2021/176349
PCT Pub. Date: Sep. 10, 2021

(65) Prior Publication Data
US 2023/0117684 A1    Apr. 20, 2023

Related U.S. Application Data

(60) Provisional application No. 63/140,430, filed on Jan. 22, 2021, provisional application No. 62/985,443, filed on Mar. 5, 2020.

(51) Int. Cl.
*A61K 31/519* (2006.01)
*A61K 31/439* (2006.01)
*A61P 35/00* (2006.01)

(52) U.S. Cl.
CPC .......... *A61K 31/519* (2013.01); *A61K 31/439* (2013.01); *A61P 35/00* (2018.01)

(58) Field of Classification Search
CPC ............. A61K 2300/00; A61K 31/439; A61K 31/519; A61P 35/00
See application file for complete search history.

(56) References Cited

U.S. PATENT DOCUMENTS

2018/0044344 A1* 2/2018 Behenna .............. C07D 471/04

FOREIGN PATENT DOCUMENTS

WO    2015/031666 A1    3/2015
WO    2019/199883 A1    10/2019

OTHER PUBLICATIONS

Dhillon, "Palbociclib: First Global Approval", Drugs (Year: 2015).*
Solomon et. al., "Lorlatinib in patients with ALK-positive non-small-cell lung cancer: results from a global phase 2 study", The Lancet Oncology (Year: 2018).*
Cecil Textbook of Medicine, 20th Ed, vol. 1 (Year: 1997).*
Wu et. al., Small-molecule inhibitors, immune checkpoint inhibitors, and more: FDA-approved novel therapeutic drugs for solid tumors from 1991 to 2021; Journal of Hematology & Oncology, 15, 143 (Year: 2022).*
Wood, Andrew C., et al., "Dual ALK and CDK4/6 Inhibition Demonstrates Synergy against Neuroblastoma", Clinical Cancer Research, 2017, 23(11), 2856-2868.
Wood, Andrew C., et al., "Abstract 1000: Combination CDK4/6 and ALK inhibition demonstrates on-target synergy against neuroblastoma", Cancer Research—Proceedings AACR Annual Meeting 2014, San Diego, CA, 4 pages.
Moore, Nathan F., et al., "Abstract 2195: A high-throughput chemical screen identifies synergistic activity between crizotinib and transcriptional CDK inhibitors in ALK-mutated neuroblastoma", Cancer Research, 2015, 75(15), 2195.
International Search Report of the International Searching Authority, PCT/IB2021/051729.
Written Opinion of the International Searching Authority, PCT/IB2021/051729.

* cited by examiner

*Primary Examiner* — Jeffrey H Murray
*Assistant Examiner* — Daniel John Burkett
(74) *Attorney, Agent, or Firm* — Carmen K. Robinson

(57) ABSTRACT

This invention relates to combination therapies comprising an inhibitor of anaplastic lymphoma kinase (ALK) and, an inhibitor of cyclin dependent kinase 4 and 6 (CDK4/6 inhibitor) or an inhibitor of cyclin dependent kinase 2, 4 and 6 (CDK2/4/6 inhibitor), and associated methods of treatment, combinations, pharmaceutical compositions and uses thereof.

9 Claims, 19 Drawing Sheets

H3122 LorlaR pool

H3122 LorlaR pool

H3122 CrizoR 1-07 (G1269A)

H3122 CrizoR 1-07 (G1269A)

H3122 AlecR pool

H3122 AlecR pool

| | Crizotinib | Ceritinib | Alectinib | Lorlatinib |
|---|---|---|---|---|
| IC50 | 2373 | 16708 | 6845 | 72.29 |

CyQ 6d: MGH048-4F

CyQ 7d: MGH902-1C
p5 3000 cells/well

CyQ 7d: MGH979-6.7R8
p10 3000 cells/well

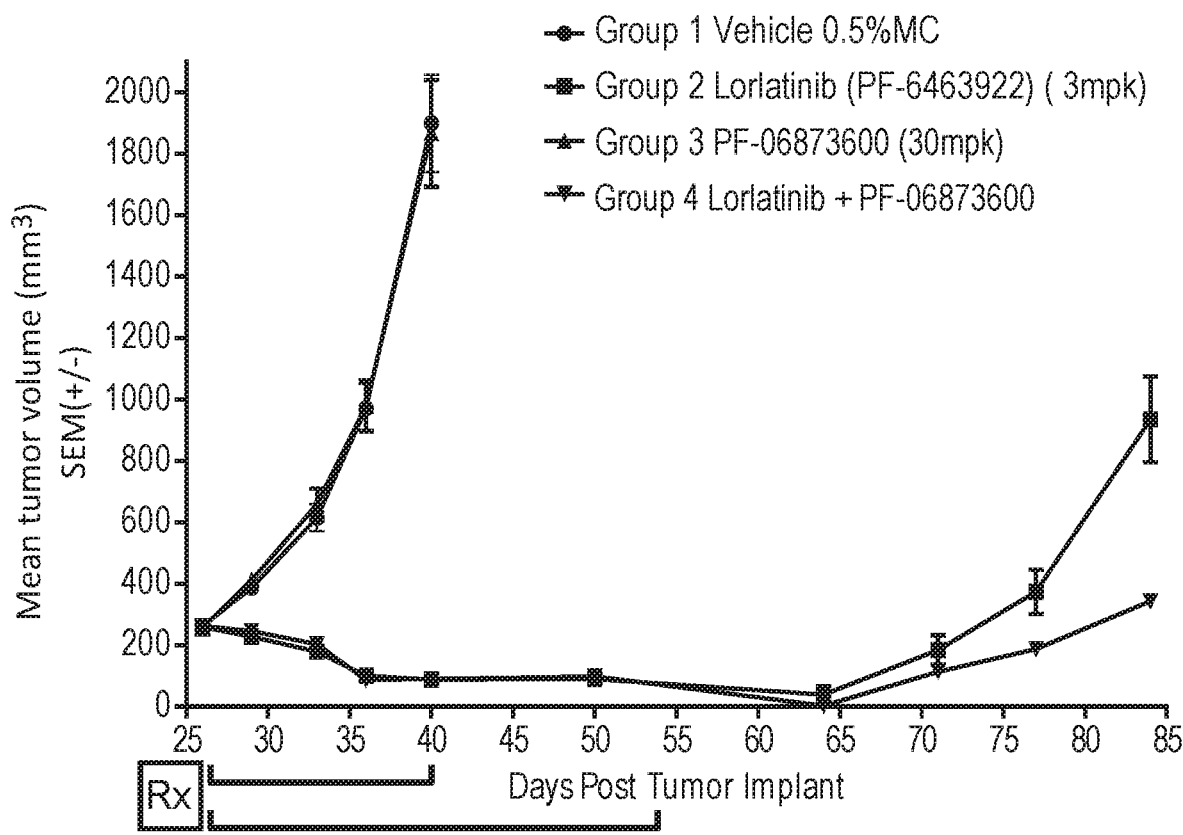

COMBINATION OF AN ANAPLASTIC LYMPHOMA KINASE INHIBITOR AND A CYCLIN DEPENDENT KINASE INHIBITOR

CROSS-REFERENCE TO RELATED APPLICATIONS

This Application is the national stage filing under 35 U.S.C. 371 of Patent Cooperation Treaty Patent Application No. PCT/IB2021/051729, filed Mar. 2, 2021 which claims the benefit of priority from U.S. Provisional Application No. 62/985,443 filed Mar. 5, 2020, and U.S. Provisional Application No. 63/140,430 filed Jan. 22, 2021, the contents of each of which are hereby incorporated by reference in their entirety.

FIELD OF THE INVENTION

The present invention relates to combination therapies useful for the treatment of cancer. In particular, the invention relates to combination therapies comprising an inhibitor of anaplastic lymphoma kinase (ALK inhibitor) and an inhibitor of cyclin dependent kinase 4 and 6 (CDK4/6 inhibitor) or an inhibitor of cyclin dependent kinase 2, 4 and 6 (CDK2/4/6 inhibitor). The invention also relates to associated methods of treatment, pharmaceutical compositions, combinations, and uses of such a combination in treatment of cancer.

BACKGROUND

Human cancers comprise a diverse array of diseases that collectively are one of the leading causes of death in developed countries throughout the world (American Cancer Society, Cancer Facts and Figures 2005. Atlanta: American Cancer Society; 2005). The progression of cancers is caused by a complex series of multiple genetic and molecular events including gene mutations, chromosomal translocations, and karyotypic abnormalities (Hanahan & Weinberg, The hallmarks of cancer. Cell 2000; 100: 57-70). Although the underlying genetic causes of cancer are both diverse and complex, each cancer type has been observed to exhibit common traits and acquired capabilities that facilitate its progression. These acquired capabilities include dysregulated cell growth, sustained ability to recruit blood vessels (i.e., angiogenesis), and ability of tumor cells to spread locally as well as metastasize to secondary organ sites (Hanahan & Weinberg 2000). Due to the severity and breadth of cancer diseases, there is a significant unmet need for new combination of therapeutic agents, and methods of use thereof, that inhibit molecular targets that are altered during cancer progression or target multiple processes that are common to cancer progression in a variety of tumors.

Receptor tyrosine kinases (RTKs) play fundamental roles in cellular processes, including cell proliferation, migration, metabolism, differentiation, and survival. RTK activity is tightly controlled in normal cells. The constitutively enhanced RTK activities from point mutation, amplification, and rearrangement of the corresponding genes have been implicated in the development and progression of many types of cancer (Gschwind et. al., The discovery of receptor tyrosine kinases: targets for cancer therapy. Nat. Rev. Cancer 2004; 4, 361-370; Krause & Van Etten, Tyrosine kinases as targets for cancer therapy. N. Engl. J. Med. 2005; 353: 172-187).

Anaplastic lymphoma kinase (ALK) is a receptor tyrosine kinase, grouped together with leukocyte tyrosine kinase (LTK) to a subfamily within the insulin receptor (IR) superfamily. ALK was first discovered as a fusion protein with nucleophosmin (NPM) in anaplastic large cell lymphoma (ALCL) cell lines in 1994. (Morris et. al., Fusion of a kinase gene, ALK, to a nucleolar protein gene, NPM, in non-Hodgkin's lymphoma. Science 1994; 263:1281-1284.) NPM-ALK, which results from a chromosomal translocation, is implicated in the pathogenesis of human anaplastic large cell lymphoma (ALCL) (Pulford et. al., Anaplastic lymphoma kinase proteins in growth control and cancer. J. Cell Physiol., 2004; 199: 330-58). The roles of aberrant expression of constitutively active ALK chimeric proteins in the pathogenesis of ALCL have been defined (Wan et. al., Anaplastic lymphoma kinase activity is essential for the proliferation and survival of anaplastic large cell lymphoma cells. Blood, 2006; 107:1617-1623). Other chromosomal rearrangements resulting in ALK fusions have been subsequently detected in ALCL (50-60%), inflammatory myofibroblastic tumors (27%), and non-small-cell lung cancer (NSCLC) (2-7%) (Palmer et. al., Anaplastic lymphoma kinase: signaling in development and disease. Biochem. J. 2009; 420:345-361).

The EML4-ALK fusion gene, comprising portions of the echinoderm microtubule associated protein-like 4 (EML4) gene and the ALK gene, was first discovered in NSCLC archived clinical specimens and cell lines (Soda et. al., Identification of the transforming EML4-ALK fusion gene in non-small cell lung cancer. Nature 2007; 448:561-566; Rikova et. al., Global survey of phosphotyrosine signaling identifies oncogenic kinases in lung cancer. Cell 2007; 131:1190-1203). EML4-ALK fusion variants were demonstrated to transform NIH-3T3 fibroblasts and cause lung adenocarcinoma when expressed in transgenic mice, confirming the potent oncogenic activity of the EML4-ALK fusion kinase (Soda et. al., A mouse model for EML4-ALK-positive lung cancer. Proc. Natl. Acad. Sci. U.S.A. 2008; 105:19893-19897). Oncogenic mutations of ALK in both familial and sporadic cases of neuroblastoma have also been reported (Caren et. al., High incidence of DNA mutations and gene amplifications of the ALK gene in advanced sporadic neuroblastoma tumors. Biochem. J. 2008; 416:153-159).

ROS1 is a proto-oncogene receptor tyrosine kinase that belongs to the insulin receptor subfamily and is involved in cell proliferation and differentiation processes (Nagarajan et. al., The human c-ros gene (ROS) is located at chromosome region 6q16-6q22. Proc Natl Acad Sci 1986; 83:6568-6572). ROS1 is expressed, in humans, in epithelial cells of a variety of different tissues. Defects in ROS1 expression and/or activation have been found in glioblastoma, as well as tumors of the central nervous system (Charest et. al., Fusion of FIG to the receptor tyrosine kinase ROS in a glioblastoma with an interstitial del (6) (q21q21). Genes Chromos. Can. 2003; 37(1): 58-71). Genetic alterations involving ROS1 that result in aberrant fusion proteins of ROS1 kinase have been described, including the FIG-ROS1 deletion translocation in glioblastoma (Charest et. al., 2003); Birchmeier et. al., Expression and rearrangement of the ROS1 gene in human glioblastoma cells. Proc Natl Acad Sci 1987; 84:9270-9274; and NSCLC (Rimkunas et. al., Analysis of Receptor Tyrosine Kinase ROS1-Positive Tumors in Non-Small Cell Lung Cancer: Identification of FIG-ROS1 Fusion, Clin Cancer Res 2012; 18:4449-4457), the SLC34A2-ROS1 translocation in NSCLC (Rikova et. al., 2007), the CD74-ROS1 translocation in NSCLC (Rikova et. al., 2007) and cholangiocarcinoma (Gu et. al., PLoS ONE 2011; 6(1): e15640), and a truncated, active form of ROS1 known to drive tumor growth in mice (Birchmeier et. al., Characterization of an Activated Human ros Gene, Mol. Cell. Bio. 1986; 6(9):3109-3115). Additional fusions, including TPM3-ROS1, SDC4-ROS1, EZR-ROS1 and LRIG3-ROS1, have been reported in lung cancer patient tumor samples (Takeuchi et. al., RET, ROS1 and ALK fusions in lung cancer, Nature Medicine 2012; 18(3):378-381).

The ALK/ROS1/c-MET inhibitor, crizotinib, was approved in 2011 for the treatment of patients with locally advanced or metastatic NSCLC that is ALK-positive as detected by an FDA-approved test. Crizotinib has also shown efficacy in treatment of NSCLC with ROS1 translocations (Shaw et. al., Clinical activity of crizotinib in advanced non-small cell lung cancer (NSCLC) harboring ROS1 gene rearrangement. Presented at the Annual Meeting of the American Society of Clinical Oncology, Chicago, Jun. 1-5, 2012). As observed clinically for other tyrosine kinase inhibitors, mutations in ALK and ROS1 that confer resistance to ALK inhibitors have been described (Choi et. al., EML4-ALK Mutations in Lung Cancer than Confer Resistance to ALK Inhibitors, N Engl J Med 2010; 363:1734-1739; Awad et. al., Acquired Resistance to Crizotinib from a Mutation in CD74-ROS1, N Engl J Med 2013; 368:2395-2401).

The compound (10R)-7-amino-12-fluoro2,10,16-trimethyl-15-oxo-10,15,16,17-tetrahydro-2H-4,8-methenopyrazolo[4,3-h] (also referred to as "lorlatinib", "lorla" or "PF-06463922") is a reversible, ATP-competitive small molecule inhibitor of ALK and c-ros oncogene 1 (ROS1), represented by the formula (I):

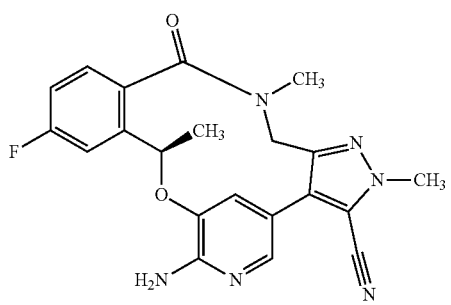

(I)

Lorlatinib is described in WHO Drug Information, Vol. 29, No. 4, page 541 (2015). Lorlatinib is a potent, macrocyclic inhibitor of both wild type and resistance mutant forms of anaplastic lymphoma kinase (ALK) and c-ros oncogene 1 (ROS1) receptor tyrosine kinase. Lorlatinib can inhibit tumor cell growth in ALK- and ROS1-overexpressing tumor cells. Lorlatinib (Lorbrena®; Pfizer) has been approved by the US Food and Drug Administration (FDA) on Nov. 2, 2018, for the treatment of patients with ALK-positive metastatic non-small cell lung cancer (NSCLC) following progression on 1 or more prior ALK-targeted ALK tyrosine-kinase inhibitor (TKI).

Lorlatinib could also pass through the blood-brain barrier, which had a good effect on patients with brain metastasis. Preparation of the free base of lorlatinib as an amorphous solid is disclosed in International Patent Publication No. WO 2013/132376 and in U.S. Pat. No. 8,680,111. The crystalline free base form of lorlatinib is disclosed in International Patent Publication No. WO 2017/021823. Preparation of hydrate and acetic acid solvate forms of lorlatinib is disclosed in International Patent Publication No. WO 2014/207606. The contents of each of the foregoing documents are incorporated herein by reference in their entirety.

Cyclin-dependent kinases (CDKs) and related serine/threonine protein kinases are important cellular enzymes that perform essential functions in regulating cell division and proliferation. CDKs 1-4, 6, 10, 11 have been reported to play a direct role in cell cycle progression, while CDKs 3, 5 and 7-9 may play an indirect role (e.g., through activation of other CDKs, regulation of transcription or neuronal functions). The CDK catalytic units are activated by binding to regulatory subunits, known as cyclins, followed by phosphorylation. Cyclins can be divided into four general classes (G1, G1/S, S and M cyclins) whose expression levels vary at different points in the cell cycle. Cyclin B/CDK1, cyclin A/CDK2, cyclin E/CDK2, cyclin D/CDK4, cyclin D/CDK6, and likely other heterodimers are important regulators of cell cycle progression.

CDK inhibitors have been demonstrated to be useful in treating cancer. Increased activity or temporally abnormal activation of cyclin-dependent kinases has been shown to result in the development of human tumors, and human tumor development is commonly associated with alterations in either the CDK proteins themselves or their regulators (Cordon-Cardo C. Mutations of cell cycle regulators: biological and clinical implications for human neoplasia. Am. J. Pathol. (1995) 147:545-560; Karp J E, Broder S. Molecular foundations of cancer: new targets for intervention. Nat. Med. (1995) 1:309-320; Hall M, Peters G. Genetic alterations of cyclins, cyclin-dependent kinases, and Cdk inhibitors in human cancer. Adv. Cancer Res. (1996) 68:67-108).

Clinical trials for the CDK4/6 inhibitors palbociclib, ribociclib and abemaciclib are ongoing for breast and other cancers, as single agents or in combination with other therapeutics. Palbociclib, ribociclib and abemaciclib have been approved for treatment of hormone receptor (HR)-positive, human epidermal growth factor receptor 2 (HER2)-negative advanced or metastatic breast cancer in combination with aromatase inhibitors, such as letrozole, in a first line setting and with fulvestrant in second or later lines of therapy in certain patients (O'Leary et. al., Treating cancer with selective CDK4/6 inhibitors Nature Reviews (2016) 13:417-430). While CDK4/6 inhibitors have shown significant clinical efficacy in ER-positive metastatic breast cancer, as with other kinases their effects may be limited over time by the development of primary or acquired resistance.

The compound 6-acetyl-8-cyclopentyl-5-methyl-2-(5-piperazin-1-yl-pyridin-2-ylamino)-8H-pyrido[2,3-d]pyrimidin-7-one (also referred to as "palbociclib", "palbo" or "PD-0332991") is a potent and selective inhibitor of CDK4 and CDK6, represented by the formula (II):

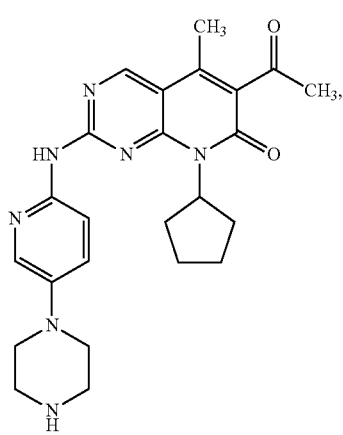

Palbociclib is described in WHO Drug Information, Vol. 27, No. 2, page 172 (2013). Palbociclib and pharmaceutically acceptable salts thereof are disclosed in International Publication No. WO 2003/062236 and U.S. Pat. Nos. 6,936,612, 7,208,489 and 7,456,168; International Publication No. WO 2005/005426 and U.S. Pat. Nos. 7,345,171 and 7,863,278; International Publication No. WO 2008/032157 and U.S. Pat. No. 7,781,583; and International Publication No. WO 2014/128588. The contents of each of the foregoing references are incorporated herein by reference in their entirety.

The compound 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (also referred to as "PF-06873600" or "PF3600"), is a potent and selective inhibitor of CDK2, CDK4 and CDK6, represented by the formula (III):

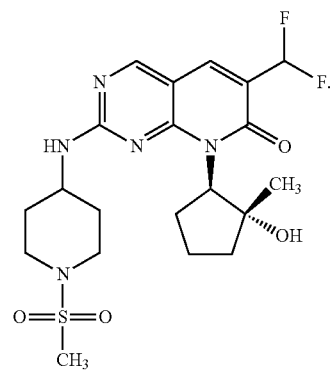

PF-06873600 is disclosed in International Publication No. WO 2018/033815 published Feb. 22, 2018. The content of this reference is incorporated herein by reference in its entirety.

In spite of numerous treatment options for cancer patients, there remains a need for effective and safe therapeutic agents and a need for their use in combination therapy for treatment of cancer. The methods, combinations, pharmaceutical compositions and uses of the present invention are believed to have one or more advantages, such as greater efficacy than treatment with either agent alone; potential to reduce drug-drug interactions; potential to enable an improved dosing schedule; potential to reduce side effects; potential to overcome resistance mechanisms and the like. These, and other advantages of the present invention, are apparent from the description below.

SUMMARY OF THE INVENTION

This invention relates to methods, combinations, pharmaceutical compositions and uses for treating cancer in a subject in need thereof.

In one aspect, the invention provides a method of treating cancer in a subject comprising administering to the subject an amount of an anaplastic lymphoma kinase (ALK) inhibitor and an amount a cyclin dependent kinase (CDK) inhibitor, wherein the CDK inhibitor is an inhibitor of CDK4 and CDK6 (CDK4/6 inhibitor) or an inhibitor of CDK2, CDK4 and CDK6 (CDK2/4/6 inhibitor), and wherein the amounts together are effective in treating cancer.

In one embodiment, the ALK inhibitor is selected from the group consisting of lorlatinib, crizotinib, ceritinib, alectinib, brigatinib, belizatinib, ensartinib, entrectinib, CEP-37440, and NVP-TAE684, or a pharmaceutically acceptable salt thereof. In some such embodiments, the ALK inhibitor is lorlatinib, or a pharmaceutically acceptable salt thereof.

In certain embodiments, the CDK inhibitor is a CDK4/6 inhibitor. In some such embodiments, the CDK4/6 inhibitor is palbociclib, or a pharmaceutically acceptable salt thereof.

In certain embodiments, the CDK inhibitor is a CDK2/4/6 inhibitor. In some such embodiments, the CDK2/4/6 inhibitor is 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof.

In one embodiment, the cancer is lung cancer. In one such embodiment, the lung cancer is non-small cell lung cancer (NSCLC).

In one embodiment, the cancer is advanced cancer. In another embodiment, the cancer is metastatic cancer.

In one embodiment, the ALK inhibitor and the CDK inhibitor are administered sequentially.

In another embodiment, the ALK inhibitor and the CDK inhibitor are administered simultaneously.

In yet another embodiment, the ALK inhibitor and the CDK inhibitor are administered concurrently.

In additional embodiments, the method of the invention further comprises administering one or more additional anti-cancer agents.

In one aspect, the invention provides a method of treating cancer in a subject comprising administering to the subject an amount of lorlatinib, or a pharmaceutically acceptable salt thereof, and an amount of palbociclib, or a pharmaceutically acceptable salt thereof, wherein the amounts together are effective in treating cancer.

In one aspect, the invention provides a method of treating cancer in a subject comprising administering to the subject an amount of lorlatinib, or a pharmaceutically acceptable salt thereof, and an amount of 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof, wherein the amounts together are effective in treating cancer.

In one aspect, the invention provides a combination comprising, separately or together, an ALK inhibitor and a CDK inhibitor, wherein the CDK inhibitor is a CDK4/6 inhibitor or a CDK2/4/6 inhibitor. In some such embodiments, the ALK inhibitor is selected from the group consisting of lorlatinib, crizotinib, ceritinib, alectinib, brigatinib, belizatinib, ensartinib, entrectinib, CEP-37440, and NVP-TAE684, or a pharmaceutically acceptable salt thereof. In a preferred embodiment, the ALK inhibitor is lorlatinib, or a pharmaceutically acceptable salt thereof. In a specific embodiment, wherein the CDK inhibitor is a CDK4/6 inhibitor, and wherein the CDK 4/6 inhibitor is palbociclib, or a pharmaceutically acceptable salt thereof. In a further embodiment, wherein the CDK inhibitor is a CDK2/4/6 inhibitor, and wherein the CDK 2/4/6 inhibitor is 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one, or a pharmaceutically acceptable salt thereof.

In a preferred embodiment, the combinations of the present invention comprise lorlatinib, or a pharmaceutically acceptable salt thereof and palbociclib, or a pharmaceutically acceptable salt thereof. In another preferred embodiment, the combinations of the present invention comprise lorlatinib, or a pharmaceutically acceptable salt thereof and 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof.

In one embodiment, the combination is a fixed dose combination. In one embodiment, the combination is a non-fixed dose combination.

In one embodiment, the invention provides a combination for use in the treatment of cancer in a subject. In some such embodiments, the cancer is lung cancer. In a specific embodiment, the lung cancer is NSCLC. In one such embodiment, the cancer is advanced cancer. In another such embodiment, the cancer is metastatic cancer.

In one aspect, the invention provides a pharmaceutical composition comprising lorlatinib, or a pharmaceutically acceptable salt thereof, palbociclib, or a pharmaceutically acceptable salt thereof, and at least one pharmaceutically acceptable excipient.

In another aspect, the invention provides a pharmaceutical composition comprising lorlatinib, or a pharmaceutically acceptable salt thereof, 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof, and at least one pharmaceutically acceptable excipient.

Additional embodiments described herein relate to a use of a combination comprising an ALK inhibitor and a CDK4/6 inhibitor for the treatment of cancer in a subject. In some embodiments of the use of the present invention, the ALK inhibitor is lorlatinib, or a pharmaceutically acceptable salt thereof and the CDK4/6 inhibitor is palbociclib, or a pharmaceutically acceptable salt thereof.

Further embodiments described herein relate to a use of a combination comprising an ALK inhibitor and a CDK2/4/6 inhibitor for the treatment of cancer in a subject. In embodiments of the use of the present invention, the ALK inhibitor is lorlatinib, or a pharmaceutically acceptable salt thereof and the CDK2/4/6 inhibitor is 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof.

In some embodiments of the use of the present invention, the combination is a synergistic combination.

Each of the embodiments of the present invention described herein can be combined with any other embodiment described herein not inconsistent with the embodiment with which it is combined. Furthermore, each of the embodiments described herein includes both the free base of the compounds, and all pharmaceutically acceptable salts of the compounds.

BRIEF DESCRIPTION OF THE DRAWINGS

FIGS. 11A and 11B show improved anti-tumor efficacy of lorlatinib and PF-06873600, alone and in combination, in MGH902-1C (Crizo/CeriR) and MGH979-6.7R8 (AlecR, G1202R) xenograft models.

DETAILED DESCRIPTION OF THE INVENTION

Figure 1A:
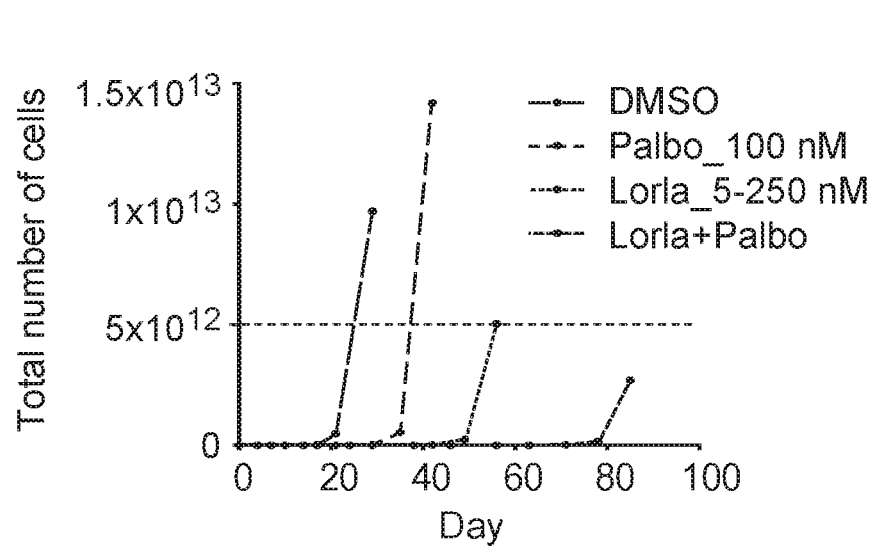
FIGS. 1A and 1B show improved durability of response in H3122 naïve cells by lorlatinib plus palbociclib vs. lorlatinib alone.
Figure 1A:
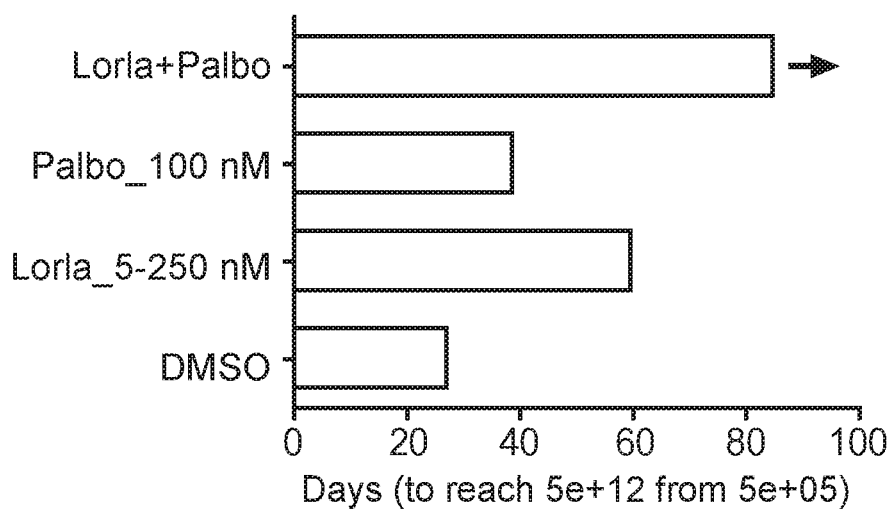

The present invention may be understood more readily by reference to the following detailed description of the preferred embodiments of the invention and the Examples included herein. It is to be understood that the terminology used herein is for the purpose of describing specific embodiments only and is not intended to be limiting. It is further to be understood that unless specifically defined herein, the terminology used herein is to be given its traditional meaning as known in the relevant art.

As used herein, the singular form "a," "an," and "the" and similar references in the context of describing the invention (especially in the context of the following claims) are to be construed to cover both the singular and the plural, unless otherwise indicated herein or clearly contradicted by context. For example, "an" excipient includes one or more excipients. Where the plural form is used for compounds, salts, and the like, this is taken to mean also a single compound, salt, or the like.

As used herein, the term "about" when used to modify a numerically defined parameter (e.g., the dose of an ALK inhibitor or a CDK inhibitor) means that the parameter may vary by as much as 10% below or above the stated numerical value for that parameter (±10%). For example, a dose of about 5 mg may vary between 4.5 mg and 5.5 mg.

The terms "comprising" and "including" are used herein in their open-ended and non-limiting sense unless otherwise noted.

The invention described herein suitably may be practiced in the absence of any element(s) not specifically disclosed herein. Thus, for example, in each instance herein any of the terms "comprising", "consisting essentially of", and "consisting of" may be replaced with either of the other two terms.

Abbreviations used herein are as follows: DMSO (dimethylsulphoxide); FBS (fetal bovine serum); RPMI (Roswell Park Memorial Institute); TRGD (tumor re-growth delay); RECIST (response evaluation criteria in solid tumors); ALKi (ALK inhibitor); mpk (mg/kg or mg drug per kg body weight of subject); w/w (weight per weight); wk (week); x (times); po (orally); q.d. or QD (once daily); b.i.d. or BID (twice daily); t.i.d. or TID (three time daily); q.i.d. or QID (four time daily); qd×5 (once daily for five days); q (weekly); Ix/wk (once a week); Q2W (One dose every two weeks); Q3W (One dose every three weeks); Q4W (One dose every four weeks); BWL (body weight loss); SD (standard deviation); CR (complete response); CRc, composite complete remission; CRi (complete remission with incomplete hematologic recovery); CRp (complete remission with incomplete platelet recovery); PR (partial response); OR (overall response, e.g., the sum of the complete and partial responses); DOR (durability of response); OS (overall survival); PD (progressive disease); DFS (disease free survival); TGI (tumor growth inhibition); PFS (progression-free survival); QOL (quality of life); TTP (time-to-progression); and SD (stable disease).

As used herein, terms, including, but not limited to, "drug," "agent," "component," "compound," "substance," "targeted agent," "targeted therapeutic agent," "therapeutic agent," and "medicament" may be used interchangeably to refer to the compounds of the present invention, specifically an ALK inhibitor and a CDK inhibitor.

The term "administer," "administering," or "administration," as it applies to an animal, human, experimental subject, cell, tissue, organ or biological fluid, refers to contacting, implanting, absorbing, ingesting, injecting, inhaling, or introducing of an exogenous pharmaceutical, therapeutic or diagnostic agent, compound, particle, and/or composition, to the animal, human, experimental subject, cell, tissue, organ or biological fluid. Treatment of a cell encompasses contact of a reagent to the cell, as well as contact of a reagent to a fluid, where the fluid is in contact with the cell. "Administration" or "treatment" also means in vitro and ex vivo treatment, e.g., of a cell, by a reagent, diagnostic, binding compound, or by another cell.

The terms "abnormal cell growth" and "hyperproliferative disorder" are used interchangeably in this application. "Abnormal cell growth," as used herein, unless otherwise indicated, refers to cell growth that is independent of normal regulatory mechanisms (e.g., loss of contact inhibition). Abnormal cell growth may be benign (not cancerous), or malignant (cancerous).

A "disorder" is any condition that would benefit from treatment with the compounds of the present invention. This includes chronic and acute disorders or diseases including those pathological conditions which predispose the subject to the disorder in question.

The term "cancer," "cancerous," "malignant" refer to or describe any physiological condition in mammals that is typically characterized by unregulated cell growth. As used herein, "cancer" refers to any malignant and/or invasive growth or tumor caused by abnormal cell growth. As used herein, "cancer" refers to solid tumors named for the type of cells that form them, cancer of blood, bone marrow, or the lymphatic system. Examples of solid tumors include, but are not limited to, sarcomas and carcinomas. Examples of cancers of the blood include, but are not limited to, leukaemia, lymphomas and myeloma.

The term "cancer" include, but are not limited to, a primary cancer that originates at a specific site in the body, a metastatic cancer that has spread from the place in which it started to other parts of the body, a recurrence from the original primary cancer after remission, and a second primary cancer that is a new primary cancer in a person with a history of previous cancer of a different type from latter one.

The term "non-small cell lung cancer" or "NSCLC" is a cancer in which malignant cells form in the tissues of the lung.

There are several types of non-small cell lung cancer. Each type of non-small cell lung cancer has different kinds of cancer cells. The cancer cells of each type grow and spread in different ways.

The types of non-small cell lung cancer are named for the kinds of cells found in the cancer and how the cells look under a microscope.

Squamous cell carcinoma: Cancer that forms in the thin, flat cells lining the inside of the lungs. This is also called epidermoid carcinoma.

Large cell carcinoma: Cancer that may begin in several types of large cells.

Adenocarcinoma: Cancer that begins in the cells that line the alveoli and make substances such as mucus.

Other less common types of non-small cell lung cancer are: pleomorphic, carcinoid tumor, salivary gland carcinoma, and unclassified carcinoma. "ALK positive," "anaplastic lymphoma kinase positive," or "ALK*" lung cancer is a type of non-small cell lung cancer (NSCLC) in which the cancer cells have a mutation in the anaplastic lymphoma kinase (ALK) gene. The mutation is a gene rearrangement—an abnormal fusion of ALK and another gene, echinoderm microtubule-associated protein-like 4 (EML4).

The term "relapse" is understood as the return of a cancer or the signs and symptoms of a cancer after a period of improvement.

The term "patient" or "subject" refers to any subject for which therapy is desired or that is participating in a clinical trial, epidemiological study or used as a control, including humans and non-human animals, including veterinary subjects such as cattle, horses, dogs and cats. In a preferred embodiment, the subject is a human and may be referred to as a patient. Those skilled in the medical art are readily able to identify individual patients who are afflicted with cancer, particularly NSCLC, advanced or metastatic lung cancer and who are in need of treatment.

The term "treat" or "treating" as used herein, unless otherwise indicated, means reversing, alleviating, inhibiting the progress of, or preventing the disorder or condition to which such term applies, or one or more symptoms of such disorder or condition. In particular, the term "treat" or "treating" a cancer as used herein, means to administer a combination therapy according to the present invention to a subject having cancer, or diagnosed with cancer, to achieve at least one positive therapeutic effect, such as, for example, reduced number of cancer cells, reduced tumor size, reduced rate of cancer cell infiltration into peripheral organs, or reduced rate of tumor metastases or tumor growth, reversing, alleviating, inhibiting the progress of, or preventing the disorder or condition to which such term applies, or one or more symptoms of such disorder or condition. The term "treatment," as used herein, "treat" or "treating" unless otherwise indicated, refers to the act of treating as "treating" is defined immediately above. The term "treating" also includes adjuvant and neo-adjuvant treatment of a subject.

For the purposes of this invention, beneficial or desired clinical results include, but are not limited to, one or more of the following: reducing the proliferation of (or destroying) neoplastic or cancerous cell, inhibiting metastasis or neoplastic cells, shrinking or decreasing the size of a tumor, remission of the cancer, decreasing symptoms resulting from the cancer, increasing the quality of life of those suffering from the cancer, decreasing the dose of other medications required to treat the cancer, delaying the progression of the cancer, curing the cancer, overcoming one or more resistance mechanisms of the cancer, and/or prolonging survival of patients the cancer. Positive therapeutic effects in cancer can be measured in a number of ways (see, for example, W. A. Weber, Assessing tumor response to therapy, J. Nucl. Med., 2009, 50 Suppl. 1:1 S-10S. For example, with respect to tumor growth inhibition (T/C), according to the National Cancer Institute (NCI) standards, a T/C less than or equal to 42% is the minimum level of anti-tumor activity. A T/C<10% is considered a high anti-tumor activity level, with T/C (%)=median tumor volume of the treated/median tumor volume of the control×100.

The efficacy of the treatment of the invention can be measured by various endpoints commonly used in evaluating cancer. In some embodiments, the treatment achieved by a combination of the invention is defined by reference to any of the following: partial response (PR), complete response (CR), overall response (OR), progression free survival (PFS), disease free survival (DFS), overall survival (OS), time-to-progression (TTP), durability of response (DOR), objective response rate (ORR), tumor growth inhibition (TGI), plasma and/or urine markers, enzyme inhibition and/or receptor status, changes in gene expression and/or quality of life (QOL). PR refers to a decrease in the size of one or more tumors or lesions, or in the extent of cancer in the body, in response to treatment. For example, in some embodiments, PR refers to at least a 30% decrease in the sum of the longest diameters (SLD) of target lesions, taking as reference the baseline SLD.

Assessments are based on a variety of examinations (CT scan, MRI, ultrasound, PET scan, bone scan, physical examination) of patients. CR means the disappearance of all known sites of disease without the development of any new disease for a period of time appropriate for the tumor type being treated. Assessments are based on a variety of examinations such as those stated above. OR is defined as the sum of the complete and partial responses. PFS, also referred to as "time to tumor progression" indicates the length of time during and after treatment that the cancer does not grow and includes the amount of time patients have experienced a CR or PR, as well as the amount of time patients have experienced stable disease (SD). PFS may be expressed as either the duration of time or as the proportion of patients who are surviving and progression-free at a given time after diagnosis. PFS may include the amount of time patients have experienced a complete response or a partial response, as well as the amount of time patients have experienced stable disease. DFS refers to the length of time during and after treatment that the patient remains free of disease. OS refers to a prolongation in life expectancy relative to naïve or untreated patients, or relative to a control treatment protocol. Survival is monitored for at least about six months, or at least about 1 year, or at least about 2 years, or at least about 3 years, or at least about 4 years, or at least about 5 years, or at least about 10 years, etc., following the initiation of treatment or following the initial diagnosis. TTP or DOR refers to the duration of time from treatment to a progression of tumor growth, measured either as an increase in size of existing tumor masses or the appearance of new tumor masses. In certain embodiments, DOR means the time from documentation of tumor model growth inhibition due to drug treatment to the time of acquisition of a restored growth rate similar to pretreatment growth rate. In some embodiments, ORR refers to the sum of CR and PR rate. In some embodiments, response to a combination of the invention is any of PR, CR, OR, PFS, DFS, OS, and/or TTP that is assessed using by a variety of methods known in the art, such as, e.g., Response Evaluation Criteria in Solid Tumors (RECIST) 1.1 response criteria.

As used herein, "progressive disease" or "PD" refers to at least a 20% increase in the SLD of target lesions, taking as reference the smallest SLD recorded since the treatment started or the presence of one or more new lesions.

"Sustained response" refers to the sustained effect on reducing tumor growth after cessation of a treatment. For example, the tumor size may be the same size or smaller as compared to the size at the beginning of the medicament administration phase. In some embodiments, the sustained response has a duration of at least the same as the treatment duration, at least 1.5×, 2×, 2.5×, or 3×length of the treatment duration, or longer.

"Duration of response" for purposes of the present invention means the time from documentation of tumor model growth inhibition due to drug treatment to the time of acquisition of a restored growth rate similar to pretreatment growth rate.

In some embodiments, the anti-cancer effect of the method of treating cancer, including "objective response," "complete response," "partial response," "progressive disease," "stable disease," "progression free survival," "duration of response," as used herein, are as defined and assessed by the investigators using RECIST v1.1 (Eisenhauer et. al., New response evaluation criteria in solid tumours: revised RECIST guideline, Eur J of Cancer 2009; 45(2):228-47) in patients with locally advanced or metastatic solid tumors other than metastatic CRPC, and RECIST v1.1 and PCWG3 (Scher et. al., Trial Design and Objectives for Castration-Resistant Prostate Cancer: Updated Recommendations from the Prostate Cancer Clinical Trials Working Group 3., J Clin Oncol 2016 Apr. 20; 34(12):1402-18) in patients with metastatic CRPC. The disclosures of Eisenhauer et. al., New response evaluation criteria in solid tumours: revised RECIST guideline, Eur J of Cancer 2009; 45(2):228-47 and Scher et. al., Trial Design and Objectives for Castration-Resistant Prostate Cancer: Updated Recommendations From the Prostate Cancer Clinical Trials Working Group 3., J Clin Oncol 2016 Apr. 20; 34(12):1402-18 are herein incorporated by references in their entireties.

In some embodiments, the effect of a combination therapy, e.g., lorlatinib in combination with palbociclib, on cell growth and durability of response (DOR) was assessed in drug sensitive H3122 cells. This re-emergence of growing cells in the presence of drug treatment represented the acquisition of resistance or selection of pre-existing resistant cells. It has been well-documented in the literature for similar studies with EGFR inhibitors (Engelman, J., et. al., Allele dilution obscures detection of a biologically significant resistance mutation in EGFR-amplified lung cancer, Journal of Clinical Investigation, 2006, 2695-2706, vol. 10;

Chmielecki, J., et. al., Optimization of dosing for EGFR-mutant non-small cell lung cancer with evolutionary cancer modeling, Science Translational Medicine, 2011, 90ra59, vol. 3, no. 90). The time required for the emergence of designated number of cells represents DOR under drug treatment.

The treatment regimen for a combination of the invention that is effective to treat a cancer patient may vary according to factors such as the disease state, age, and weight of the patient, and the ability of the therapy to elicit an anti-cancer response in the subject. While an embodiment of any of the aspects of the invention may not be effective in achieving a positive therapeutic effect in every subject, it should do so in a statistically significant number of subjects as determined by any statistical test known in the art such as the Student's t-test, the chi2-test the U-test according to Mann and Whitney, the Kruskal-Wallis test (H-test), Jonckheere-Terpstrat-test and the Wilcon on-test.

The terms "treatment regimen," "dosing protocol," and "dosing regimen" are used interchangeably to refer to the dose and timing of administration of each agent in a combination of the invention.

The term "ameliorating" means a lessening or improvement of one or more symptoms upon treatment with a combination described herein, as compared to not administering the combination. Ameliorating" also includes shortening or reduction in duration of a symptom.

A "pharmaceutical composition" refers to a mixture of one or more of the compounds described herein, or physiologically/pharmaceutically acceptable salts, solvates, hydrates or prodrugs thereof, with other chemical components, such as physiologically/pharmaceutically acceptable excipients. The purpose of a pharmaceutical composition is to facilitate administration of a compound to an organism.

As used herein, an "effective dosage," "effective amount," "therapeutically effective amount," or "therapeutically effective dosage" of a drug, agent, compound or pharmaceutical composition is an amount sufficient to effect any one or more beneficial or desired, including biochemical, histological and/or behavioral symptoms, of the disease, its complications and intermediate pathological phenotypes presenting during development of the disease. For therapeutic use, a "therapeutically effective amount" refers to that amount of a compound being administered which will relieve to some extent one or more of the symptoms of the disorder being treated. In reference to the treatment of cancer, a therapeutically effective amount refers to that amount which has the effect of (1) reducing the size of the tumor, (2) inhibiting (that is, slowing to some extent, preferably stopping) tumor metastasis, (3) inhibiting to some extent (that is, slowing to some extent, preferably stopping) tumor growth or tumor invasiveness, (4) relieving to some extent (or, preferably, eliminating) one or more signs or symptoms associated with the cancer, (5) decreasing the dose of other medications required to treat the disease, and/or (6) enhancing the effect of another medication, and/or (7) delaying the progression of the disease in a patient.

An effective amount of an agent includes a "prophylactically effective amount," which is any amount of the agent that, when administered alone or in combination with other anti-cancer agents to a subject at risk of developing a cancer (e.g., a subject having a pre-malignant condition) or of suffering a recurrence of cancer, inhibits the development or recurrence of the cancer. In preferred embodiments, the prophylactically effective amount prevents the development or recurrence of the cancer entirely. "Inhibiting" the development or recurrence of a cancer means to achieve at least one positive therapeutic effect, such as, for example, lessening the likelihood of the cancer's development or recurrence, or preventing the development or recurrence of the cancer entirely.

An effective dosage can be administered in one or more administrations. For the purposes of this invention, an effective dosage of agent, drug, compound, or pharmaceutical composition is an amount sufficient to accomplish prophylactic or therapeutic treatment either directly or indirectly. As is understood in the clinical context, an effective dosage of agent, drug, compound or pharmaceutical composition may or may not be achieved in conjunction with another drug, compound or pharmaceutical composition.

A "low-dose amount," as used herein, refers to an amount or dose of an agent that is lower than the amount or dose typically used in a clinical setting.

The term "tumor" as it applies to a subject diagnosed with, or suspected of having, a cancer refers to a malignant or potentially malignant neoplasm or tissue mass of any size and includes primary tumors and secondary neoplasms. A solid tumor is an abnormal growth or mass of tissue that usually does not contain cysts or liquid areas. Examples of solid tumors are sarcomas, carcinomas, and lymphomas. Leukemias (cancers of the blood) generally do not form solid tumors (National Cancer Institute, Dictionary of Cancer Terms).

"Tumor burden" or "tumor load," refers to the total amount of tumorous material distributed throughout the body. Tumor burden refers to the total number of cancer cells or the total size of tumor(s), throughout the body, including lymph nodes and bone marrow. Tumor burden can be determined by a variety of methods known in the art, such as, e.g., using callipers, or while in the body using imaging techniques, e.g., ultrasound, bone scan, computed tomography (CT), or magnetic resonance imaging (MRI) scans.

The term "tumor size" refers to the total size of the tumor which can be measured as the length and width of a tumor. Tumor size may be determined by a variety of methods known in the art, such as, e.g., by measuring the dimensions of tumor(s) upon removal from the subject, e.g., using callipers, or while in the body using imaging techniques, e.g., bone scan, ultrasound, CR or MRI scans.

As used herein, the term "combination" or "combination therapy" refer to the administration of each therapeutic agent of the combination therapy of the invention, either alone or in the form of a pharmaceutical composition or medicament, either sequentially, simultaneously or concurrently. For example, administration of each therapeutic agent of the combination therapy of the invention by mixing or combining of the ALK inhibitor and the CDK inhibitor according to the present invention, including fixed and non-fixed combinations. The term combination as used herein, includes a combination of any two or more agents described herein, e.g., any ALK inhibitor described herein with any CDK inhibitor described herein.

As used herein, the term "sequential" or "sequentially" refers to the administration of each therapeutic agent of the combination therapy of the invention, either alone or in a medicament, one after the other, wherein each therapeutic agent can be administered in any order. Sequential administration may be particularly useful when the therapeutic agents in the combination therapy are in different dosage forms, for example, one agent is a tablet and another agent is a sterile liquid, and/or the agents are administered according to different dosing schedules, for example, one agent is administered daily, and the second agent is administered less frequently such as weekly.

As used herein, the term "simultaneous" or "simultaneously" refers to the administration of each therapeutic agent of the combination therapy of the invention in the same medicament.

As used herein, the term "concurrently" refers to the administration of each therapeutic agent in the combination therapy of the invention, either alone or in separate medicaments, wherein the second therapeutic agent is administered immediately after the first therapeutic agent, but that the therapeutic agents can be administered in any order. In a preferred embodiment the therapeutic agents are administered concurrently.

As will be understood by those skilled in the art, the combination therapy may be usefully administered to a subject during different stages of their treatment.

"Fixed dose combination" or "fixed combination" means that that the ALK inhibitor and the CDK inhibitor of the present invention, e.g., the CDK4/6 inhibitor or the CDK2/4/6 inhibitor and the ALK inhibitor, are both administered to a patient simultaneously in a single pharmaceutical composition.

"Non-fixed dose combination" or "non-fixed combination" means that the ALK inhibitor and the CDK inhibitor of the present invention, e.g., the CDK4/6 inhibitor or the CDK2/4/6 inhibitor and the ALK inhibitor, are formulated as separate pharmaceutical compositions such that they may be administered sequentially, simultaneously or concurrently via the same or different routes of administration and on the same or different administration schedules according to standard pharmaceutical practice known to the skilled person in the art. In one embodiment, such administration is done within time intervals that allow the therapeutic agents to show a cooperative, e.g., synergistic, effect.

The agents of the present invention can be administered completely separately or in the form of one or more separate compositions. For example, the agents may be given separately at different times during the course of therapy (in a chronologically staggered manner, especially a sequence-specific manner) in such time intervals that the combination therapy is effective in treating cancer.

The term "advanced," as used herein, as it relates to cancer, includes locally advanced (non-metastatic) disease and metastatic disease.

The term "anaplastic lymphoma kinase inhibitor" or "ALK inhibitor" is defined herein to refer to a compound or biologic agent which targets, decreases or inhibits the synthesis or biological activity of anaplastic lymphoma kinase (ALK).

In an embodiment, the ALK inhibitor of the invention selected from the group consisting of: lorlatinib, crizotinib, ceritinib, alectinib, brigatinib, belizatinib, ensartinib, entrectinib, CEP-37440, and NVP-TAE684, or a pharmaceutically acceptable salt thereof.

Cyclin-dependent kinases (CDKs) and related serine/threonine kinases are important cellular enzymes that perform essential functions in regulating cell division and proliferation. CDK inhibitors useful in the present invention include CDK4/6 inhibitors and CDK2/4/6 inhibitors. Such compounds may be pan-CDK inhibitors, which inhibit multiple CDKs, or may selectively inhibit CDK2, CDK4 and/or CDK6. CDK inhibitors may have activity against targets in addition to CDKs. Such compounds may be identified using standard assays routinely used to measure inhibition of CDKs and other protein kinases. See, e.g., Fry et. al., Cell cycle and biochemical effects of PD 0183812. A potent inhibitor of the cyclin D-dependent kinases CDK4 and CDK6, J. Biol. Chem. (2001), 276: 16617-16623. Typical CDK inhibitors have $IC_{50}$ values of less than 1 μM, preferably less than 100 nM, and more preferably less than 20 nM in such assays.

The development of CDK inhibitors has been reviewed in the literature. For example, see Sánchez-Martinez et. al., Cyclin dependent kinase (CDK) inhibitors as anticancer drugs, Bioorg. Med. Chem. Lett. (2015) 25: 3420-3435 (and references cited therein).

A number of CDK4/6 inhibitors have been approved or are currently in clinical development, including: palbociclib (also known as PD-0332991), ribociclib (also known as LEE-011), abemaciclib (also known as LY2835219), G1T38, trilaciclib (also known as GTI128) and SHR6390. Pan-CDK inhibitors having CDK4 activity include, but are not limited to, AT7519, JNJ-7706621, P276-00, R547 (also known as RO-4584820), roniciclib (also known as BAY1000394), RGB-286638 and flavopiridol (alvocidib). Such compounds, or their pharmaceutically acceptable salts, may be useful in the present invention.

In some embodiments, the CDK inhibitor is a CDK4/6 inhibitor selected from the group consisting of palbociclib, ribociclib, abemaciclib, G1T38, trilaciclib and SHR6390, or a pharmaceutically acceptable salt thereof. In other embodiments, the CDK inhibitor is a CDK4/6 inhibitor selected from the group consisting of palbociclib, ribociclib and abemaciclib, or a pharmaceutically acceptable salt thereof. In specific embodiments wherein the CDK inhibitor is a CDK4/6 inhibitor, and wherein the CDK 4/6 inhibitor is palbociclib, or a pharmaceutically acceptable salt thereof.

In other embodiments, the CDK4/6 inhibitor is ribociclib, or a pharmaceutically acceptable salt thereof. In other embodiments, the CDK4/6 inhibitor is abemaciclib, or a pharmaceutically acceptable salt thereof. In further embodiments, the CDK4/6 inhibitor is G1T38, or a pharmaceutically acceptable salt thereof.

In a specific embodiment, the CDK4/6 inhibitor of the present invention is palbociclib. Unless otherwise indicated herein, palbociclib (also referred to herein as "palbo" or "Palbo") refers to 6-acetyl-8-cyclopentyl-5-methyl-2-(5-piperazin-1-yl-pyridin-2-ylamino)-8H-pyrido[2,3-d]pyrimidin-7-one, or a pharmaceutically acceptable salt thereof.

In another embodiment, the CDK inhibitor of the present invention is a CDK2/4/6 inhibitor. In one such embodiment, the CDK2/4/6 inhibitor is 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof.

Unless indicated otherwise, all references herein to CDK inhibitors and ALK inhibitors include references to salts, solvates, hydrates and complexes thereof, and include amorphous and polymorphic forms, stereoisomers, and isotopically labeled versions thereof.

Further, the CDK inhibitors and ALK inhibitors useful for the present invention may exist in both unsolvated and solvated forms. When the solvent or water is tightly bound, the complex will have a well-defined stoichiometry independent of humidity. When, however, the solvent or water is weakly bound, as in channel solvates and hygroscopic compounds, the water/solvent content will be dependent on humidity and drying conditions. In such cases, non-stoichiometry will be the norm. The term 'solvate' is used herein to describe a molecular complex comprising the compound of the invention and one or more pharmaceutically acceptable solvent molecules, for example, ethanol. The term 'hydrate' is employed when the solvent is water. Pharmaceutically acceptable solvates in accordance with the invention include hydrates and solvates wherein the solvent of crystallization may be isotopically substituted, e.g., D20, d6-acetone and d6-DMSO.

The CDK inhibitors and ALK inhibitors useful for the present invention may be used as crystalline or amorphous products, or mixtures thereof. They may be obtained, for example, as solid plugs, powders, or films by methods such as precipitation, crystallization, freeze drying, spray drying, or evaporative drying. Microwave or radio frequency drying may be used for this purpose.

The CDK inhibitors and ALK inhibitors useful in the present invention may exist in the form of pharmaceutically acceptable salts such as, e.g., acid addition salts and base addition salts.

A "pharmaceutically acceptable" refers to those compounds, materials, biologic agents, compositions and/or dosage forms, which are, within the scope of sound medical judgment, suitable for contact with the tissues a subject, e.g., a mammal or human, without excessive toxicity, irritation allergic response and other problem complications commensurate with a reasonable benefit/risk ratio.

As used herein, the term "pharmaceutically acceptable salt" refers to those salts which retain the biological effectiveness and properties of the parent compound. The term "pharmaceutically acceptable salt," as used herein, unless otherwise indicated, includes salts of acidic or basic groups which may be present in the compounds of the formulae disclosed herein. For example, the compounds of the invention that are basic in nature may be capable of forming a wide variety of salts with various inorganic and organic acids. The acids that may be used to prepare pharmaceutically acceptable acid addition salts of such basic compounds of those that form non-toxic acid addition salts, i.e., salts containing pharmacologically acceptable anions, such as the hydrochloride, hydrobromide, hydroiodide, nitrate, sulfate, bisulfate, bisulfite, phosphate, acid phosphate, isonicotinate, acetate, lactate, salicylate, citrate, tartrate, pantothenate, bitartrate, ascorbate, succinate, maleate, gentisinate, fumarate, gluconate, glucuronate, saccharate, formate, benzoate, glutamate, methanesulfonate, ethanesulfonate, benzenesulfonate, p-toluenesulfonate and pamoate [i.e., 1,1'-methylene-bis-(2-hydroxy-3-naphthoate)] salts. Examples of salts include, but are not limited to, acetate, acrylate, benzenesulfonate, benzoate (such as chlorobenzoate, methylbenzoate, dinitrobenzoate, hydroxybenzoate, and methoxybenzoate), bicarbonate, bitartrate, borate, bromide, butyne-1,4-dioate, calcium edetate, camsylate, carbonate, chloride, caproate, caprylate, clavulanate, citrate, decanoate, dihydrochloride, dihydrogenphosphate, edetate, edislyate, estolate, esylate, ethylsuccinate, formate, fumarate, glucepate, gluconate, glutamate, glycollate, glycollylarsanilate, heptanoate, hexyne-1,6-dioate, hexylresorcinate, hydrabamine, hydrobromide, hydrochloride, γ-hydroxybutyrate, iodide, isobutyrate, isothionate, lactate, lactobionate, laurate, malate, maleate, malonate, mandelate, mesylate, metaphosphate, methylsulfate, monohydrogenphosphate, mucate, naphthalene-1-sulfonate, naphthalene-2-sulfonate, nitrate, oleate, oxalate, pamoate (embonate), palmitate, pantothenate, phenylacetates, phenylbutyrate, phenylpropionate, phthalate, phospate/diphosphate, polygalacturonate, propanesulfonate, propionate, propiolate, pyrophosphate, pyrosulfate, salicylate, stearate, subacetate, suberate, succinate, sulfate, sulfonate, sulfite, tannate, tartrate, teoclate, tosylate, triethiodode, and valerate salts. Alternatively, the compounds useful that are acidic in nature may be capable of forming base salts with various pharmacologically acceptable cations. Examples of such salts include the alkali metal or alkaline-earth metal salts and particularly, the sodium and potassium salts. These salts may be prepared by conventional techniques. The chemical bases which may be used as reagents to prepare the pharmaceutically acceptable base salts of this invention include those which form non-toxic base salts with the acidic compounds herein. The chemical bases that may be used as reagents to prepare pharmaceutically acceptable base salts of the compounds of the invention that are acidic in nature are those that form non-toxic base salts with such compounds. Such non-toxic base salts include, but are not limited to, those derived from such pharmacologically acceptable cations such as alkali metal cations (e.g., potassium and sodium) and alkaline earth metal cations (e.g., calcium and magnesium), ammonium or water-soluble amine addition salts such as N-methylglucamine-(meglumine), and the lower alkanolammonium and other base salts of pharmaceutically acceptable organic amines. Hemisalts of acids and bases may also be formed, for example, hemisulphate and hemicalcium salts. For a review on suitable salts, see Handbook of Pharmaceutical Salts: Properties, Selection, and Use by Stahl and Wermuth (Wiley-VCH, 2002). Methods for making pharmaceutically acceptable salts are known to those of skill in the art. Pharmaceutically acceptable salts of the compounds described herein include the acid addition and base addition salts thereof. For a review on suitable salts, see Handbook of Pharmaceutical Salts: Properties, Selection, and Use by Stahl and Wermuth (Wiley-VCH, 2002). Methods for making pharmaceutically acceptable salts of compounds described herein are known to one of skill in the art.

Compounds described herein containing one or more asymmetric carbon atoms can exist as two or more stereoisomers. Where a compound described herein contains an alkenyl or alkenylene group, geometric cis/trans (or Z/E) isomers are possible. Where structural isomers are interconvertible via a low energy barrier, tautomeric isomerism ('tautomerism') can occur. This can take the form of proton tautomerism in compounds described herein containing, for example, an imino, keto, or oxime group, or so-called valence tautomerism in compounds which contain an aromatic moiety. A single compound may exhibit more than one type of isomerism.

The compounds of the embodiments described herein include all stereoisomers (e.g., x cis and trans isomers) and all optical isomers of compounds described herein (e.g., R and S enantiomers), as well as racemic, diastereomeric and other mixtures of such isomers. While all stereoisomers are encompassed within the scope of our claims, one skilled in the art will recognize that particular stereoisomers may be preferred.

In some embodiments, the compounds described herein can exist in several tautomeric forms, including the enol and imine form, and the keto and enamine form and geometric isomers and mixtures thereof. All such tautomeric forms are included within the scope of the present embodiments. Tautomers exist as mixtures of a tautomeric set in solution. In solid form, usually one tautomer predominates. Even though one tautomer may be described, the present embodiments include all tautomers of the present compounds.

Included within the scope of the present embodiments are all stereoisomers, geometric isomers and tautomeric forms of the compounds described herein, including compounds exhibiting more than one type of isomerism, and mixtures of one or more thereof. Also included are acid addition or base salts wherein the counterion is optically active, for example, d-lactate or l-lysine, or racemic, for example, dl-tartrate or dl-arginine.

The present embodiments also include atropisomers of the compounds described herein. Atropisomers refer to compounds that can be separated into rotationally restricted isomers.

Cis/trans isomers may be separated by conventional techniques well known to those skilled in the art, for example, chromatography and fractional crystallization.

Conventional techniques for the preparation/isolation of individual enantiomers include chiral synthesis from a suitable optically pure precursor or resolution of the racemate (or the racemate of a salt or derivative) using, for example, chiral high pressure liquid chromatography (HPLC).

Alternatively, the racemate (or a racemic precursor) may be reacted with a suitable optically active compound, for example, an alcohol, or, in the case where a compound described herein contains an acidic or basic moiety, a base or acid such as 1-phenylethylamine or tartaric acid. The resulting diastereomeric mixture may be separated by chromatography and/or fractional crystallization and one or both of the diastereoisomers converted to the corresponding pure enantiomer(s) by means well known to a skilled person.

The term "crystalline" as used herein, means having a regularly repeating arrangement of molecules or external face planes. Crystalline forms may differ with respect to thermodynamic stability, physical parameters, x-ray structure and preparation processes.

The term "polymorphs" refers to a crystalline form of a compound (or a salt, hydrate, or solvate thereof) in a particular crystal packing arrangement. All polymorphs have the same elemental pharmaceutical composition. Different crystalline forms usually have different X-ray diffraction patterns, infrared spectra, melting points, density, hardness, crystal shape, optical and electrical properties, stability, and solubility. Recrystallization solvent, rate of crystallization, storage temperature, and other factors may cause one crystal form to dominate. Various polymorphs of a compound can be prepared by crystallization under different conditions.

The term "additive" is used to mean that the result of the combination of two compounds, components or agents is no greater than the sum of each compound, component or agent individually. The term "additive" means that there is no improvement in the disease condition or disorder being treated over the use of each compound, component or agent individually.

The term "synergy" or "synergistic" are used to mean that the result of the combination of two compounds, components or agents is greater than the sum of each agent together. The term "synergy" or "synergistic" means that there is an improvement in the disease condition or disorder being treated, over the use of each compound, component or agent individually. This improvement in the disease condition or disorder being treated is a "synergistic effect". A "synergistic amount" is an amount of the combination of the two compounds, components or agents that results in a synergistic effect, as "synergistic" is defined herein.

Determining a synergistic interaction between one or two components, the optimum range for the effect and absolute dose ranges of each component for the effect may be definitively measured by administration of the components over different w/w ratio ranges and doses to patients in need of treatment. However, the observation of synergy in in vitro models or in vivo models can be predictive of the effect in humans and other species and in vitro models or in vivo models exist, described herein, to measure a synergistic effect and the results of such studies can also be used to predict effective dose and plasma concentration ratio ranges and the absolute doses and plasma concentrations required in humans and other species by the application of pharmacokinetic/pharmacodynamic methods.

In accordance with the present invention, an amount of an ALK inhibitor is combined with an amount of a CDK inhibitor, and the amounts together are effective in the treatment of cancer, particularly lung cancer, e.g., NSCLC, advanced or metastatic lung cancer. The amounts, which together are effective, will relieve to some extent one or more of the symptoms of the disorder being treated. In reference to the treatment of cancer, an "effective amount" refers to that amount which has the effect of (1) reducing the size of the tumor, (2) inhibiting (that is, slowing to some extent, preferably stopping) tumor metastasis emergence, (3) inhibiting to some extent (that is, slowing to some extent, preferably stopping) tumor growth or tumor invasiveness, and/or (4) relieving to some extent (or, preferably, eliminating) one or more signs or symptoms associated with the cancer. Therapeutic or pharmacological effectiveness of the doses and administration regimens may also be characterized as the ability to induce, enhance, maintain or prolong disease control and/or overall survival in patients with these specific tumors, which may be measured as prolongation of the time before disease progression. An effective amount herein may vary according to factors such as the disease state, age, sex, and weight of the patient, and the ability of the antibody to elicit a desired response in the individual. An effective amount is also one in which any toxic or detrimental effects of the treatment are outweighed by the therapeutically beneficial effects.

Methods of determining therapeutic activity in humans afflicted with cancer include measurements of survival and surrogate endpoints. The time at which survival is reasonably evaluated depends on the tumor in question. By way of example, survival rates for patients with low-grade lymphomas may be examined at 5 or 10 years post diagnosis, whereas the survival or patients having aggressive diseases such as advanced NSCLC may be best evaluated at 6 or 12 months post diagnosis.

The term "first line therapy" as used herein, refers to a first treatment a person receives after being diagnosed with cancer.

The term "resistant," "drug resistant," or "therapy-resistant" as used herein, refers to cancer comprising one or more cancer cells that are not able to be treated by one or more cancer treatments. For example, the cancer cell or cancer cells may still be able to proliferate following subjecting the cell to the treatment. In a specific embodiment, the cancer treatment that one or more cells are resistant to is chemotherapy. In other aspects, the resistance may be to one or more cancer therapies. In further specific embodiments, the resistant cells develop resistance to the therapy, whereas in alternative embodiments the resistant cells were always resistant to the therapy or comprised a biological or physiological phenotype or genotype rendering it unable to be sensitive to one or more cancer treatments.

Drug resistance can be either intrinsic, which means the disease has never been responsive to the drug or drugs, or it can be acquired, which means the disease ceases responding to a drug or drugs that the disease had previously been responsive to. Multidrug resistance (MDR) is a specific type of drug resistance that is characterized by cross-resistance of a disease to more than one functionally and/or structurally unrelated drugs. Multidrug resistance in the field of cancer is discussed in greater detail in "Detoxification Mechanisms and Tumor Cell Resistance to Anticancer Drugs," by Kuzmich and Tew, particularly section VII, The Multidrug-Resistant Phenotype (MDR), Medical Research Reviews, Vol. 11, No. 2, 185-217, (Section VII is at pp. 208-213) (1991); and in "Multidrug Resistance and Chemosensitization: Therapeutic Implications for Cancer Chemotherapy," by Georges, Sharom and Ling, Advances in Pharmacology, 1990, Vol. 21, 185-220 (1990).

The term "second line therapy" as used herein, refers to a therapy additional and subsequent to a first line therapy and in particular aspects is non-identical to the first line therapy. In cases where a human tumor responds (i.e., complete or partial response) to a first line therapy, the tumor is termed "sensitive" and, if the tumor recurs, second line treatment may involve re-administration of the same first line active therapy. In cases where tumors are treated with first line chemotherapy and the tumor either fails to respond (i.e., does not regress) or continues to grow, these tumors are considered "resistant" if tumor growth occurs within 90 days of completion of a chemotherapy regimen.

The term "sensitive" as used herein, refers to cancer comprising one or more cancer cells that are able to be treated with a particular cancer treatment. For example, the cell or cells are not able to proliferate following subjecting the cell to the treatment. In specific embodiments, a cell that is sensitive to a certain cancer treatment is killed by the treatment.

Therapeutic Methods, Uses, Combinations and Compositions

The methods, uses, combinations and compositions of the present inventions may be useful for treating cancer.

In one aspect, the combination of the ALK inhibitor and CDK inhibitor can be useful for treating individuals suffering from cancer who do not respond to or are resistant to currently available therapies. Some embodiments provided herein result in one or more of the following effects: (1) improving the efficacy; (2) inhibiting cancer cell proliferation; (3) inducing apoptosis of cancer cells; (4) inhibiting cancer cell invasiveness; (5) inhibiting cancer cell metastasis; (6) inhibiting angiogenesis; (7) overcoming one or more resistance mechanisms relating to a cancer treatment; and/or (8) reducing the side effects of currently-available cancer therapies for individuals who do respond to such therapies.

In one aspect, the present invention provides a potential strategy to improve the therapeutic benefit of ALK inhibitors by use of said ALK inhibitors in combination with a CDK inhibitor in ALK positive NSCLC patients.

In another aspect, the invention provides a method of treating cancer in a subject comprising administering to the subject an ALK inhibitor and a cyclin dependent kinase (CDK) inhibitor, wherein the CDK inhibitor is an inhibitor of CDK4 and CDK6 (CDK4/6 inhibitor); or an inhibitor of CDK2, CDK4 and CDK6 (CDK2/4/6 inhibitor), wherein the amounts together are effective in treating cancer.

In another aspect, the invention provides a method of treating cancer in a subject comprising administering to the subject an amount of an ALK inhibitor and an amount of a cyclin dependent kinase (CDK) inhibitor, wherein the CDK inhibitor is an inhibitor of CDK4 and CDK6 (CDK4/6 inhibitor); or an inhibitor of CDK2, CDK4 and CDK6 (CDK2/4/6 inhibitor), and wherein the amounts of the ALK inhibitor and CDK inhibitor are effective for the treatment of cancer.

In another aspect, the invention provides a method of treating cancer in a subject comprising administering to the subject an effective amount of an ALK inhibitor and an effective amount of a cyclin dependent kinase (CDK) inhibitor, wherein the CDK inhibitor is an inhibitor of CDK4 and CDK6 (CDK4/6 inhibitor); or an inhibitor of CDK2, CDK4 and CDK6 (CDK2/4/6 inhibitor).

In another aspect, the invention provides a method of treating cancer in a subject comprising administering to the subject a combination therapy comprising an ALK inhibitor and a cyclin dependent kinase (CDK) inhibitor, wherein the CDK inhibitor is an inhibitor of CDK4 and CDK6 (CDK4/6 inhibitor); or an inhibitor of CDK2, CDK4 and CDK6 (CDK2/4/6 inhibitor).

In another aspect, the invention provides a method of treating cancer in a subject comprising administering to the subject a combination therapy comprising an amount of an ALK inhibitor and an amount of a cyclin dependent kinase (CDK) inhibitor, wherein the CDK inhibitor is an inhibitor of CDK4 and CDK6 (CDK4/6 inhibitor); or an inhibitor of CDK2, CDK4 and CDK6 (CDK2/4/6 inhibitor), and wherein the amounts of the ALK inhibitor and CDK inhibitor are together effective for the treatment of cancer. In another aspect, the invention provides a method of treating cancer in a subject comprising administering to the subject a combination therapy comprising an effective amount of an ALK inhibitor and an effective amount of a cyclin dependent kinase (CDK) inhibitor, wherein the CDK inhibitor is an inhibitor of CDK4 and CDK6 (CDK4/6 inhibitor); or an inhibitor of CDK2, CDK4 and CDK6 (CDK2/4/6 inhibitor), wherein the amounts together are effective in treating cancer.

In another aspect, the invention provides a method of treating cancer in a subject comprising administering to the subject an effective amount of an ALK inhibitor, or a pharmaceutically acceptable salt thereof and an effective amount of a CDK inhibitor, or a pharmaceutically acceptable salt thereof. In some embodiments of this aspect, the ALK inhibitor is selected from the group consisting of: lorlatinib, crizotinib, ceritinib, alectinib, brigatinib, belizatinib, ensartinib, entrectinib, CEP-37440, and NVP-TAE684, or a pharmaceutically acceptable salt thereof. In a particular embodiment, the ALK inhibitor is lorlatinib, or a pharmaceutically acceptable salt thereof.

In another aspect, the invention provides a method treating cancer in a subject comprising administering to the subject an effective amount of lorlatinib, or a pharmaceutically acceptable salt thereof and an effective amount of a CDK4/6, or a pharmaceutically acceptable salt thereof. In a particular embodiment, the CDK4/6 inhibitor is palbociclib, or a pharmaceutically acceptable salt thereof.

In another aspect, the invention provides a method treating cancer in a subject comprising administering to the subject an effective amount of lorlatinib, or a pharmaceutically acceptable salt thereof and an effective amount of a CDK2/4/6, or a pharmaceutically acceptable salt thereof. In a particular embodiment, the CDK2/4/6 inhibitor is 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof.

In one aspect, the invention provides a method for treating cancer comprising administering to a subject an amount of lorlatinib, or a pharmaceutically acceptable salt thereof, and an amount of palbociclib, or a pharmaceutically acceptable salt thereof, wherein the amounts together are effective in treating cancer.

In one aspect, the invention provides a method for treating cancer comprising administering to a subject an amount of lorlatinib, or a pharmaceutically acceptable salt thereof, and an amount of 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof, wherein the amounts together are effective in treating cancer.

In another aspect, the invention provides a combination comprising an ALK inhibitor and a CDK inhibitor, wherein the CDK inhibitor is a CDK4/6 inhibitor or, a CDK2/4/6 inhibitor.

In another aspect, the invention provides a combination comprising an ALK inhibitor and a CDK inhibitor for use in the treatment of cancer in a subject, wherein the CDK inhibitor is a CDK4/6 inhibitor, or a CDK2/4/6 inhibitor. In some such embodiments, the ALK inhibitor is lorlatinib.

In another aspect, the invention provides a combination comprising, separately or together, an ALK inhibitor and a CDK inhibitor for use in the treatment of cancer in a subject, wherein the CDK inhibitor is a CDK4/6 inhibitor, or a CDK2/4/6 inhibitor, and wherein said use of the ALK inhibitor and the CDK inhibitor is done sequentially, simultaneously or concurrently via the same or different routes of administration and on the same or different administration schedules.

In a more preferred aspect, the invention provides a combination comprising, separately or together, a first agent which is lorlatinib, or a pharmaceutically acceptable salt thereof and a second agent which is palbociclib, or a pharmaceutically acceptable or 6-(difluoromethyl)-8-((1R, 2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof, for use in the treatment of cancer in a subject, wherein the use of both agents is done sequentially, simultaneously or concurrently via the same or different routes of administration, and on the same or different administration schedules.

In another aspect, the invention provides a combination comprising an ALK inhibitor and a CDK inhibitor, for use as a medicament, wherein the CDK inhibitor is a CDK4/6 inhibitor, or a CDK2/4/6 inhibitor. In some such embodiments, the ALK inhibitor is lorlatinib.

In another aspect, the invention provides a synergistic combination comprising an ALK inhibitor and a CDK inhibitor, wherein the CDK inhibitor is a CDK4/6 inhibitor, or a CDK2/4/6 inhibitor. In some such embodiments, the ALK inhibitor is lorlatinib.

In another aspect, the invention provides a synergistic combination comprising an ALK inhibitor and a CDK inhibitor for use in the treatment of cancer in a subject, wherein the CDK inhibitor is a CDK4/6 inhibitor, or a CDK2/4/6 inhibitor. In some such embodiments, the ALK inhibitor is lorlatinib.

In another aspect, the invention provides a synergistic combination comprising an ALK inhibitor and a CDK inhibitor for use as a medicament, wherein the CDK inhibitor is a CDK4/6 inhibitor, or a CDK2/4/6 inhibitor.

In another aspect, the invention provides a combination comprising lorlatinib, or a pharmaceutically acceptable salt thereof and a CDK inhibitor. In some embodiments of this aspect, wherein the CDK inhibitor is a CDK4/6 inhibitor, and wherein the CDK 4/6 inhibitor is palbociclib, or a pharmaceutically acceptable salt thereof.

In some other embodiments, wherein the CDK inhibitor is a CDK2/4/6 inhibitor, and wherein the CDK 2/4/6 inhibitor is 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one, or a pharmaceutically acceptable salt thereof.

In another aspect, the invention provides a combination comprising, separately or together, a first agent which is lorlatinib, or a pharmaceutically acceptable salt thereof and a second agent which is palbociclib, or a pharmaceutically acceptable salt thereof, or 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof.

In another aspect, the invention provides a synergistic combination comprising lorlatinib, or a pharmaceutically acceptable salt thereof and a CDK inhibitor. In some embodiments of this aspect, wherein the CDK inhibitor is a CDK4/6 inhibitor, and wherein the CDK 4/6 inhibitor is palbociclib, or a pharmaceutically acceptable salt thereof.

In some other embodiments, wherein the CDK inhibitor is a CDK2/4/6 inhibitor, and wherein the CDK 2/4/6 inhibitor is 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one, or a pharmaceutically acceptable salt thereof.

In another aspect, the invention provides use of an ALK inhibitor and a CDK inhibitor for the treatment of cancer in a subject, wherein the CDK inhibitor is a CDK4/6 inhibitor, or a CDK2/4/6 inhibitor. In some such embodiments, the ALK inhibitor is lorlatinib.

In another aspect, the invention provides use of an amount of an ALK inhibitor and an amount of a CDK inhibitor for the treatment of cancer in a subject, wherein the CDK inhibitor is a CDK4/6 inhibitor, or a CDK2/4/6 inhibitor, and wherein the amounts of the ALK inhibitor and the CDK inhibitor are together effective for the treatment of cancer.

In another aspect, the invention provides use of an effective amount of an ALK inhibitor and an effective amount of a CDK inhibitor for the treatment of cancer in a subject, wherein the CDK inhibitor is a CDK4/6 inhibitor, or a CDK2/4/6 inhibitor.

In another aspect, the invention provides use of a combination comprising an ALK inhibitor and a CDK inhibitor for the treatment of cancer in a subject, wherein the CDK inhibitor is a CDK4/6 inhibitor, or a CDK2/4/6 inhibitor.

In another aspect, the invention provides use of lorlatinib, or a pharmaceutically acceptable salt thereof and a CDK inhibitor for the treatment of cancer in a subject. In some such embodiments, the CDK inhibitor is a CDK4/6 inhibitor, or a CDK2/4/6 inhibitor.

In another aspect, the invention provides use of an amount of an ALK inhibitor, or a pharmaceutically acceptable salt thereof and an amount of a CDK inhibitor for the treatment of cancer in a subject, wherein the amounts of the ALK inhibitor and CDK inhibitor are together effective for the treatment of cancer. In one such embodiment, the ALK inhibitor is lorlatinib. In some such embodiments, the CDK inhibitor is a CDK4/6 inhibitor, or a CDK2/4/6 inhibitor. In one such embodiment, the CDK4/6 is palbociclib, or a pharmaceutically acceptable salt thereof. In another such embodiment, the CDK2/4/6 is is 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof.

In another aspect, the invention provides use of an effective amount of lorlatinib, or a pharmaceutically acceptable salt thereof and an effective amount of a CDK inhibitor for the treatment of cancer in a subject. In some such embodiments, the CDK inhibitor is a CDK4/6 inhibitor, or a CDK2/4/6 inhibitor. In one such embodiment, the CDK4/6 is palbociclib, or a pharmaceutically acceptable salt thereof. In another such embodiment, the CDK2/4/6 is is 6-(difluoromethyl)-8-((1R,2R)-2-hydroxy-2-methylcyclopentyl)-2-

(1-(methylsulfonyl)piperidin-4-ylamino)pyrido[2,3-d]pyrimidin-7(8H)-one (PF-06873600), or a pharmaceutically acceptable salt thereof.

In another aspect, the invention provides use of a combination comprising an ALK inhibitor and a CDK inhibitor for the treatment of cancer in a subject. In one such embodiment, the ALK inhibitor is lorlatinib. In some such embodiments, the CDK inhibitor is a CDK4/6 inhibitor, or a CDK2/4/6 inhibitor. In one such embodiment, the CDK4/6 is palbociclib, or a pharmaceutically acceptable salt thereof. In another such embodiment, the CDK2/4/6 is is 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof.

In another aspect, the invention provides use of a combination comprising, separately or together, a first agent which is lorlatinib, or a pharmaceutically acceptable salt thereof and a second agent which is palbociclib, or a pharmaceutically acceptable salt thereof or 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof, for the treatment of cancer in a subject.

In another aspect, the invention provides a pharmaceutical composition comprising an ALK inhibitor, a CDK inhibitor, and at least one pharmaceutically acceptable excipient, wherein the CDK inhibitor is a CDK4/6 inhibitor, or a CDK2/4/6 inhibitor. In one such embodiment, the ALK inhibitor is lorlatinib. In some such embodiments, the CDK inhibitor is a CDK4/6 inhibitor. In one such embodiment, the CDK4/6 is palbociclib, or a pharmaceutically acceptable salt thereof. In one such embodiment, the CDK inhibitor is a CDK2/4/6 inhibitor. In another such embodiment, the CDK2/4/6 is 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof. Preferably, the invention provides a pharmaceutical composition comprising lorlatinib, or a pharmaceutically acceptable salt thereof, and palbociclib, or a pharmaceutically acceptable salt or 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof, and at least one excipient.

In another aspect, the invention provides a composition for use in the treatment of cancer comprising an ALK inhibitor, a CDK inhibitor, wherein the CDK inhibitor is a CDK4/6 inhibitor, or a CDK2/4/6 inhibitor. In one such embodiment, the ALK inhibitor is lorlatinib. In some such embodiments, the CDK inhibitor is a CDK4/6 inhibitor. In one such embodiment, the CDK4/6 is palbociclib, or a pharmaceutically acceptable salt thereof. In one such embodiment, the CDK inhibitor is a CDK2/4/6 inhibitor. In another such embodiment, the CDK2/4/6 is 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof.

In another aspect, the invention provides a composition for use in the treatment of cancer comprising an ALK inhibitor, a CDK inhibitor, and at least one pharmaceutically acceptable excipient, wherein the CDK inhibitor is a CDK4/6 inhibitor, or a CDK2/4/6 inhibitor. In one such embodiment, the ALK inhibitor is lorlatinib. In some such embodiments, the CDK inhibitor is a CDK4/6 inhibitor. In one such embodiment, the CDK4/6 is palbociclib, or a pharmaceutically acceptable salt thereof. In one such embodiment, the CDK inhibitor is a CDK2/4/6 inhibitor. In another such embodiment, the CDK2/4/6 is 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof.

In another aspect, the invention provides a pharmaceutical composition comprising lorlatinib, or a pharmaceutically acceptable salt thereof, a CDK inhibitor, and at least one pharmaceutically acceptable excipient. In some embodiments, the CDK inhibitor is a CDK4/6 inhibitor, or a CDK2/4/6 inhibitor. In some such embodiments, the CDK inhibitor is a CDK4/6 inhibitor. In one such embodiment, the CDK4/6 is palbociclib, or a pharmaceutically acceptable salt thereof. In one such embodiment, the CDK inhibitor is a CDK2/4/6 inhibitor. In another such embodiment, the CDK2/4/6 is 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof.

In another aspect, the invention provides a kit which comprises a first container, a second container and a package insert, wherein the first container comprises at least one dose of an ALK inhibitor; the second container comprises at least one dose of a CDK inhibitor, wherein the CDK inhibitor is a CDK4/6 inhibitor, or a CDK2/4/6 inhibitor; and the package insert comprises instructions for treating cancer in a subject using the medicaments. In one such embodiment, the ALK inhibitor is lorlatinib. In some such embodiments, the CDK inhibitor is a CDK4/6 inhibitor. In one such embodiment, the CDK4/6 is palbociclib, or a pharmaceutically acceptable salt thereof. In one such embodiment, the CDK inhibitor is a CDK2/4/6 inhibitor. In another such embodiment, the CDK2/4/6 is 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof. In a preferred embodiment, the invention provides a kit which comprises a first container comprising at least one dose of lorlatinib, or a pharmaceutically acceptable salt thereof, a second container comprising at least one dose of palbociclib, or a pharmaceutically acceptable salt thereof or at least one dose of 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof, and a package insert, comprising instructions for treating cancer in a subject.

In another aspect, this invention relates to an ALK inhibitor for use in the treatment of cancer in a subject, wherein the ALK inhibitor is used in combination with a CDK inhibitor, and wherein the CDK inhibitor is a CDK4/6 inhibitor, or a CDK2/4/6 inhibitor. In one such embodiment, the ALK inhibitor is lorlatinib. In some such embodiments, the CDK inhibitor is a CDK4/6 inhibitor. In one such embodiment, the CDK4/6 is palbociclib, or a pharmaceutically acceptable salt thereof. In one such embodiment, the CDK inhibitor is a CDK2/4/6 inhibitor. In another such embodiment, the CDK2/4/6 is 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof.

In another aspect, the invention provides use of an ALK inhibitor and a CDK inhibitor in the manufacture of a medicament for the treatment of cancer in a subject, wherein the CDK inhibitor is a CDK4/6 inhibitor, or a CDK2/4/6 inhibitor. In one such embodiment, the ALK inhibitor is lorlatinib. In some such embodiments, the CDK inhibitor is a CDK4/6 inhibitor. In one such embodiment, the CDK4/6 is palbociclib, or a pharmaceutically acceptable salt thereof. In one such embodiment, the CDK inhibitor is a CDK2/4/6 inhibitor. In another such embodiment, the CDK2/4/6 is 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof.

In another aspect, the invention provides use of an ALK inhibitor for the manufacture of a medicament for the treatment of cancer, and the medicament is adapted for use in combination with a CDK inhibitor, wherein the CDK inhibitor is a CDK4/6 inhibitor, or a CDK2/4/6 inhibitor. In one such embodiment, the ALK inhibitor is lorlatinib. In some such embodiments, the CDK inhibitor is a CDK4/6 inhibitor. In one such embodiment, the CDK4/6 is palbociclib, or a pharmaceutically acceptable salt thereof. In one such embodiment, the CDK inhibitor is a CDK2/4/6 inhibitor. In another such embodiment, the CDK2/4/6 is 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof.

In another aspect, this invention relates to a pharmaceutical composition comprising an ALK inhibitor, and at least one pharmaceutically acceptable excipient for use in the treatment of cancer in a subject, wherein the pharmaceutical composition comprising the ALK inhibitor is used in combination with a pharmaceutical composition comprising a CDK inhibitor, wherein the CDK inhibitor is a CDK4/6 inhibitor, or a CDK2/4/6 inhibitor and at least one pharmaceutically acceptable excipient. In this aspect, the use of both pharmaceutical compositions is done sequentially, simultaneously or concurrently via the same or different routes of administration and on the same or different administration schedules. In one such embodiment, the ALK inhibitor is lorlatinib. In some such embodiments, the CDK inhibitor is a CDK4/6 inhibitor. In one such embodiment, the CDK4/6 is palbociclib, or a pharmaceutically acceptable salt thereof. In one such embodiment, the CDK inhibitor is a CDK2/4/6 inhibitor. In another such embodiment, the CDK2/4/6 is 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof.

In some embodiments of each of the aspects herein, the CDK inhibitor is a CDK4/6 inhibitor. In other such embodiments, the CDK4/6 inhibitor is selected from the group consisting of palbociclib, ribociclib, abemaciclib, G1T38, trilaciclib and SHR6390, or a pharmaceutically acceptable salt thereof. In specific embodiments, the CDK4/6 inhibitor is palbociclib, or a pharmaceutically acceptable salt thereof. In further embodiments, the CDK4/6 inhibitor is ribociclib or abemaciclib, or a pharmaceutically acceptable salt thereof.

In some embodiments of each of the aspects described herein, the ALK inhibitor is lorlatinib, crizotinib, ceritinib, alectinib, brigatinib, belizatinib, ensartinib, entrectinib, CEP-37440, and NVP-TAE684, or a pharmaceutically acceptable salt thereof and the CDK4/6 inhibitor is palbociclib, or a pharmaceutically acceptable salt. In specific embodiments of each of the aspects described herein, the ALK inhibitor is lorlatinib, or a pharmaceutically acceptable salt and CDK4/6 inhibitor is palbociclib, or a pharmaceutically acceptable salt thereof.

In some embodiments of each of the aspects described herein, the ALK inhibitor is lorlatinib, crizotinib, ceritinib, alectinib, brigatinib, belizatinib, ensartinib, entrectinib, CEP-37440, and NVP-TAE684, or a pharmaceutically acceptable salt thereof and the CDK2/4/6 inhibitor is 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt. In specific embodiments of each of the aspects described herein, the ALK inhibitor is lorlatinib, or a pharmaceutically acceptable salt and CDK2/4/6 inhibitor is inhibitor is 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one, or a pharmaceutically acceptable salt thereof.

In a particular aspect, the in vitro and in vivo assessment of the combination of lorlatinib and palbociclib or 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600) demonstrated enhanced anti-tumor activities (increased DOR, enhanced TGI or delayed tumor regrowth) over lorlatinib alone in several patient-derived ALKi-resistant NSCLC models representing refractory patient populations post various lines of ALKi therapies.

In frequent embodiments of each of the aspects of the invention, the subject is a human.

Examples of cancers include, but are not limited to, carcinoma, lymphoma, leukemia, blastoma, and sarcoma. In some embodiments the methods, uses and combinations of the present invention may be useful for the treatment of one or more cancers including, but not limited to, cancers of the: circulatory system, for example, heart (sarcoma [angiosarcoma, fibrosarcoma, rhabdomyosarcoma, liposarcoma], myxoma, rhabdomyoma, fibroma, lipoma and teratoma), mediastinum and pleura, and other intrathoracic organs, vascular tumors and tumor-associated vascular tissue; respiratory tract, for example, nasal cavity and middle ear, accessory sinuses, larynx, trachea, bronchus and lung such as small cell lung cancer (SCLC), non-small cell lung cancer (NSCLC), bronchogenic carcinoma (squamous cell, undifferentiated small cell, undifferentiated large cell, adenocarcinoma), alveolar (bronchiolar) carcinoma, bronchial adenoma, sarcoma, lymphoma, chondromatous hamartoma, mesothelioma; gastrointestinal system, for example, esophagus (squamous cell carcinoma, adenocarcinoma, leiomyosarcoma, lymphoma), stomach (carcinoma, lymphoma, leiomyosarcoma), gastric, pancreas (ductal adenocarcinoma, insulinoma, glucagonoma, gastrinoma, carcinoid tumors, vipoma), small bowel (adenocarcinoma, lymphoma, carcinoid tumors, Karposi's sarcoma, leiomyoma, hemangioma, lipoma, neurofibroma, fibroma), large bowel (adenocarcinoma, tubular adenoma, villous adenoma, hamartoma, leiomyoma); genitourinary tract, for example, kidney (adenocarcinoma, Wilm's tumor [nephroblastoma], lymphoma, leukemia), bladder and/or urethra (squamous cell carcinoma, transitional cell carcinoma, adenocarcinoma), prostate (adenocarcinoma, sarcoma), testis (seminoma, teratoma, embryonal carcinoma, teratocarcinoma, choriocarcinoma, sarcoma, interstitial cell carcinoma, fibroma, fibroadenoma, adenomatoid tumors, lipoma); liver, for example, hepatoma (hepatocellular carcinoma), cholangiocarcinoma, hepatoblastoma, angiosarcoma, hepatocellular adenoma, hemangioma, pancreatic endocrine tumors (such as pheochromocytoma, insulinoma, vasoactive intestinal peptide tumor, islet cell tumor and glucagonoma); bone, for example, osteogenic sarcoma (osteosarcoma), fibrosarcoma, malignant fibrous histiocytoma, chondrosarcoma, Ewing's sarcoma, malignant lymphoma (reticulum cell sarcoma), multiple myeloma, malignant giant cell tumor chordoma, osteochronfroma (osteocartilaginous exostoses), benign chondroma, chondroblastoma, chondromyxofibroma, osteoid osteoma and giant cell tumors; nervous system, for example, neoplasms of the central nervous system (CNS), primary CNS lymphoma, skull cancer (osteoma, hemangioma, granuloma, xanthoma, osteitis deformans), meninges (meningioma, meningiosarcoma, gliomatosis), brain cancer (astrocytoma, medulloblastoma, glioma, ependymoma, germinoma [pinealoma], glioblastoma multiform, oligodendroglioma, schwannoma, congenital tumors), spinal cord neurofibroma, meningioma, glioma, sarcoma); reproductive system, for example, gynecological, uterus (endometrial carcinoma), cervix (cervical carcinoma, pre-tumor cervical dysplasia), ovaries (ovarian carcinoma [serous cystadenocarcinoma, mucinous cystadenocarcinoma, unclassified carcinoma], granulosa-thecal cell tumors, Sertoli-Leydig cell tumors, dysgerminoma, malignant teratoma), vulva (squamous cell carcinoma, intraepithelial carcinoma, adenocarcinoma, fibrosarcoma, melanoma), vagina (clear cell carcinoma, squamous cell carcinoma, botryoid sarcoma (embryonal rhabdomyosarcoma), fallopian tubes (carcinoma) and other sites associated with female genital organs; placenta, penis, prostate, testis, and other sites associated with male genital organs; hematologic system, for example, blood (myeloid leukemia [acute and chronic], acute lymphoblastic leukemia, chronic lymphocytic leukemia, myeloproliferative diseases, multiple myeloma, myelodysplastic syndrome), Hodgkin's disease, non-Hodgkin's lymphoma [malignant lymphoma]; oral cavity, for example, lip, tongue, gum, floor of mouth, palate, and other parts of mouth, parotid gland, and other parts of the salivary glands, tonsil, oropharynx, nasopharynx, pyriform sinus, hypopharynx, and other sites in the lip, oral cavity and pharynx; skin, for example, malignant melanoma, cutaneous melanoma, basal cell carcinoma (BCC), squamous cell carcinoma (SCC), Karposi's sarcoma, moles dysplastic nevi, lipoma, angioma, dermatofibroma, and keloids; adrenal glands: neuroblastoma; and other tissues including connective and soft tissue, retroperitoneum and peritoneum, eye, intraocular melanoma, and adnexa, breast, head or/and neck, anal region, thyroid, parathyroid, adrenal gland and other endocrine glands and related structures, secondary and unspecified malignant neoplasm of lymph nodes, secondary malignant neoplasm of respiratory and digestive systems and secondary malignant neoplasm of other sites, including refractory versions of any of the above cancers, or a combination of one or more of the foregoing cancers. In some embodiments, the cancer is metastatic. In some embodiments, the cancer advanced.

More particular examples of cancer when used herein in connection with the present invention include cancers of the breast, ovary, lung (including small-cell lung cancer and/or non-small cell lung cancer, e.g., squamous cell carcinoma of the lung, large-cell lung carcinoma, lung adenocarcinoma), skin, colon, bladder, liver, stomach, prostate, kidney, esophagus, nasopharynx, thyroid, cervix, pancreas, head and neck, or sarcomas, or a combination of one or more of the foregoing cancers. In specific embodiments of each of the aspects described herein, the cancer is lung cancer. In some such embodiments, the lung cancer is NSCLC, advanced or metastatic lung cancer.

In some embodiment of each of the aspects described herein, the cancer is locally advanced. In some embodiments of each of the aspects described herein, the cancer is metastatic. In other embodiments of each of the aspects described herein, the cancer is refractory.

In one embodiment, the present invention provides for a cancer treatment as first line therapy for patients with ALK mutation positive (ALK+) advanced NSCLC.

In some embodiments of each of the aspects described herein, the subject or cancer is resistant to treatment with an ALK inhibitor. In other such embodiments, the subject or cancer is resistant to treatment with a CDK inhibitor, e.g., the subject or cancer is resistant to treatment with a CDK4/6 inhibitor, or a CDK2/4/6 inhibitor.

In another embodiment, the subject or cancer, e.g., a lung cancer (e.g., a non-small cell lung cancer) is being treated, or has been treated, with one or more ALK tyrosine kinase inhibitors (TKIs) and/or ROS1 inhibitors, e.g., crizotinib.

In other embodiments, the subject or cancer is resistant or intolerant, or is at risk of developing resistance or tolerance, to a tyrosine kinase inhibitor (TKI). In some embodiments, the cancer has progressed on, or is resistant or intolerant to, crizotinib (Xalkori®), ceritinib (Zykadia®), alectinib (Alecensa®) and/or brigatinib (Alunbrig®). In some such embodiments, the present invention provides for a treatment of subjects previously treated with crizotinib, ceritinib, alectinib and/or brigatinib. In specific embodiments, the present invention provides for a treatment of subjects whose cancer is ALK positive advanced NSCLC, and whose disease has progressed on or crizotinib and at least one other ALK inhibitor; alectinib as the first ALK inhibitor therapy; or ceritinib as the first ALK inhibitor therapy.

In some embodiments of each of the aspects described herein, the subject or cancer is resistant to treatment with lorlatinib, palbociclib, and/or 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600).

In one embodiment, the subject is a patient, e.g., a human patient, who is an ALKi-naïve patient, i.e., a patient who has previously been untreated with an ALK inhibitor. In another embodiment, the subject is a patient, e.g., a human patient, that has been pretreated with an ALK inhibitor.

In other embodiments, the subject or cancer is resistant to treatment with chemotherapeutic agents.

In another aspect, the invention provides a method of inhibiting cancer cell proliferation in a subject, comprising administering to the subject a combination therapy according to the present invention, in an amount effective to inhibit cell proliferation.

In another aspect, the invention provides a method of inhibiting cancer cell invasiveness in a subject, comprising administering to the subject a combination therapy according to the resent invention, in an amount effective to inhibit cell invasiveness.

In another aspect, the invention provides a method of inducing apoptosis in cancer cells in a subject, comprising administering to the subject a combination according to the present invention, in an amount effective to induce apoptosis.

In a particular embodiment of each of the foregoing, lorlatinib is a crystalline form of lorlatinib. In some embodiments, lorlatinib is in a crystalline form as described in International Patent Publication No. WO 2014/207606A1 and in U.S. Pat. No. 9,637,500. In some embodiments, lorlatinib is in a crystalline form as described in International Patent Publication No. WO2017/0175091. In some embodiments, lorlatinib is in a crystalline form as described in International Patent Publication No. WO 2019/073347. In a preferred embodiment, lorlatinib is in a crystalline form as described in International Patent Publication No. WO 2017/021823 A1 and in U.S. Ser. No. 10/420,749.

"Contacting" refers to bringing a compound or pharmaceutically acceptable salt of the invention and a cell expressing CDK4/6 or CDK2/4/6 together in such a manner that the compound may affect the activity of CDK4/6 or CDK2/4/6, either directly or indirectly. Contacting may be accomplished in vitro (i.e., in an artificial environment such as, e.g., without limitation, in a test tube or culture medium) or in vivo (i.e., within a living organism such as, without limitation, a mouse, rat or rabbit.)

In some embodiments, the cells are in a cell line, such as a cancer cell line. In other embodiments, the cells are in a tissue or tumor, and the tissue or tumor may be in a subject, including a human.

Dosage Forms and Regimens

Those skilled in the art will be able to determine, according to known methods, the appropriate amount, dose or dosage of each compound, as used in the combination of the present invention, to administer to a patient, taking into account factors such as age, weight, general health, the compound administered, the route of administration, the nature and advancement of the cancer, in particular lung cancer, more specifically NSCLC, advanced or metastatic lung cancer, requiring treatment, and the presence of other medications.

In some embodiments of the present invention, the ALK inhibitor and the CDK inhibitor are administered sequentially, simultaneously or concurrently.

In some such embodiments, each the therapeutic agents, e.g., an ALK inhibitor, a CDK4/6 inhibitor, or a CDK2/4/6 inhibitor, may be administered to a subject simultaneously in a single pharmaceutical composition, or they may be formulated as separate pharmaceutical compositions such that they may be administered sequentially, simultaneously or concurrently via the same or different routes of administration and on the same or different administration schedules according to standard pharmaceutical practice known to the skilled person in the art, wherein such administration is done within time intervals that allow the therapeutic agents to show a cooperative, e.g., synergistic, effect.

As will be understood by those skilled in the art, the combination therapy may be usefully administered to a subject during different stages of their treatment.

In some embodiments, the combination therapy is administered to a subject who is previously untreated, i.e., is treatment naïve. For example, the subject is an ALKi-naïve patient.

In some embodiments, the combination therapy is administered to a subject who has failed to achieve a sustained response after a prior therapy with a biotherapeutic or chemotherapeutic agent, i.e., is treatment experienced.

The combination therapy may be administered prior to of following surgery to remove a tumor and/or may be used prior to, during or after radiation therapy, and/or may be used prior to, during or after chemotherapy.

The present invention relates to combinations of two or more agents useful for simultaneous, separate or sequential administration to a subject in need thereof, in particular for the treatment or prevention of cancer. Alternatively stated, the present invention particularly pertains to a combination for separate, simultaneous or sequential use for treating or preventing cancer. Preferably, these agents are administered at therapeutically effective dosages which, when combined, provide a beneficial effect.

In one embodiment, the individual agents of the combination of the invention can be administered separately at different times in any order during the course of therapy or concurrently in divided or single combination forms.

The nature of proliferative diseases such as cancer is multifactorial. Under certain circumstances, drugs with different mechanisms of action may be combined. However, just considering any combination of therapeutic agents having different mode of action does not necessarily lead to combinations with advantageous effects.

It has been surprisingly found that these specific anaplastic lymphoma kinase (ALK) inhibitors have a strong beneficial synergistic interaction and improved anti-proliferative activity when used in combination with CDK inhibitors, and may be effective for the treatment of a proliferative disease, particularly a lung cancer. In the present invention, the administration of combination of the present invention is expected to result in a more beneficial treatment, e.g., synergistic anti-proliferative effect, e.g., with regard to the delay of progression of cancer or with regard to a change in tumor volume, as compared to either monotherapy.

Further, the combination of the present invention disclosed herein refers to two or more agents, in particular, an ALK inhibitor in combination with a CDK inhibitor. In some embodiments, a combination according to the present invention is administered in a single dose. In some embodiments, a combination according to the present invention is administered in multiple doses. In some embodiments, a therapeutically effective amount of a combination according to the present invention may be administered orally and periodically at regular intervals (e.g., 1, 2, 3, 4, 5, 6, 7, 8, 9, 10 or more times every 1, 2, 3, 4, 5, or 6 days, or every 1, 2, 3, 4, 5, 6, 7, 8, or 9 weeks, or every 1, 2, 3, 4, 5, 6, 7, 8, 9 months or longer).

In some embodiments, a combination according to the present invention is administered at a predetermined interval (e.g., 1, 2, 3, 4, 5, 6, 7, 8, 9, 10 or more times every 1, 2, 3, 4, 5, or 6 days, or every 1, 2, 3, 4, 5, 6, 7, 8, or 9 weeks, or every 1, 2, 3, 4, 5, 6, 7, 8, 9 months or longer).

In some embodiments, methods, combinations, pharmaceutical composition, and uses of the present invention are also suitable for the treatment of poor prognosis patients, especially such poor prognosis patients having a cancer which is resistant to treatment employing an ALK inhibitor as a sole therapeutic agent, e.g., a cancer of such patients who initially had responded to treatment with an ALK inhibitor and then relapsed. This cancer may have acquired resistance during prior treatment with one or more ALK inhibitors, e.g., one of those listed above and incorporated herein by reference, e.g., lorlatinib. Thus, in one embodiment, the proliferative disease is a cancer which is resistant to treatment employing an ALK inhibitor as a sole therapeutic agent. In one such embodiment, the cancer is a lung cancer. In a particular embodiment, the lung cancer is NSCLC.

Administration of combinations of the invention may be effected by any method that enables delivery of the compounds to the site of action. These methods include oral routes, intraduodenal routes, parenteral injection (including intravenous, subcutaneous, intramuscular, intravascular or infusion), topical, and rectal administration.

Dosage regimens may be adjusted to provide the optimum desired response. For example, an agent of the combination therapy of the present invention may be administered as a single bolus, as several divided doses administered over time, or the dose may be proportionally reduced or increased as indicated by the exigencies of the therapeutic situation. It may be particularly advantageous to formulate an agent in a dosage unit form for ease of administration and uniformity of dosage. Dosage unit form, as used herein, refers to physically discrete units suited as unitary dosages for the mammalian subjects to be treated; each unit containing a predetermined quantity of active compound calculated to produce the desired therapeutic effect in association with the required pharmaceutical carrier. The specification for the dosage unit forms of the invention may be dictated by and directly dependent on (a) the unique characteristics of the chemotherapeutic agent and the particular therapeutic or prophylactic effect to be achieved, and (b) the limitations inherent in the art of compounding such an active compound for the treatment of sensitivity in individuals.

Thus, the skilled artisan would appreciate, based upon the disclosure provided herein, that the dose and dosing regimen is adjusted in accordance with methods well-known in the therapeutic arts. That is, the maximum tolerable dose may be readily established, and the effective amount providing a detectable therapeutic benefit to a subject may also be determined, as can the temporal requirements for administering each agent to provide a detectable therapeutic benefit to the subject. Accordingly, while certain dose and administration regimens are exemplified herein, these examples in no way limit the dose and administration regimen that may be provided to a subject in practicing the present invention.

It is to be noted that dosage values may vary with the type and severity of the condition to be alleviated, and may include single or multiple doses. It is to be further understood that for any particular subject, specific dosage regimens should be adjusted over time according to the individual need and the professional judgment of the person administering or supervising the administration of the compositions, taking into consideration factors such as the severity of the disorder or condition, the rate of administration, the disposition of the compound and the discretion of the prescribing physician. The dosage ranges set forth herein are exemplary only and are not intended to limit the scope or practice of the claimed composition. For example, doses may be adjusted based on pharmacokinetic or pharmacodynamic parameters, which may include clinical effects such as toxic effects and/or laboratory values. Thus, the present invention encompasses intra-patient dose-escalation as determined by the skilled artisan. Determining appropriate dosages and regimens for administration of the chemotherapeutic agent are well-known in the relevant art and would be understood to be encompassed by the skilled artisan once provided the teachings disclosed herein.

In some embodiments, at least one of the therapeutic agents in the combination therapy is administered using the same dosage regimen (dose, frequency and duration of treatment) that is typically employed when the agent is used as a monotherapy for treating the same cancer. In other embodiments, the subject received a lower total amount of at least one of the therapeutic agents in the combination therapy than when the same agent is used as a monotherapy, for example a lower dose of therapeutic agent, a reduced frequency of dosing and/or a shorter duration of dosing.

An effective dosage of a small molecule inhibitor is typically in the range of from about 0.001 to about 100 mg per kg body weight per day, preferably about 1 to about 35 mg/kg/day, in single or divided doses. For a 70 kg human, this would amount to about 0.01 to about 7 g/day, preferably about 0.02 to about 2.5 g/day, and more preferably from about 0.02 to about 1.0 g/day. In some instances, dosage levels at the lower limit of the aforesaid range may be more than adequate, while in other cases still larger doses may be employed without causing any harmful side effect, provided that such larger doses are first divided into several small doses for administration throughout the day.

In some embodiments, the ALK inhibitor, or a pharmaceutically acceptable salt or solvate thereof, is administered at a daily dosage of about 25 mg, 50 mg, about 75 mg, about 100 mg, about 125 mg, about 150 mg, about 200 mg, about 250 mg, about 300 mg, about 350 mg, about 400 mg, about 450 mg, about 500 mg, about 550 mg, about 600 mg, about 650 mg, about 700 mg, about 750 mg, about 800 mg, about 850 mg, about 900 mg, about 950 mg, about 1000 mg, about 1100 mg, about 1200 mg, about 1300 mg, about 1400 mg, or about 1500 mg. This dosage may be administered as a single dose (q.d.), or optionally may be subdivided into smaller doses, suitable for b.i.d., t.i.d. or q.i.d. administration.

In an embodiment, the ALK inhibitor, or a pharmaceutically acceptable salt thereof, is administered once daily to comprise a complete cycle of 28 days. Repetition of the 28-day cycles is continued during treatment with the combination of the present invention.

In an embodiment, the ALK inhibitor, or a pharmaceutically acceptable salt thereof, is administered once daily to comprise a complete cycle of 21 days. Repetition of the 21-day cycles is continued during treatment with the combination of the present invention. In certain embodiments, the ALK inhibitor is lorlatinib, or a pharmaceutically acceptable salt or solvate thereof. For example, lorlatinib is administered at 20 mg twice daily (BID), optionally employing a 7 days on/7 days off regimen in a 28-day cycle.

In one embodiment of the invention, lorlatinib is administered at 40 mg twice daily (BID), optionally employing a 7 days on/7 days off regimen in a 28-day cycle.

In one embodiment of the invention, lorlatinib is administered at 80 mg twice daily (BID), optionally employing a 7 days on/7 days off regimen in a 28-day cycle.

In one embodiment of the invention, lorlatinib is administered at 150 mg twice daily (BID), optionally employing a 7 days on/7 days off regimen in a 28-day cycle.

In one embodiment of the invention, lorlatinib is administered at 250 mg twice daily (BID), optionally employing a 7 days on/7 days off regimen in a 28-day cycle.

In one embodiment of the invention, lorlatinib is administered at 375 mg twice daily (BID), optionally employing a 7 days on/7 days off regimen in a 28-day cycle.

In one embodiment of the invention, lorlatinib is administered at 500 mg twice daily (BID), optionally employing a 7 days on/7 days off regimen in a 28-day cycle.

In one embodiment of the invention, lorlatinib is administered at 625 mg twice daily (BID), optionally employing a 7 days on/7 days off regimen in a 28-day cycle.

In some embodiments, the CDK inhibitor, or a pharmaceutically acceptable salt or solvate thereof, is administered at a daily dosage of from about 50 mg to about 1000 mg per day, preferably from about 50 mg to about 600 mg per day, and more preferably from about 75 mg to about 200 mg per day. In certain embodiments, the CDK inhibitor is palbociclib, or a pharmaceutically acceptable salt or solvate thereof, which is administered at a daily dosage of about 50 mg, about 75 mg, about 100 mg, or about 125 mg per day.

In some embodiments, the CDK inhibitor, or a pharmaceutically acceptable salt or solvate thereof, is administered at a daily dosage of about 50 mg, about 75 mg, about 100 mg, about 125 mg, about 150 mg, about 200 mg, about 250 mg, about 300 mg, about 350 mg, about 400 mg, about 450 mg, about 500 mg, about 550 mg, about 600 mg, about 650 mg, about 700 mg, about 750 mg, about 800 mg, about 850 mg, about 900 mg, about 950 mg, about 1000 mg, about 1100 mg, about 1200 mg, about 1300 mg, about 1400 mg, or about 1500 mg. This dosage may be administered as a single dose (q.d.), or optionally may be subdivided into smaller doses, suitable for b.i.d., t.i.d. or q.i.d. administration. In some embodiments of the each of the foregoing, the CDK inhibitor is an inhibitor of CDK4 and CDK6 (CDK4/6); or an inhibitor of CDK2, CDK4 and CDK6 (CDK2/4/6). In a particular embodiment of each of the foregoing, CDK4/6 inhibitor is inhibitor is palbociclib, or a pharmaceutically acceptable salt thereof. In In further embodiments of each of the foregoing, the CDK2/4/6 inhibitor is 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7(8H)-one (PF-06873600), or a pharmaceutically acceptable salt thereof.

A "continuous dosing schedule" as used herein, is an administration or dosing regimen without dose interruptions, e.g., without days off treatment. Repetition of 21- or 28-day treatment cycles without dose interruptions between the treatment cycles is an example of a continuous dosing schedule.

In still other embodiments, one of the ALK inhibitor and the CDK inhibitor is administered in an intermittent dosing schedule (e.g., a 2/1-week or 3/1-week schedule) and the other is administered in a continuous dosing schedule. In some such embodiments, the ALK inhibitor is administered in an intermittent dosing schedule and the CDK inhibitor is administered in a continuous dosing schedule. In other such embodiments, the ALK inhibitor is administered in a continuous dosing schedule and the CDK inhibitor is administered in an intermittent dosing schedule.

In some embodiments of the present invention, the ALK inhibitor and the CDK inhibitor are dosed in amounts which together are effective in treating the cancer.

In some embodiments of the present invention, the ALK inhibitor and the CDK inhibitor are dosed in amounts which together are synergistic.

In some embodiments of the present invention, the ALK inhibitor and the CDK inhibitor are dosed in amounts which together are additive.

In each of the foregoing embodiments, it will be understood that the CDK inhibitor is a CDK4/6 inhibitor or a CDK2/4/6 inhibitor.

In some of the foregoing embodiments, the ALK inhibitor is preferably lorlatinib, the CDK4/6 inhibitor is preferably palbociclib, or a pharmaceutically acceptable salt thereof, and the CDK2/4/6 inhibitor is preferably 6-(difluoromethyl)-8-((1R,2R)-2-hydroxy-2-methylcyclopentyl)-2-(1-(meth ylsulfonyl)piperidin-4-ylamino)pyrido[2,3-d]pyrimidin-7(8H)-one, or a pharmaceutically acceptable salt.

Pharmaceutical Compositions and Routes of Administration

The pharmaceutical composition of the present invention may comprise an ALK inhibitor and a CDK inhibitor and at least one excipient. As used herein, the term "excipient" refers to a pharmaceutically acceptable ingredient that is commonly used in pharmaceutical technology for the preparation of solid oral dosage formulations. The intended function of an excipient is to act as the carrier (vehicle or basis) or as a component of the carrier of the active substance(s) and, in so doing, to contribute to product attributes such as stability, biopharmaceutical profile, appearance and patient acceptability and/or to the ease with which the product can be manufactured.

Examples of categories of excipients include, but are not limited to, binders, disintegrants, lubricants, glidants, stabilizers, fillers, and diluents. The amount of each excipient used may vary within ranges conventional in the art. The following references which are all hereby incorporated by reference disclose techniques and excipients used to formulate oral dosage forms. See The Handbook of Pharmaceutical Excipients, 4th edition, Rowe et. al., Eds., American Pharmaceuticals Association (2003); and Remington: The Science and Practice of Pharmacy, 20th edition, Gennaro, Ed., Lippincott Williams & Wilkins (2000).

Suitable excipients include magnesium carbonate, magnesium stearate, talc, lactose, lactose monohydrate, sugar, pectin, dextrin, starch, tragacanth, microcrystalline cellulose, methyl cellulose, sodium carboxymethyl cellulose, corn starch, colloidal anhydrous Silica, titanium dioxide, a low-melting wax, cocoa butter, and the like.

In some embodiments, the pharmaceutical composition comprises at least one excipient.

The pharmaceutical composition may of the present invention may be in a form suitable for oral administration as a tablet, capsule, pill, powder, sustained release formulation, solution or suspension, for parenteral injection as a sterile solution, suspension or emulsion, for topical administration as an ointment or cream, or for rectal administration as a suppository.

Exemplary parenteral administration forms include solutions or suspensions of an active compound in a sterile aqueous solution, for example, aqueous propylene glycol or dextrose solutions. Such dosage forms may be suitably buffered, if desired.

The pharmaceutical composition may be in unit dosage forms suitable for single administration of precise amounts.

Pharmaceutical compositions suitable for the delivery of the therapeutic agents of the combination therapies of the present invention, and methods for their preparation will be readily apparent to those skilled in the art. Such compositions and methods for their preparation may be found, for example, in 'Remington's Pharmaceutical Sciences', 19th Edition (Mack Publishing Company, 1995), the disclosure of which is incorporated herein by reference in its entirety.

The agents of the combination therapies of the invention may be administered orally. Oral administration may involve swallowing, so that the agent enters the gastrointestinal tract, or buccal or sublingual administration may be employed by which the agent enters the blood stream directly from the mouth.

Formulations, dosage unit forms or pharmaceutical compositions suitable for oral administration include solid formulations such as tablets, capsules containing particulates, liquids, powders, granules, aqueous and nonaqueous oral solutions and suspensions, lozenges (including liquid-filled), troches, hard candies, sprays, creams, salves, suppositories, jellies, gels, pastes, lotions, ointments, injectable solutions, chews, multi- and nano-particulates, solid solution, liposome, films (including muco-adhesive), ovules, sprays, liquid formulations and parenteral solutions packaged in containers adapted for subdivision into individual doses.

Liquid formulations include suspensions, solutions, syrups and elixirs. Such formulations may be used as fillers in soft or hard capsules and typically include a carrier, for example, water, ethanol, polyethylene glycol, propylene glycol, methylcellulose, or a suitable oil, and one or more emulsifying agents and/or suspending agents. Liquid formulations may also be prepared by the reconstitution of a solid, for example, from a sachet.

Parenteral formulations include pharmaceutically acceptable aqueous or nonaqueous solutions, dispersion, suspensions, emulsions, and sterile powders for the preparation thereof. Examples of carriers include water, ethanol, polyols (propylene glycol, polyethylene glycol), vegetable oils, and injectable organic esters such as ethyl oleate. Fluidity can be maintained by the use of a coating such as lecithin, a surfactant, or maintaining appropriate particle size. Exemplary parenteral administration forms include solutions or suspensions of the compounds of the invention in sterile aqueous solutions, for example, aqueous propylene glycol or dextrose solutions. Such dosage forms can be suitably buffered, if desired.

Additionally, lubricating agents such as magnesium stearate, sodium lauryl sulfate and talc are often useful for tableting purposes. Solid compositions of a similar type may also be employed in soft and hard filled gelatin capsules. Preferred materials, therefor, include lactose or milk sugar and high molecular weight polyethylene glycols. When aqueous suspensions or elixirs are desired for oral administration the active compound therein may be combined with various sweetening or flavoring agents, coloring matters or dyes and, if desired, emulsifying agents or suspending agents, together with diluents such as water, ethanol, propylene glycol, glycerin, or combinations thereof.

Therapeutic agents of the combination therapies of the present invention may also be used in fast-dissolving, fast-disintegrating dosage forms such as those described in Expert Opinion in Therapeutic Patents, 11 (6), 981-986 by Liang and Chen (2001), the disclosure of which is incorporated herein by reference in its entirety.

Methods of preparing various pharmaceutical compositions with a specific amount of active compound are known, or will be apparent, to those skilled in this art. For examples, see Remington's Pharmaceutical Sciences, Mack Publishing Company, Easter, Pa., 15th Edition (1975).

For tablet dosage forms, the agent may make up from 1 wt % to 80 wt % of the dosage form, more typically from 5 wt % to 60 wt % of the dosage form. In addition to the active agent, tablets generally contain a disintegrant. Examples of disintegrants include sodium starch glycolate, sodium carboxymethyl cellulose, calcium carboxymethyl cellulose, croscarmellose sodium, crospovidone, polyvinylpyrrolidone, methyl cellulose, microcrystalline cellulose, lower alkyl-substituted hydroxypropyl cellulose, starch, pregelatinized starch and sodium alginate. Generally, the disintegrant may comprise from 1 wt % to 25 wt %, preferably from 5 wt % to 20 wt % of the dosage form.

Binders are generally used to impart cohesive qualities to a tablet formulation. Suitable binders include microcrystalline cellulose, gelatin, sugars, polyethylene glycol, natural and synthetic gums, polyvinylpyrrolidone, pregelatinized starch, hydroxypropyl cellulose and hydroxypropyl methylcellulose. Tablets may also contain diluents, such as lactose (monohydrate, spray-dried monohydrate, anhydrous and the like), mannitol, xylitol, dextrose, sucrose, sorbitol, microcrystalline cellulose, starch and dibasic calcium phosphate dihydrate.

Tablets may also optionally include surface active agents, such as sodium lauryl sulfate and polysorbate 80, and glidants such as silicon dioxide and talc. When present, surface active agents are typically in amounts of from 0.2 wt % to 5 wt % of the tablet, and glidants typically from 0.2 wt % to 1 wt % of the tablet.

Tablets also generally contain lubricants such as magnesium stearate, calcium stearate, zinc stearate, sodium stearyl fumarate, and mixtures of magnesium stearate with sodium lauryl sulphate. Lubricants generally are present in amounts from 0.25 wt % to 10 wt %, preferably from 0.5 wt % to 3 wt % of the tablet.

Other conventional ingredients include anti-oxidants, colorants, flavoring agents, preservatives and taste-masking agents.

Exemplary tablets may contain up to about 80 wt % active agent, from about 10 wt % to about 90 wt % binder, from about 0 wt % to about 85 wt % diluent, from about 2 wt % to about 10 wt % disintegrant, and from about 0.25 wt % to about 10 wt % lubricant.

Tablet blends may be compressed directly or by roller to form tablets. Tablet blends or portions of blends may alternatively be wet-, dry-, or melt-granulated, melt congealed, or extruded before tableting. The final formulation may include one or more layers and may be coated or uncoated; or encapsulated.

The formulation of tablets is discussed in detail in "Pharmaceutical Dosage Forms: Tablets, Vol. 1," by H. Lieberman and L. Lachman, Marcel Dekker, N.Y., N.Y., 1980 (ISBN 0-8247-6918-X), the disclosure of which is incorporated herein by reference in its entirety.

Solid formulations for oral administration may be formulated to be immediate and/or modified release. Modified release formulations include delayed-, sustained-, pulsed-, controlled-, targeted and programmed release.

Suitable modified release formulations are described in U.S. Pat. No. 6,106,864. Details of other suitable release technologies such as high energy dispersions and osmotic and coated particles may be found in Verma et. al., Current Status of Drug Delivery Technologies and Future Directions, Pharmaceutical Technology On-line, 2001, 25(2), 1-14. The use of chewing gum to achieve controlled release is described in WO 2000/035298. The disclosures of these references are incorporated herein by reference in their entireties.

In one embodiment, a pharmaceutical composition useful for the combination therapy of the present invention comprises only a single therapeutic agent, for example either an ALK inhibitor or a CDK inhibitor, and is used in combination with another pharmaceutical composition comprising the second therapeutic agent.

In another embodiment, a pharmaceutical composition useful for the combination therapy of the present invention comprises both an ALK inhibitor and a CDK inhibitor.

In another embodiment, the pharmaceutical composition comprises a combination comprising, separately or together, an anaplastic lymphoma kinase (ALK) inhibitor, or a pharmaceutically acceptable salt thereof and a cyclin-dependent kinases (CDK) inhibitor, or a pharmaceutically acceptable salt thereof, and at least one excipient.

In one embodiment, such pharmaceutical composition of the present invention is for use in the treatment of cancer. In accordance with the present invention, the ALK inhibitor and a CDK inhibitor may be administered together in a single pharmaceutical composition (i.e., as a fixed dose combination), in one combined unit dosage form or in two separate unit dosage forms (i.e., as non-fixed dose combination), or sequentially. The unit dosage form may also be a fixed combination.

The pharmaceutical compositions according to the present invention for separate administration of both agents or for their administration in a fixed dose combination, may be prepared in a manner known per se and are those suitable for enteral, such as oral or rectal, topical, and parenteral administration to subjects, including mammals (warm-blooded animals) such as humans, comprising a therapeutically effective amount of at least one pharmacologically active combination partner alone, e.g., as indicated above, or in combination with one or more pharmaceutically acceptable carriers or diluents, especially suitable for enteral or parenteral application. Suitable pharmaceutical compositions contain, e.g., from about 0.1% to about 99.9%, preferably from about 1% to about 60%, of the active ingredient(s).

Pharmaceutical compositions for the combination therapy for enteral or parenteral administration are, e.g., those in unit dosage forms, such as sugar-coated tablets, tablets, capsules or suppositories, ampoules, injectable solutions or injectable suspensions. Topical administration is e.g., to the skin or the eye, e.g., in the form of lotions, gels, ointments or creams, or in a nasal or a suppository form. If not indicated otherwise, these are prepared in a manner known per se, e.g., by means of conventional mixing, granulating, sugar-coating, dissolving or lyophilizing processes. It will be appreciated that the unit content of each agent contained in an individual dose of each dosage form need not in itself constitute an effective amount since the necessary effective amount can be reached by administration of a plurality of dosage units.

Pharmaceutical compositions may comprise one or more pharmaceutical acceptable carriers or diluents and may be manufactured in conventional manner by mixing one or both combination partners with a pharmaceutically acceptable carrier or diluent. Examples of pharmaceutically acceptable diluents include, but are not limited to, lactose, dextrose, mannitol, and/or glycerol, and/or lubricants and/or polyethylene glycol. Examples of pharmaceutically acceptable binders include, but are not limited to, magnesium aluminum silicate, starches, such as corn, wheat or rice starch, gelatin, methylcellulose, sodium carboxymethylcellulose and/or polyvinylpyrrolidone, and, if desired, pharmaceutically acceptable disintegrators include, but are not limited to, starches, agar, alginic acid or a salt thereof, such as sodium alginate, and/or effervescent mixtures, or adsorbents, dyes, flavorings and sweeteners. It is also possible to use the compounds of the present invention in the form of parenterally administrable compositions or in the form of infusion solutions. The pharmaceutical compositions may be sterilized and/or may comprise excipients, for example preservatives, stabilizers, wetting compounds and/or emulsifiers, solubilisers, salts for regulating the osmotic pressure and/or buffers.

The effective dosage of each of agents employed in the combination of the invention may vary depending on the particular compound or pharmaceutical composition employed, the mode of administration, the condition being treated, the severity of the condition being treated. Thus, the dosage regimen of the combination of the invention is selected in accordance with a variety of factors including type, species, age, weight, sex and medical condition of the patient; the severity of the condition to be treated; the route of administration; the renal and hepatic function of the patient; and the particular compound employed. A physician, clinician or veterinarian of ordinary skill can readily determine and prescribe the effective amount of the drug required to prevent, counter or arrest the progress of the condition. Optimal precision in achieving concentration of drug within the range that yields efficacy requires a regimen based on the kinetics of the drug's availability to target sites. This involves a consideration of the distribution, equilibrium, and elimination of a drug.

For purposes of the present invention, a therapeutically effective dose will generally be a total daily dose administered to a host in single or divided doses. The compound of formula (I) may be administered to a host in a daily dosage range of, for example, from about 0.05 to about 50 mg/kg body weight of the recipient, preferably about 0.1-25 mg/kg body weight of the recipient, more preferably from about 0.5 to 10 mg/kg body weight of the recipient. Agent (b) may be administered to a host in a daily dosage range of, for example, from about 0.001 to 1000 mg/kg body weight of the recipient, preferably from 1.0 to 100 mg/kg body weight of the recipient, and most preferably from 1.0 to 50 mg/kg body weight of the recipient. Dosage unit compositions may contain such amounts of submultiples thereof to make up the daily dose.

Kits

The present invention is also directed to a kit for preparation of and use of agents as disclosed herein comprising one or more ALK inhibitors and one or more CDK inhibitors. In one aspect, the agents of the combination therapies of the present invention may conveniently be combined in the form of a kit suitable for coadministration of the agents. The kit may be particularly suitable for administering different dosage forms, for example, oral and parenteral, for administering the separate therapeutic agents at different dosage intervals, or for titrating the separate therapeutic agents against one another.

The agents of the kit can then, e.g., be administered either sequentially, simultaneously or concurrently, as mixed or individual dosages. For example, the agents of the kit may be administered chronologically staggered, that is at different time points and with equal or different time intervals for therapeutic agents of the kit.

The ratio of the total amounts of the agents to be administered in the combined preparation or combination therapy can be varied, e.g., in order to cope with the needs of a patient sub-population to be treated or the needs of the single patient.

In one embodiment, the kit of the present invention may comprise the following components: an ALK inhibitor, or a pharmaceutically acceptable salt thereof, and a pharmaceutically acceptable carrier; and a CDK inhibitor, or a pharmaceutically acceptable salt thereof, and a pharmaceutically acceptable carrier; wherein the CDK inhibitor is a CDK4/6 inhibitor, or a CDK2/4/6 inhibitor.

In one embodiment, the kit of the present invention may comprise the following components: an ALK inhibitor, or a pharmaceutically acceptable salt thereof, and a pharmaceutically acceptable carrier; and a CDK inhibitor, or a pharmaceutically acceptable salt thereof, and a pharmaceutically acceptable carrier; wherein the CDK inhibitor is a CDK4/6 inhibitor, or a CDK2/4/6 inhibitor; wherein the components are provided in a form which is suitable for simultaneous, separate and/or sequential administration.

In one embodiment, the kit of the present invention may comprise one or both of the agents in the form of a pharmaceutical composition, which pharmaceutical composition comprises an ALK inhibitor, or a pharmaceutically acceptable salt thereof, and a pharmaceutically acceptable carrier and a CDK inhibitor, or a pharmaceutically acceptable salt thereof, and a pharmaceutically acceptable carrier. The kit may contain means for separately retaining said compositions, such as a container, divided bottle, or divided foil packet.

In one embodiment, the kit of the present invention may comprise a first container, a second container, and a "package insert" or "instructions for use," wherein the first container comprises at least one dose of an ALK inhibitor, or a pharmaceutically acceptable salt thereof, and a pharmaceutically acceptable carrier; the second container comprises at least one dose of a CDK inhibitor, or a pharmaceutically acceptable salt thereof, and a pharmaceutically acceptable carrier; wherein the CDK inhibitor is a CDK4/6 inhibitor, or a CDK2/4/6 inhibitor; and the package insert comprises instructions for treating a subject for cancer using the kit.

"Instructions for use" typically includes information, such as dosage, administration instructions, e.g., a tangible expression describing the technique to be employed in using the kit to effect a desired outcome, such as to decrease or kill a tumor. Such dosage and administration instructions can be of the kind that are provided to a doctor, for example by a drug product label, or they can be of the kind that are provided by a doctor, such as instructions to a patient. Optionally, the kit also contains other useful components, such as, diluents, buffers, syringes, IV bags and lines, needles catheters, applicators, pipetting or measuring tools, bandaging materials or other useful paraphernalia as will be readily recognized by those of skill in the art.

Further Therapeutic Agents

The efficacy of combinations described herein in certain tumors may be enhanced by combination with other approved or experimental cancer therapies, e.g., radiation, surgery, chemotherapeutic agents, targeted therapies, agents that inhibit other signaling pathways that are dysregulated in tumors, and other immune enhancing agents.

The methods, combinations, pharmaceutical compositions, and uses of the present invention may additionally comprise one or more additional anti-cancer agents, such as anti-tumor agents, anti-angiogenesis agents, signal transduction inhibitors and antiproliferative agents, which amounts are together effective in treating said cancer. In some such embodiments, the anti-tumor agent is selected from the group consisting of mitotic inhibitors, alkylating agents, anti-metabolites, intercalating antibiotics, growth factor inhibitors, radiation, cell cycle inhibitors, enzymes, topoisomerase inhibitors, biological response modifiers, antibodies, cytotoxics, anti-hormones, and the like.

In another embodiment, the anti-cancer agent is an anti-angiogenesis agent. Examples of anti-angiogenesis agents include for example VEGF inhibitors, VEGFR inhibitors, TIE-2 inhibitors, PDGFR inhibitors, angiopoetin inhibitors, PKCβ inhibitors, COX-2 (cyclooxygenase II) inhibitors, integrins (alpha-v/beta-3), MMP-2 (matrix-metalloproteinase 2) inhibitors, and MMP-9 (matrix-metalloproteinase 9) inhibitors. Preferred anti-angiogenesis agents include sunitinib (Sutent™), bevacizumab (Avastin™), axitinib (AG 13736), SU 14813 (Pfizer), and AG 13958 (Pfizer). Additional anti-angiogenesis agents include vatalanib (CGP 79787), Sorafenib (Nexavar™) pegaptanib octasodium (Macugen™), vandetanib (Zactima™), PF-0337210 (Pfizer), SU 14843 (Pfizer), AZD 2171 (AstraZeneca), ranibizumab (Lucentis™), Neovastat™ (AE 941), tetrathiomolybdata (Coprexa™), AMG 706 (Amgen), VEGF Trap (AVE 0005), CEP 7055 (Sanofi-Aventis), XL 880 (Exelixis), telatinib (BAY 57-9352), and CP-868,596 (Pfizer). Other anti-angiogenesis agents include enzastaurin (LY 317615), midostaurin (CGP 41251), perifosine (KRX 0401), teprenone (Selbex™) and UCN 01 (Kyowa Hakko). Other examples of anti-angiogenesis agents include celecoxib (Celebrex™), parecoxib (Dynastat™), deracoxib (SC 59046), lumiracoxib (Preige™), valdecoxib (Bextra™) rofecoxib (Vioxx™), iguratimod (Careram™), IP 751 (Invedus), SC-58125 (Pharmacia) and etoricoxib (Arcoxia™). Yet further anti-angiogenesis agents include exisulind (Aptosyn™), salsalate (Amigesic™), diflunisal (Dolobid™), ibuprofen (Motrin™) ketoprofen (Orudis™), nabumetone (Relafen™), piroxicam (Feldene™), naproxen (Aleve™, Naprosyn™), diclofenac (Voltaren™), indomethacin (Indocin™), sulindac (Clinoril™), tolmetin (Tolectin™), etodolac (Lodine™), ketorolac (Toradol™), and oxaprozin (Daypro™). Yet further anti-angiogenesis agents include ABT 510 (Abbott), apratastat (TMI 005), AZD 8955 (AstraZeneca), incyclinide (Metastat™), and PCK 3145 (Procyon). Yet further anti-angiogenesis agents include acitretin (Neotigason™) plitidepsin (Aplidine™), cilengtide (EMD 121974), combretastatin A4 (CA4P), fenretinide (4 HPR), halofuginone (Tempostatin™), Panzem™ (2-methoxyestradiol), PF-03446962 (Pfizer), rebimastat (BMS 275291), catumaxomab (Removab™), lenalidomide (Revlimid™), squalamine (EVIZON™), thalidomide (Thalomid™), Ukrain™ (NSC 631570), Vitaxin™ (MEDI 522), and zoledronic acid (Zometa™).

In another embodiment, the anti-cancer agent is a signal transduction inhibitor (e.g., inhibiting the means by which regulatory molecules that govern the fundamental processes of cell growth, differentiation, and survival communicated within the cell). Signal transduction inhibitors include small molecules, antibodies, and antisense molecules. Signal transduction inhibitors include for example kinase inhibitors (e.g., tyrosine kinase inhibitors or serine/threonine kinase inhibitors) and cell cycle inhibitors. More specifically signal transduction inhibitors include, for example, farnesyl protein transferase inhibitors, EGF inhibitor, ErbB-1 (EGFR), ErbB-2, pan erb, IGF1R inhibitors, MEK, c-Kit inhibitors, FLT-3 inhibitors, K-Ras inhibitors, PI3 kinase inhibitors, JAK inhibitors, STAT inhibitors, Raf kinase inhibitors, Akt inhibitors, mTOR inhibitor, P70S6 kinase inhibitors, inhibitors of the WNT pathway and so called multi-targeted kinase inhibitors. Preferred signal transduction inhibitors include gefitinib (Iressa™), cetuximab (Erbitux™), erlotinib (Tarceva™), trastuzumab (Herceptin™), sunitinib (Sutent™) imatinib (Gleevec™), and PD325901 (Pfizer). Additional examples of signal transduction inhibitors which may be used in conjunction with a compound of the invention and pharmaceutical compositions described herein include BMS 214662 (Bristol-Myers Squibb), Ionafarnib (Sarasar™), pelitrexol (AG 2037), matuzumab (EMD 7200), nimotuzumab (TheraCIM h-R3™), panitumumab (Vectibix™), Vandetanib (Zactima™) pazopanib (SB 786034), ALT 110 (Alteris Therapeutics), BIBW 2992 (Boehringer Ingelheim), and Cervene™ (TP 38). Other examples of signal transduction inhibitor include PF-2341066 (Pfizer), PF-299804 (Pfizer), canertinib (CI 1033), pertuzumab (Omnitarg™), Lapatinib (Tycerb™), pelitinib (EKB 569), miltefosine (Miltefosin™), BMS 599626 (Bristol-Myers Squibb), Lapuleucel-T (Neuvenge™), NeuVax™ (E75 cancer vaccine), Osidem™ (IDM 1), mubritinib (TAK-165), CP-724, 714 (Pfizer), panitumumab (Vectibix™), lapatinib (Tycerb™), PF-299804 (Pfizer), pelitinib (EKB 569), and pertuzumab (Omnitarg™). Other examples of signal transduction inhibitors include ARRY 142886 (Array Biopharm), everolimus (Certican™), zotarolimus (Endeavor™) temsirolimus (Torisel™), AP 23573 (ARIAD), and VX 680 (Vertex). Additionally, other signal transduction inhibitors include XL 647 (Exelixis), sorafenib (Nexavar™), LE-AON (Georgetown University), and GI-4000 (GlobeImmune). Other signal transduction inhibitors include ABT 751 (Abbott), alvocidib (flavopiridol), BMS 387032 (Bristol Myers), EM 1421 (Erimos), indisulam (E 7070), seliciclib (CYC 200), BIO 112 (Onc Bio), BMS 387032 (Bristol-Myers Squibb), PD 0332991 (Pfizer), and AG 024322 (Pfizer).

In another embodiment, the anti-cancer agent is an antineoplastic agent, also referred to as chemotherapeutic agent. Classical antineoplastic agents include, but are not limited to, hormonal modulators such as hormonal, anti-hormonal, androgen agonist, androgen antagonist and anti-estrogen therapeutic agents, histone deacetylase (HDAC) inhibitors, gene silencing agents or gene activating agents, ribonucleases, proteosomics, Topoisomerase I inhibitors, Camptothecin derivatives, Topoisomerase II inhibitors, alkylating agents, antimetabolites, poly(ADP-ribose) polymerase-1 (PARP-1) inhibitor, microtubulin inhibitors, antibiotics, plant derived spindle inhibitors, platinum-coordinated compounds, gene therapeutic agents, antisense oligonucleotides, vascular targeting agents (VTAs), and statins. Examples of classical antineoplastic agents used in combination therapy with a compound of the invention, optionally with one or more other agents include, but are not limited to, glucocorticoids, such as dexamethasone, prednisone, prednisolone, methylprednisolone, hydrocortisone, and progestins such as medroxyprogesterone, megestrol acetate (Megace), mifepristone (RU-486), Selective Estrogen Receptor Modulators (SERMs; such as tamoxifen, raloxifene, lasofoxifene, afimoxifene, arzoxifene, bazedoxifene, fispemifene, ormeloxifene, ospemifene, tesmilifene, toremifene, trilostane and CHF 4227 (Cheisi), Selective Estrogen-Receptor Downregulators (SERD's; such as fulvestrant), exemestane (Aromasin), anastrozole (Arimidex), atamestane, fadrozole, letrozole (Femara), gonadotropin-releasing hormone (GnRH; also commonly referred to as luteinizing hormone-releasing hormone [LHRH]) agonists such as buserelin (Suprefact), goserelin (Zoladex), leuprorelin (Lupron), and triptorelin (Trelstar), abarelix (Plenaxis), bicalutamide (Casodex), cyproterone, flutamide (Eulexin), megestrol, nilutamide (Nilandron), and osaterone, dutasteride, epristeride, finasteride, Serenoa repens, PHL 00801, abarelix, goserelin, leuprorelin, triptorelin, bicalutamide, tamoxifen, exemestane, anastrozole, fadrozole, formestane, letrozole, and combinations thereof. Other examples of classical antineoplastic agents used in combination with a compound of the invention include, but are not limited to, suberolanilide hydroxamic acid (SAHA, Merck Inc./Aton Pharmaceuticals), depsipeptide (FR901228 or FK228), G2M-777, MS-275, pivaloyloxymethyl butyrate and PXD-101, Onconase (ranpirnase), PS-341 (MLN-341), Velcade (bortezomib), 9-aminocamptothecin, belotecan, BN-80915 (Roche), camptothecin, diflomotecan, edotecarin, exatecan (Daiichi), gimatecan, 10-hydroxycamptothecin, irinotecan HCl (Camptosar), lurtotecan, Orathecin (rubitecan, Supergen), SN-38, topotecan, camptothecin, 10-hydroxycamptothecin, 9-aminocamptothecin, irinotecan, SN-38, edotecarin, topotecan, aclarubicin, adriamycin, amonafide, amrubicin, annamycin, daunorubicin, doxorubicin, elsamitrucin, epirubicin, etoposide, idarubicin, galarubicin, hydroxycarbamide, nemorubicin, novantrone (mitoxantrone), pirarubicin, pixantrone, procarbazine, rebeccamycin, sobuzoxane, tafluposide, valrubicin, Zinecard (dexrazoxane), nitrogen mustard N-oxide, cyclophosphamide, AMD-473, altretamine, AP-5280, apaziquone, brostallicin, bendamustine, busulfan, carboquone, carmustine, chlorambucil, dacarbazine, estramustine, fotemustine, glufosfamide, ifosfamide, KW-2170, lomustine, mafosfamide, mechlorethamine, melphalan, mitobronitol, mitolactol, mitomycin C, mitoxatrone, nimustine, ranimustine, temozolomide, thiotepa, and platinum-coordinated alkylating compounds such as cisplatin, Paraplatin (carboplatin), eptaplatin, lobaplatin, nedaplatin, Eloxatin (oxaliplatin, Sanofi), streptozocin, satrplatin, and combinations thereof.

In another embodiment, the anti-cancer agent is a so called dihydrofolate reductase inhibitors (such as methotrexate and NeuTrexin (trimetresate glucuronate)), purine antagonists (such as 6-mercaptopurine riboside, mercaptopurine, 6-thioguanine, cladribine, clofarabine (Clolar), fludarabine, nelarabine, and raltitrexed), pyrimidine antagonists (such as 5-fluorouracil (5-FU), Alimta (premetrexed disodium, LY231514, MTA), capecitabine (Xeloda™), cytosine arabinoside, Gemzar™ (gemcitabine, Eli Lilly), Tegafur (UFT Orzel or Uforal and including TS-1 combination of tegafur, gimestat and otostat), doxifluridine, carmofur, cytarabine (including ocfosfate, phosphate stearate, sustained release and liposomal forms), enocitabine, 5-azacitidine (Vidaza), decitabine, and ethynylcytidine) and other antimetabolites such as eflornithine, hydroxyurea, leucovorin, nolatrexed (Thymitaq), triapine, trimetrexate, N-(5-[N-(3,4-dihydro-2-methyl-4-oxoquinazolin-6-ylmethyl)-N-methylamino]-2-thenoyl)-L-glutamic acid, AG-014699 (Pfizer Inc.), ABT-472 (Abbott Laboratories), INO-1001 (Inotek Pharmaceuticals), KU-0687 (KuDOS Pharmaceuticals) and GPI 18180 (Guilford Pharm Inc) and combinations thereof.

Other examples of classical antineoplastic agents include, but are not limited to, Abraxane (Abraxis BioScience, Inc.), Batabulin (Amgen), EPO 906 (Novartis), Vinflunine (Bristol-Myers Squibb Company), actinomycin D, bleomycin, mitomycin C, neocarzinostatin (Zinostatin), vinblastine, vincristine, vindesine, vinorelbine (Navelbine), docetaxel (Taxotere), Ortataxel, paclitaxel (including Taxoprexin a DHA/paciltaxel conjugate), cisplatin, carboplatin, Nedaplatin, oxaliplatin (Eloxatin), Satraplatin, Camptosar, capecitabine (Xeloda), oxaliplatin (Eloxatin), Taxotere alitretinoin, Canfosfamide (Telcyta™), DMXAA (Antisoma), ibandronic acid, L-asparaginase, pegaspargase (Oncaspar™), Efaproxiral (Efaproxyn™-radiation therapy), bexarotene (Targretin™), Tesmilifene (DPPE—enhances efficacy of cytotoxics), Theratope™ (Biomira), Tretinoin (Vesanoid™), tirapazamine (Trizaone™), motexafin gadolinium (Xcytrin™) Cotara™ (mAb), and NBI-3001 (Protox Therapeutics), polyglutamate-paclitaxel (Xyotax™) and combinations thereof. Further examples of classical antineoplastic agents include, but are not limited to, as Advexin (ING 201), TNFerade (GeneVec, a compound which express TNFalpha in response to radiotherapy), RB94 (Baylor College of Medicine), Genasense (Oblimersen, Genta), Combretastatin A4P (CA4P), Oxi-4503, AVE-8062, ZD-6126, TZT-1027, Atorvastatin (Lipitor, Pfizer Inc.), Provastatin (Pravachol, Bristol-Myers Squibb), Lovastatin (Mevacor, Merck Inc.), Simvastatin (Zocor, Merck Inc.), Fluvastatin (Lescol, Novartis), Cerivastatin (Baycol, Bayer), Rosuvastatin (Crestor, AstraZeneca), Lovostatin, Niacin (Advicor, Kos Pharmaceuticals), Caduet, Lipitor, torcetrapib, and combinations thereof.

In some embodiments, the methods, combinations, pharmaceutical composition, and uses of the present invention, comprise a further active agent, wherein the further active agent is an endocrine agent, such as an aromatase inhibitor, a SERD or a SERM.

These and other aspects of the invention, including the exemplary specific embodiments listed below, will be apparent from the teachings contained herein.

EXAMPLES

Example 1: Durability of Response Study for Lorlatinib and Palbociclib, Alone and in Combination, in a Naïve ALK-Positive Non-Small Cell Lung Cancer (NSCLC) Cell Line Overview The effect of lorlatinib in combination with palbociclib on cell growth and durability of response (DOR) was assessed in drug sensitive H3122 cells.

Materials and Methods

The H3122 (EML4-ALK E13; A20) human NSCLC cell line was licensed from the National Institutes of Health (NIH). Cells were cultured using standard cell culture techniques. For DOR studies, the H3122 cells ($5 \times 10^5$) were plated in a T75 flask and treated with lorlatinib, palbociclib, or combinations at indicated concentrations shown in the corresponding figures. To increase the translatability of preclinical findings into the clinic, the clinically achievable dose for each drug was utilized in all studies. When cells reached ~70% confluency, they were trypsinized and counted. Then, $5 \times 10^5$ cells were plated in a new flask and cultured in the presence of the same drug treatments. Although only a small fraction of cells was carried through the entire course of the study, all cells from each split were considered for the calculation of total cell numbers. They were then plotted as total live cells at that time point. The procedure was repeated for weeks to months. Drugs were refreshed weekly and maintained continuously until the time required to reach a designated number of cells.

To represent 1 L ALK+ NSCLC treatments, two studies were conducted in naïve H3122 cells. In Study 1A, H3122 cells were treated with $2 \times IC_{50}$ of lorlatinib (5 nM total or 4 nM free) as the starting concentration. The lorlatinib concentration was doubled in a ~10-day interval for 3 times and set at the final dose of 250 nM (total, 205 nM free). The final concentration approximated the clinically achievable concentration of lorlatinib in human (~187 nM, free). The lorlatinib treatment schedule was either in the absence or presence of palbociclib (100 nM). The concentration of palbociclib was also at an approximation of clinical free drug exposure at the approved dose. The growth of cells was monitored through several weeks or months until a designated cell number was reached for DOR assessment.

In Study 1B, H3122 cells were treated with a single dose of lorlatinib at its clinically relevant concentration (250 nM total) with or without palbociclib (100 nM). Similar procedures were followed to allow recording cell numbers under treatment and assessing DOR over several weeks as described above.

Results

Figure 1B:
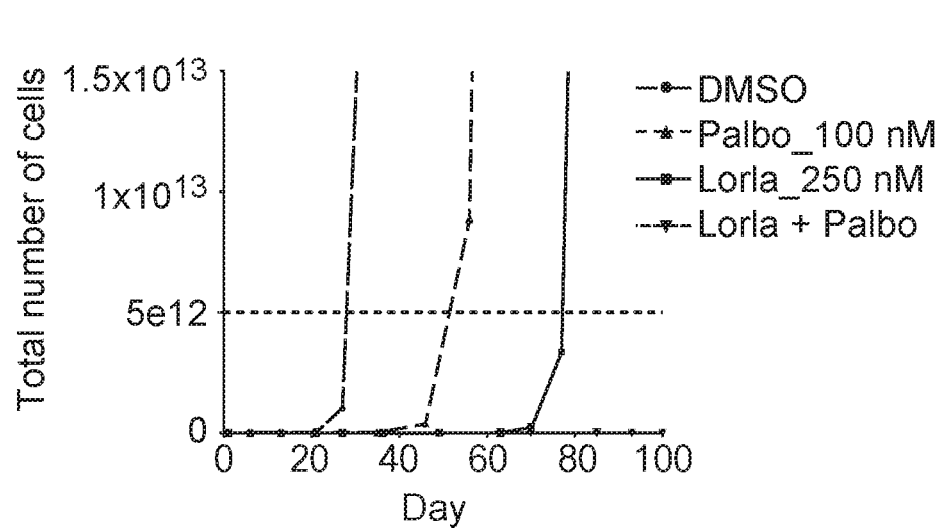
Figure 1B:
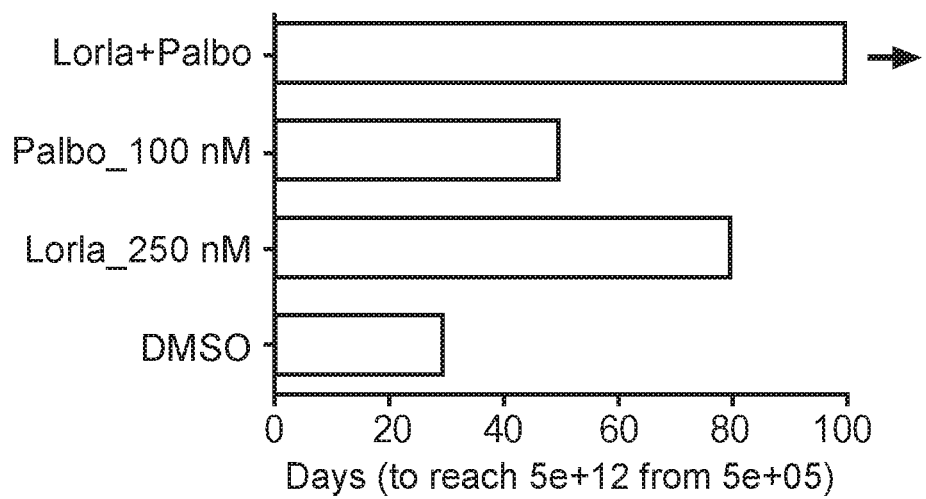

The DOR results for the H3122 cell line are shown in FIGS. 1A and 1B. The time required to reach a specific total cell number was least with DMSO treated cells, which served as the control for this study and represented the non-drug-impeded growth rate. Single agent palbociclib treatment showed a modest delay compared to the control, whereas single agent lorlatinib showed a greater delay due to its high potency on naïve cells, requiring more time to reach the same number of cells as compared to the control, representing the time required for lorlatinib resistant growth to emerge. The combination of lorlatinib and palbociclib showed the most significant delay, representing further impedance of time to resistance with the addition of palbociclib.

Table 1 shows the results of two independent experiments in ALKi sensitive NSCLC cells that determined the number of days required for cells to grow from $5 \times 10^5$ to a designated number ($5 \times 10^{12}$) under different treatment conditions.

TABLE 1

| Treatment | Time elapsed (day) | |
|---|---|---|
| | H3122 (Study 1A) | H3122 (Study 1B) |
| DMSO | 27 | 30 |
| Lorla | 60 | 80 |
| Palbo | 39 | 50 |
| Lorla + Palbo | >85 | >100 |

Conclusions

The combination of lorlatinib and palbociclib significantly increased the durability of response as compared to a single agent treatment in the H3122 cell line, which is a NSCLC cell line model representing the 1 L ALK+ NSCLC patient population.

Example 2: Generation and Characterization of ALK Inhibitor (ALKi) Resistant NSCLC Cell Lines for DOR Studies Overview ALKi-resistant cell lines were developed using in vitro experimental approaches. Selected cell clones were characterized for ALK-dependent resistance mechanism and sensitivity to crizotinib and lorlatinib.

Materials and Methods

H3122 cells were exposed to crizotinib (100-1000 nM, gradual increase), lorlatinib (100 nM, single dose) or alectinib (1000 nM, single dose) for more than 2 months. Individual clones were selected and expanded for subsequent analysis for ALK-dependent resistance mechanisms (i.e., secondary ALK kinase domain mutations or ALK amplification).

Mutation analysis was conducted by targeted sequencing. Genomic DNA was isolated from cell pellets with a Qiagen DNeasy Kit (Qiagen) according to the manufacturer's protocol. Exons 21 to 27 corresponding to the ALK tyrosine kinase domain were PCR-amplified. The DNA concentration for each amplicon was quantified on an Agilent Bioanalyzer using the DNA 1000 chip (Agilent Technologies). Barcoded PCR amplicon templates were pooled at equimolar concentrations and sequenced bi-directionally on an Ion Torrent PGM (Life Technologies). A library with a total of $2 \times 10^8$ DNA molecules was constructed. The barcode-specific sample data was analyzed by Life Technologies Torrent Suite version 2.2. Exported BAM files were reviewed using Broad Institute's Integrative Genomics Viewer (IGV) version 2.1. In IGV, the "Coverage allele-freq threshold" was set to 0.01, and the "Shade mismatched bases by quality" was set to 0 to 20 (Huang D., et. al., Multiplexed deep sequencing analysis of ALK kinase domain identifies resistance mutations in relapsed patients following crizotinib treatment. Genomics. 2013, 102:157-62.) The detection of copy number variants was conducted using Genome-Wide Human SNP Array 6.0 according to the manufacturer's protocol.

In cell-based viability assays, four cell lines were seeded in 96-well plates at 2,000-4,000 cells/well in growth media supplemented with 10% FBS. Serial dilutions of test compounds were performed in DMSO, and controls or designated concentrations of test compounds were added to each well. Cells were incubated at 37° C. for 3-7 days (final DMSO content 0.1%). A Cell Titer-Glo® Luminescent Cell Viability Assay (Promega) was then performed to determine cell viability. $IC_{50}$ values were calculated using the sigmoidal dose-response (variable slope) in GraphPad Prism (GraphPad Software).

Results

Figure 2A:
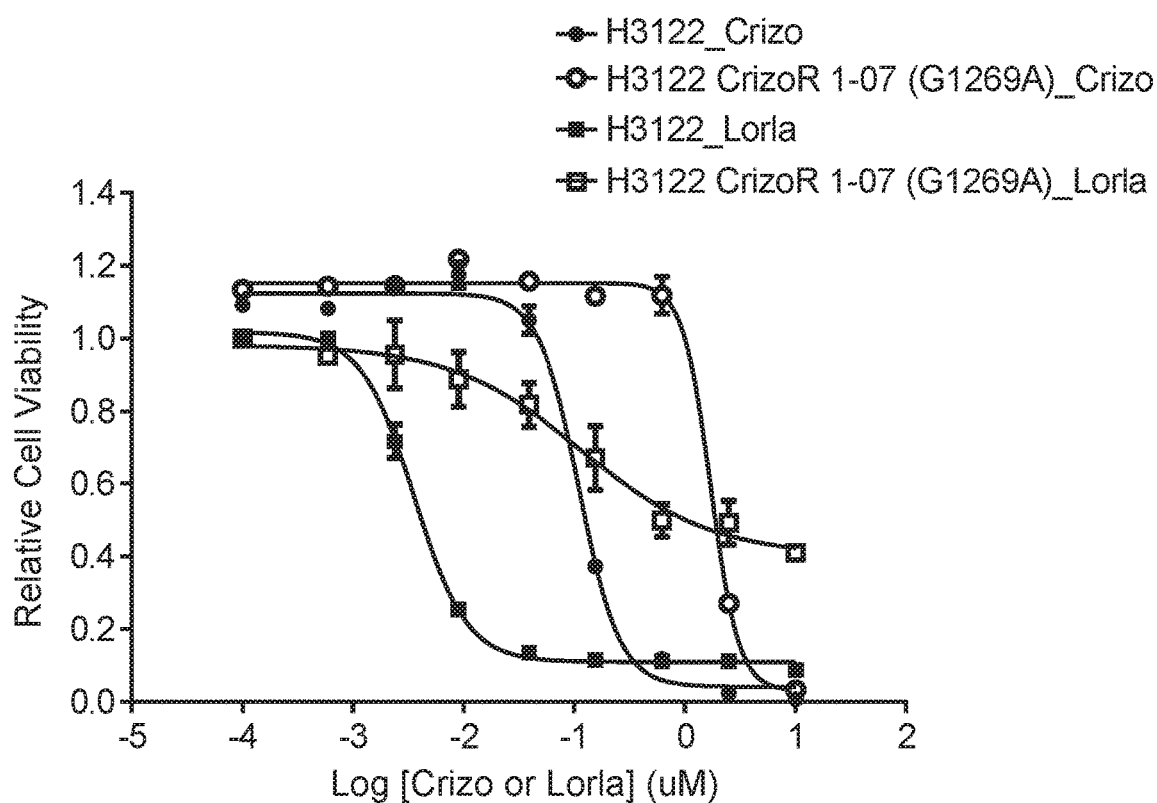
FIGS. 2A, 2B and 2C show sensitivity to crizotinib or lorlatinib in parental and selected crizotinib or lorlatinib-resistant H3122 cells.
Figure 2B:
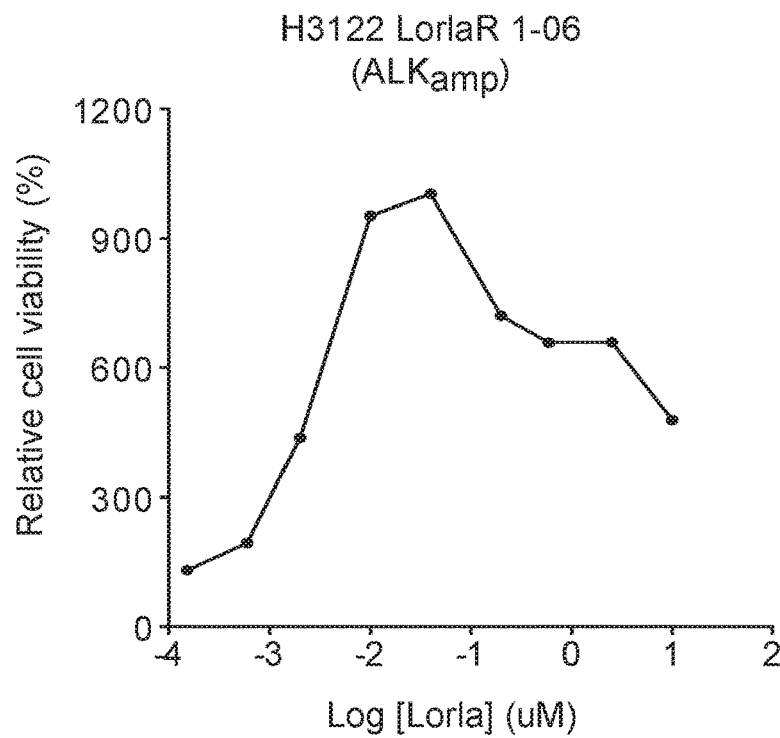
Figure 2C:
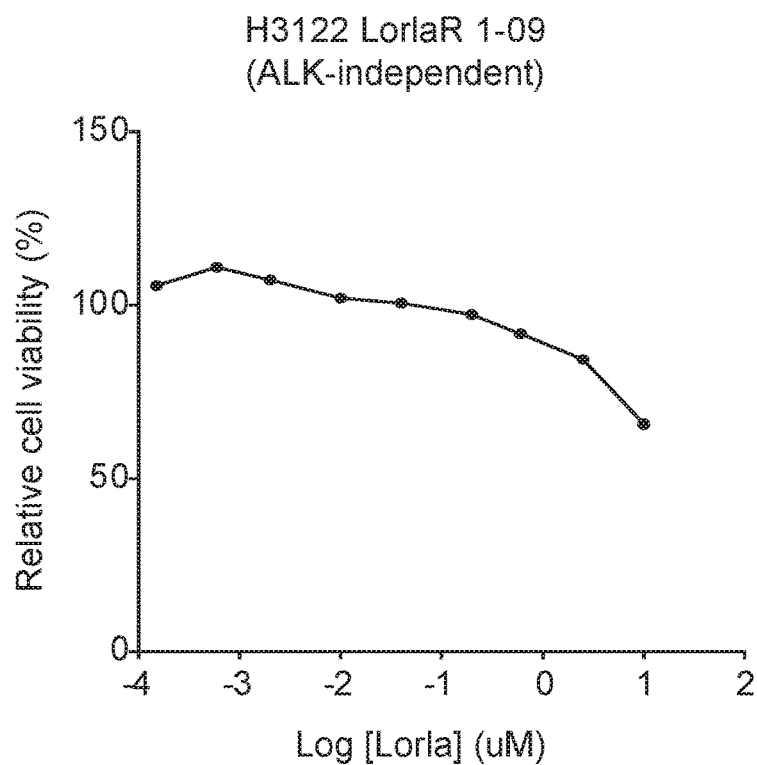

Out of ~30 crizotinib resistant clones analyzed, H3122 CrizoR 1-07 (G1269A) was identified to harbor a secondary ALK mutation (G1269A). This mutation has been previously reported in crizotinib relapsed patients (Doebele R C, et. al., Mechanisms of resistance to crizotinib in patients with ALK gene rearranged non-small cell lung cancer. Clinical cancer research. 2012, 18:1472-82; Gainor J F, et. al., Molecular Mechanisms of Resistance to First- and Second-Generation ALK Inhibitors in ALK-Rearranged Lung Cancer. Cancer discovery. 2016, 6:1118-33). In comparison to the parental cells H3122, $IC_{50}$ of crizotinib resistant H3122 CrizoR 1-07 (G1269A) cells showed a >15-fold increase when treated with increasing concentrations of crizotinib or lorlatinib (FIG. 2A). Lorlatinib resistant H3122 LorlaR 1-09 cells harbored no secondary ALK kinase mutations. These cells were completely insensitive to lorlatinib treatment (FIG. 2B), suggesting the presence of ALK-independent resistance mechanisms. Lorlatinib resistant H3122 LorlaR 1-06 cells harbored ALK amplification which was also implicated in ALK inhibitor resistance in the clinic. These cells displayed a biphasic growth curve, where low dose lorlatinib (<100 nM) stimulated cell growth while high dose (>100 nM) inhibited it (FIG. 2C).

Conclusions

Several ALKi resistant clones developed in the in vitro experimental system displayed representative resistance mechanisms (i.e., secondary ALK kinase domain mutations and ALK amplification) observed in the clinic. The cells were resistant to ALKi inhibitors, such as crizotinib and lorlatinib.

Example 3: Durability of Response Study for Lorlatinib and Palbociclib, Alone and in Combination, in Several Lorlatinib, Crizotinib or Alectinib-Resistant Models Derived from H3122

Overview

Selected ALKi-resistant cell lines representing 2 L post lolratinib, crizotinib or alectinib were employed in studies to assess durability of response by lorlatinib plus palbociclib combinations.

Materials and Methods

Lorlatinib-resistant H3122 LorlaR 1-06 ($ALK_{amp}$), H3122 LorlaR 1-09 (ALK-independent), and H3122 LorlaR pool (uncharacterized resistance mechanisms) represented 2 L post lorlatinib settings. Crizotinib-resistant H3122 CrizoR 1-07 (G1269A) represented 2 L post crizotinib settings. Alectinib-resistant H3122 AlecR pool cells with uncharacterized resistance mechanisms represented 2 L post alectinib settings.

Cells were treated with lorlatinib at 250 nM (total) in the absence or presence of palbociclib (100 nM, total). Cell growth and DOR were assessed over several weeks as previously described.

Results

Figure 3A:
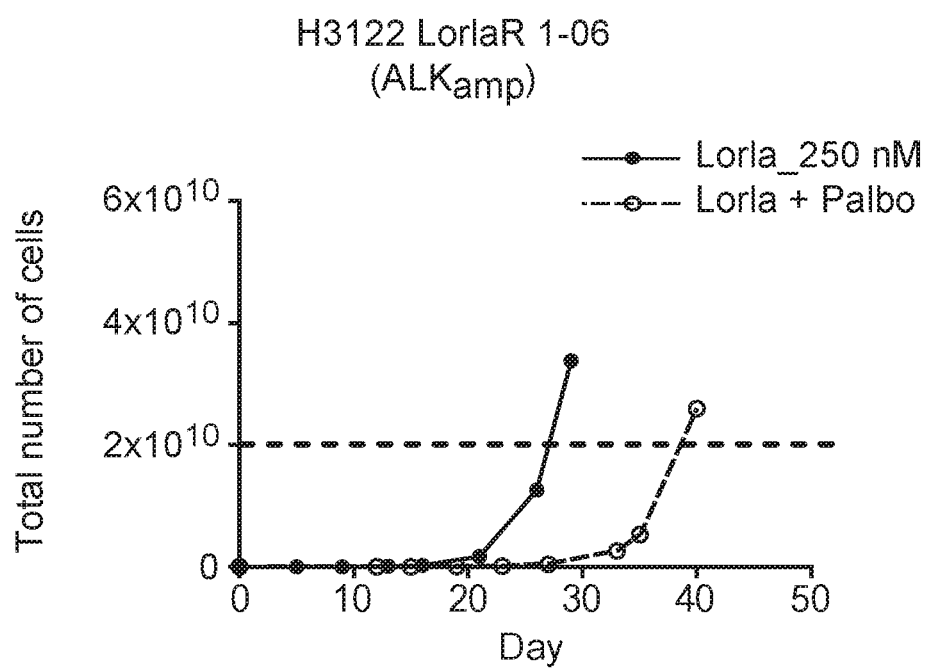
FIGS. 3A, 3B, 3C, 3D, 3E and 3F show improved durability of response in H3122 Lorla-resistant cells by lorlatinib plus palbociclib vs. lorlatinib alone.
Figure 3B:
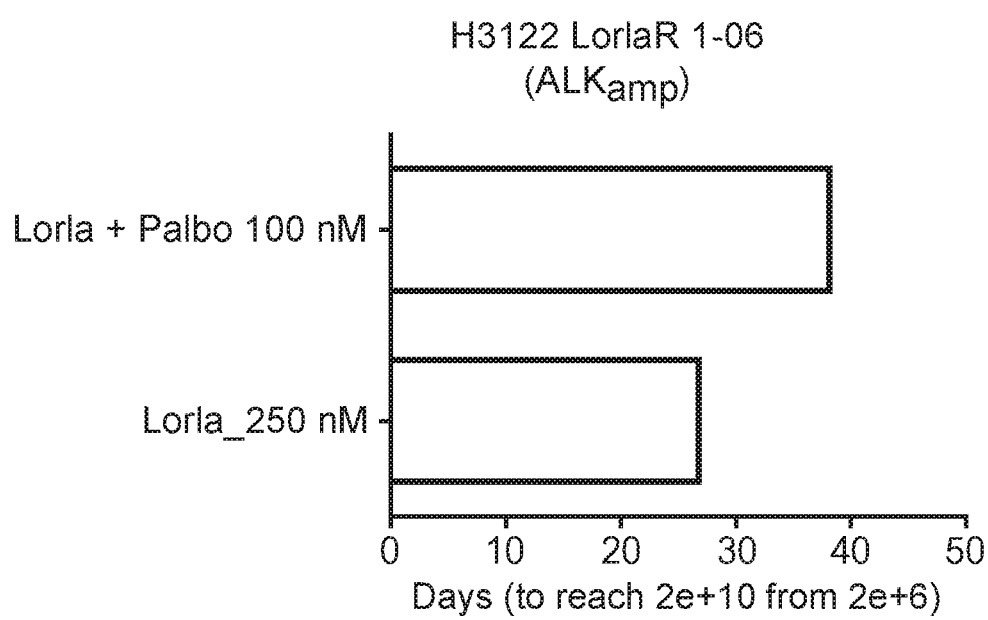
Figure 3C:
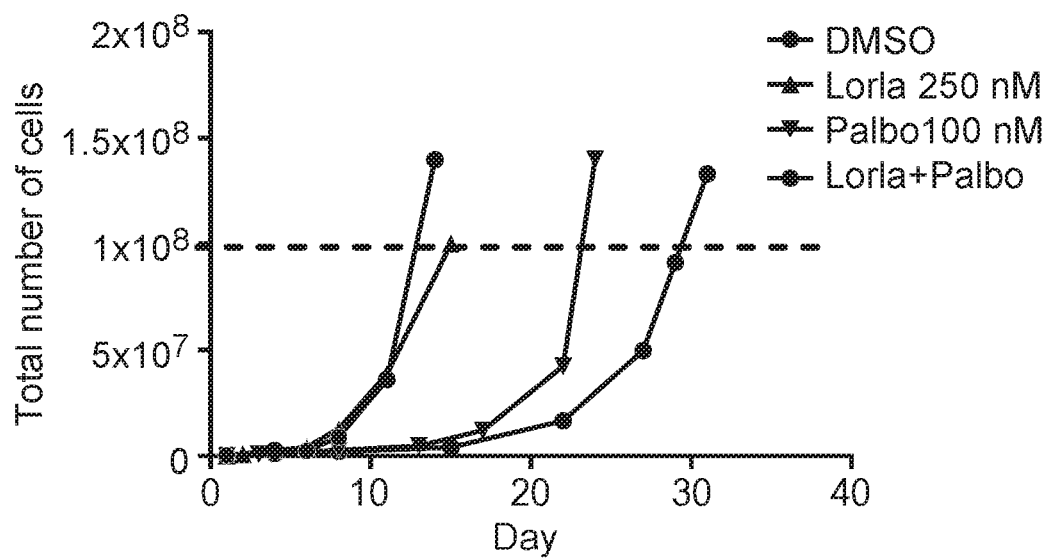
Figure 3D:
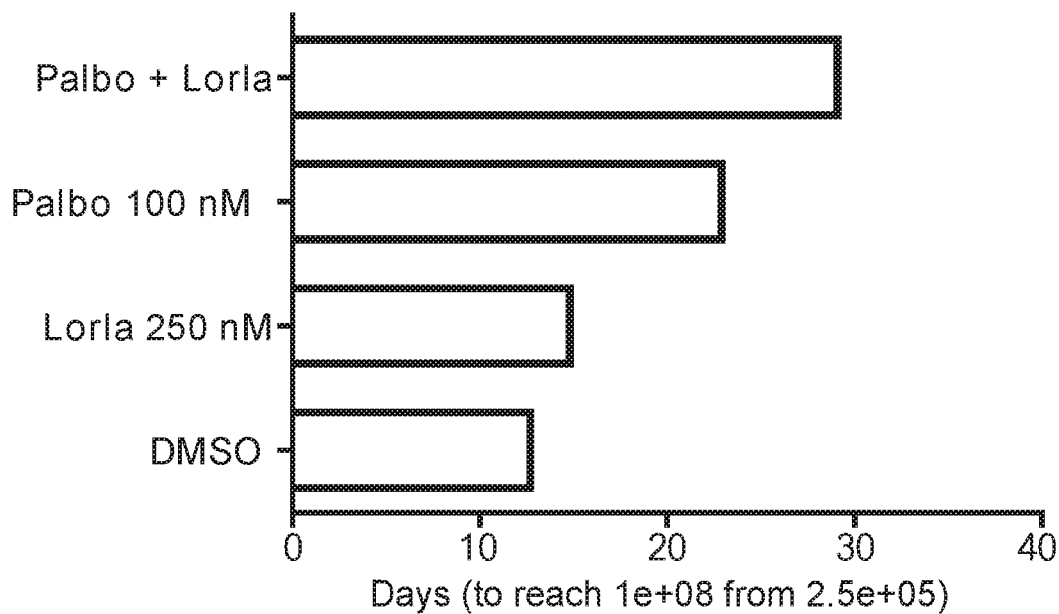
Figure 3E:
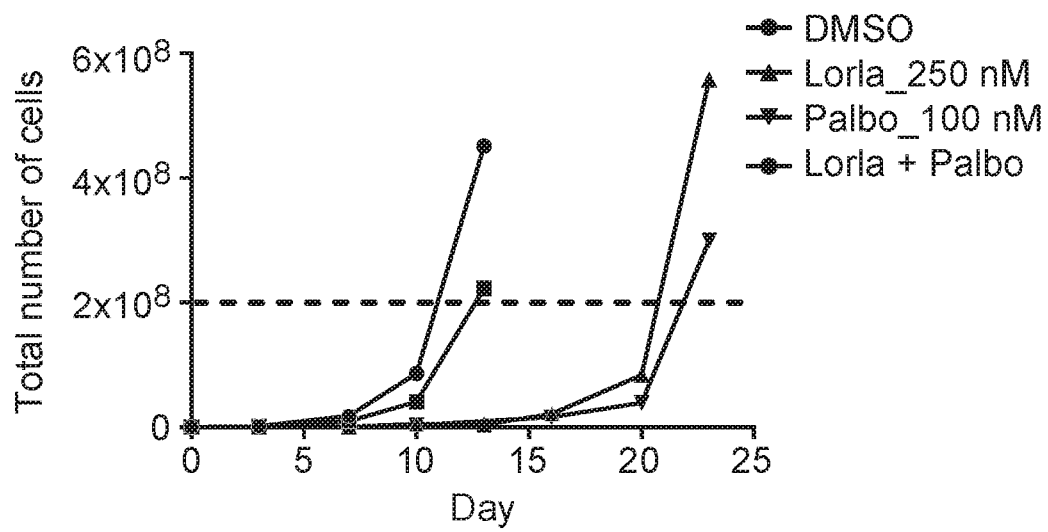
Figure 3F:
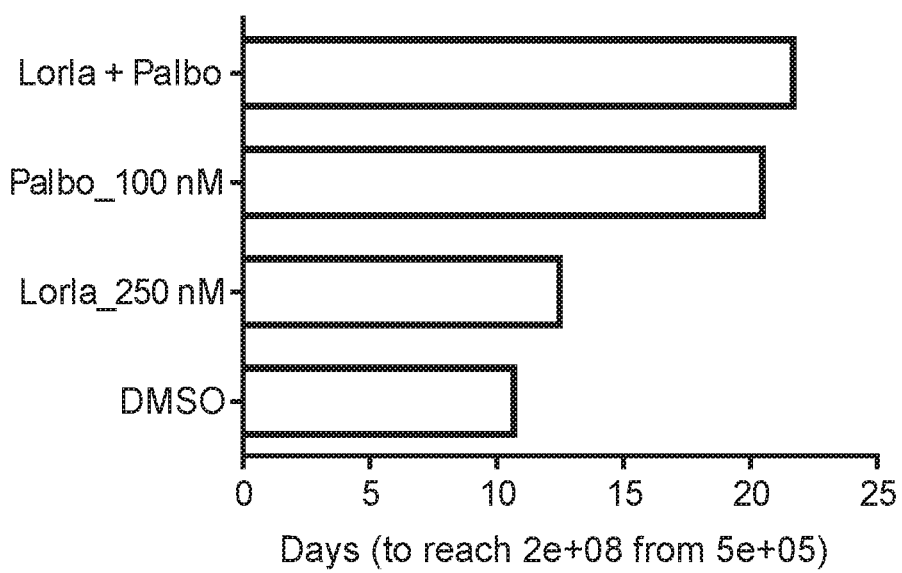

H3122 LorlaR 1-06 cells harbored amplification of ALK and their growth was addicted to lorlatinib. Therefore, DOR assessment was only available in two groups (combination vs. lorlatinib alone). A moderate effect on the growth delay was observed by combination vs. lorlatinib (FIGS. 3A and 3B). In lorlatinib-resistant cells driven by ALK-independent mechanisms, i.e., H3122 LorlaR 1-09 cells, palbociclib alone displayed a moderate growth inhibitory effect compared to lorlatinib. Combination treatment led to a greater growth delay vs. single agent treatment (FIGS. 3C and 3D). Comparable growth delay by palbociclib alone and combination was observed in H3122 LorlaR pool with mixed and unknown resistance mechanisms, indicating that the cells only responded to palbociclib but not lorlatinib treatment (FIGS. 3E and 3F).

Figure 4A:
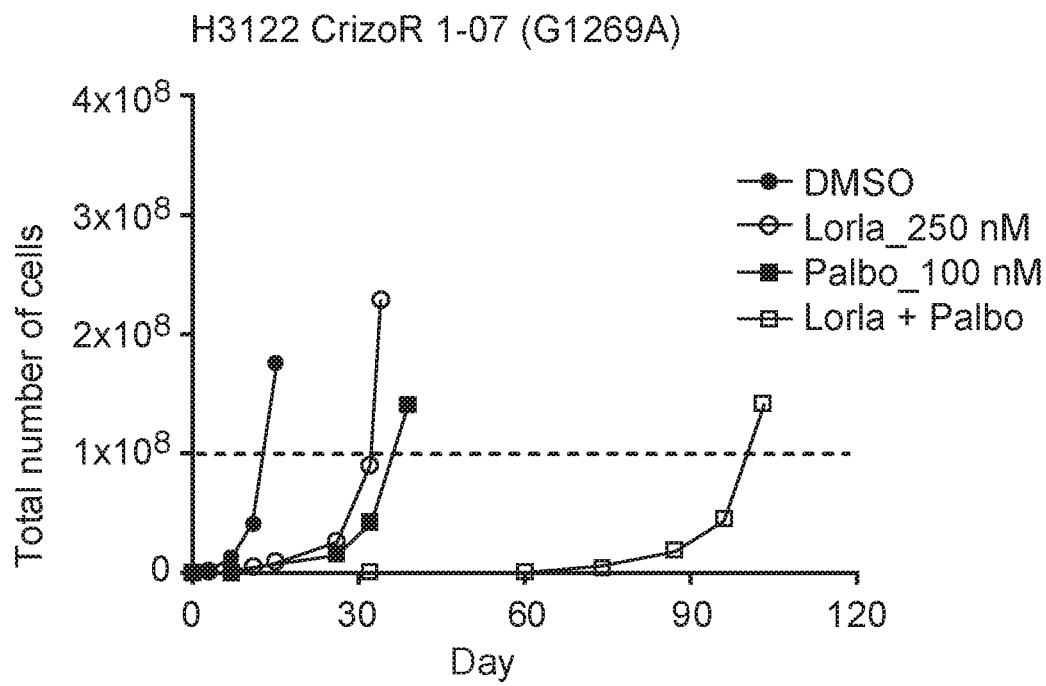
FIGS. 4A and 4B show improved durability of response in H3122 CrizoR 1-07 (G1269A) cells by lorlatinib plus palbociclib vs. lorlatinib alone.
Figure 4B:
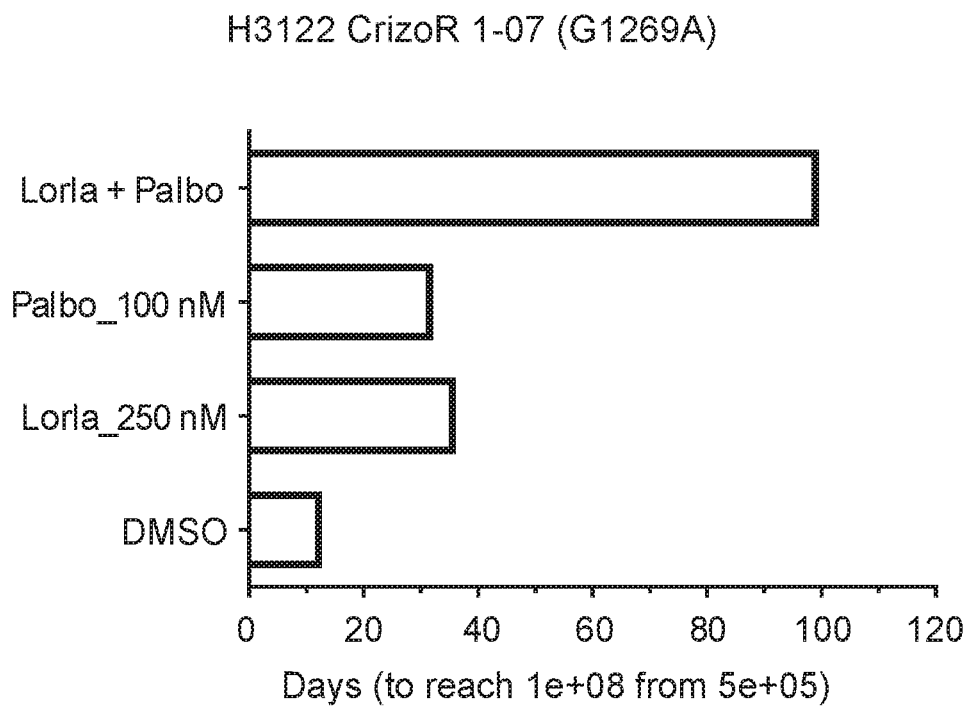

Previously, lorlatinib demonstrated strong potency on G1269A in BaF3 cells engineered to express this mutation ($IC_{50}$ of 36 nM) (Zhou et. al., PF-06463922, an ALK/ROS1 Inhibitor, Overcomes Resistance to First and Second Generation ALK Inhibitors in Preclinical Models. Cancer Cell, 2015, 28, 70-81). Lorlatinib was potent on H3122 CrizoR 1-07 (G1269A) with an $IC_{50}$ of 116 nM with 60% maximum inhibition (FIG. 2A). In the DOR assay, single agent lorlatinib and palbociclib were both effective on delaying the growth of H3122 CrizoR 1-07 (G1269A). Combination of the two drugs substantially increased the durability of response (FIGS. 4A and 4B).

Figure 5A:
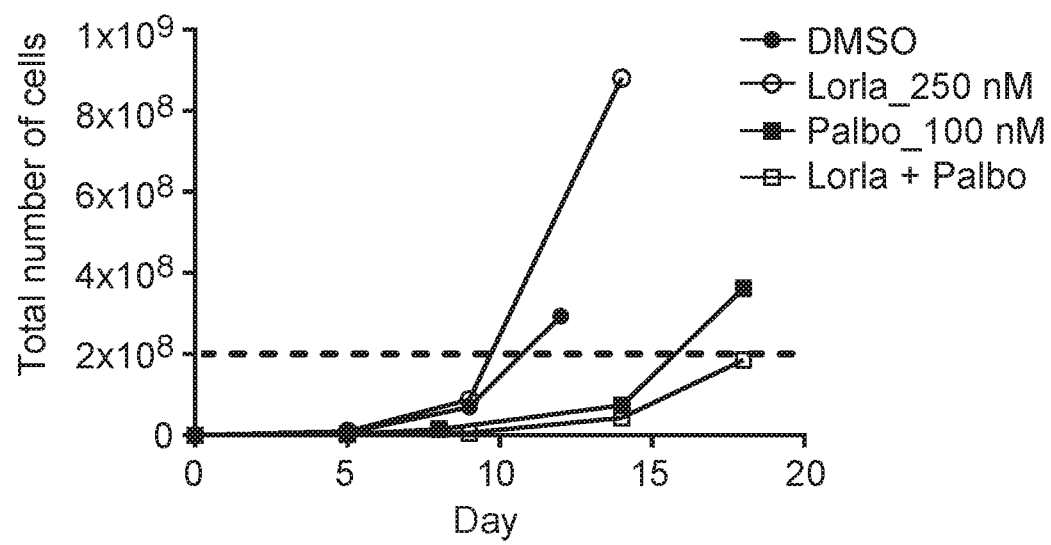
FIGS. 5A and 5B shows improved durability of response of alectinib-resistant cells by lorlatinib plus palbociclib.
Figure 5B:
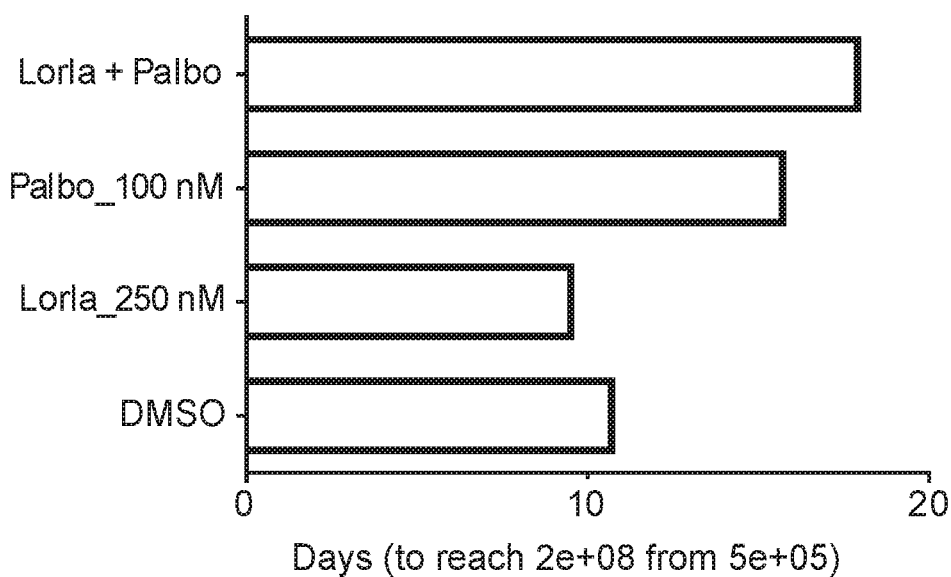

DOR studies using H3122 AlecR pool cells revealed that the cells were resistant to lorlatinib but sensitive to palbociclib treatment. A moderate delay in cell growth by palbociclib was observed, which was slightly increased by the combination treatment (FIGS. 5A and 5B).

Table 2 shows the results of the experiments in ALKi-resistant NSCLC cells that determined the number of days required for cells to grow from $5 \times 10^5$ to a designated number under different treatment conditions.

TABLE 2

| | Time elapsed (day) | | | | |
| --- | --- | --- | --- | --- | --- |
| Treatment | H3122 LorlaR 1-06 ($ALK_{amp}$) | H3122 LorlaR 1-09 (ALK-independent) | H3122 LorlaR pool | H3122 CrizoR 1-07 (G1269A) | H3122 AlecR pool |
| DMSO | N/A | 13 | 11 | 13 | 11 |
| Lorla | 27 | 15 | 13 | 36 | 10 |
| Palbo | N/A | 23 | 21 | 32 | 16 |
| Lorla + Palbo | 38 | 29 | 22 | 100 | 18 |

NA: not applicable

Conclusions

While the time to emergence of resistant cell growth varied among these cell lines harboring various resistance mechanisms and representing patients from different lines of therapies, increase in DOR by palbociclib alone or in combination with lorlatinib was reproducible and consistent across independent experiments in each cell line.

Example 4: Anti-Tumor Efficacy Study for Lorlatinib and Palbociclib, Alone and in Combination, in a Crizotinib-Resistant NSCLC Xenograft Model Overview The in vivo anti-tumor efficacy of lorlatinib plus palbociclib combination compared to each single agent was assessed in the H3122 CrizoR 1-07 (G1269A) xenograft model.

Material and Methods

Female athymic mice (Nu/Nu, 6-8-week, Charles River Laboratories) were used for the in vivo study. All procedures were conducted in accordance with the Institute for Laboratory Animal Research Guide for the Care and Use of Laboratory Animals.

Tumor cells were supplemented with 50% Matrigel (BD Biosciences) to facilitate tumor take and growth as xenografts. Cells (~5×10$^6$ in 200 µL) were implanted subcutaneously (s.c.) into the hind flank region of the mouse and allowed to grow to the designated size prior to the administration of test agent for each experiment. When tumor volumes reached 150-200 mm$^3$, mice were randomized into study groups with 10 mice per group. Animals were treated with vehicle, lorlatinib (1.5 mpk, PO, BID), palbociclib (70 mpk, PO, QD) or the combination. Each drug was administered at a dose or regimen to yield exposure equivalent to that in humans (lorlatinib), or exposure to achieve pharmacodynamic marker modulation equivalent to that in humans (palbociclib). Tumor growth was monitored twice weekly by caliper measurement, and percentage of tumor growth inhibition (TGI) was calculated as $100*[1-(Treated_{Day\ Last}-Treated_{Day\ First})/(Control_{Day\ Last}-Control_{Day\ First})]$. An analysis of covariance (ANCOVA) method was used on the log transformed tumor volume to assess the statistical significance of the treatment effect after adjusting for baseline values.

Results

Figure 6:
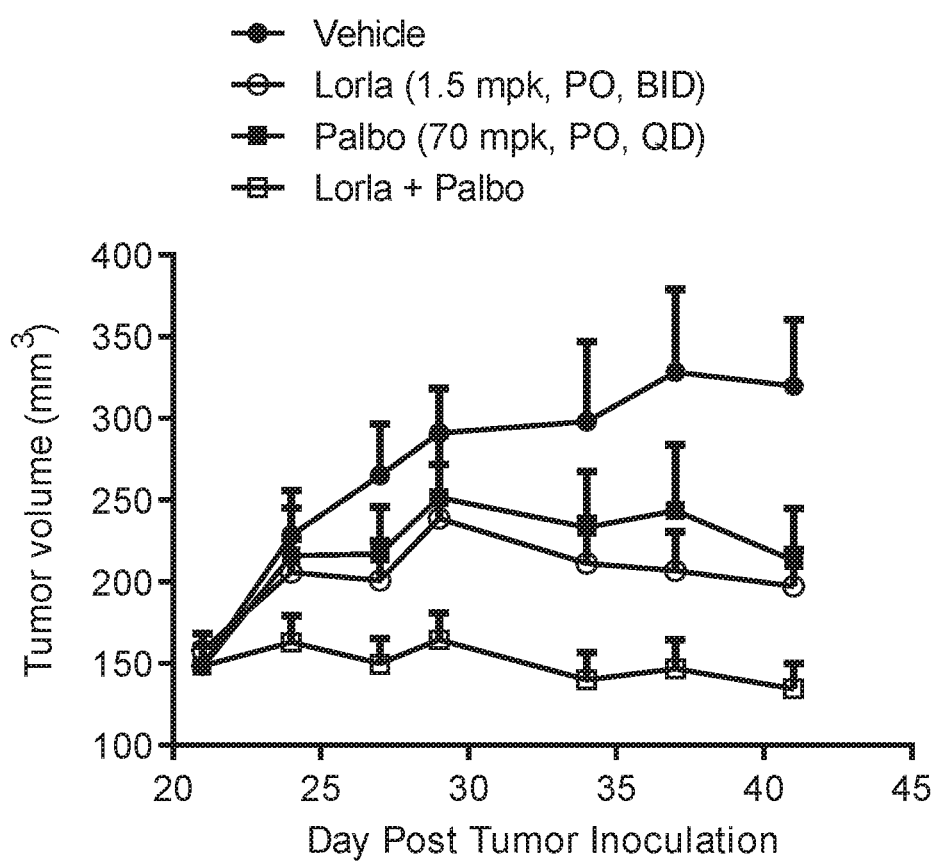
FIG. 6 shows improved in vivo efficacy of lorlatinib in H3122 CrizoR 1-07 (G1269A) model of lorlatinib plus palbociclib vs. lorlatinib alone.

H3122 CrizoR 1-07 (G1269A) tumors responded to lorlatinib or palbociclib single agent treatments similarly, with tumor growth inhibition (TGI) of 77% or 62%, respectively, on day 42 post tumor inoculation. The combination of lorlatinib plus palbociclib yielded a TGI of 108%, which was significantly better than that from lorlatinib or palbociclib treatment alone (P<0.05) (FIG. 6). The TGI results are summarized in Table 3.

Table 3 shows percentage of tumor growth inhibition (% TGI) by lorlatinib+palbociclib in H3122 CrizoR 1-07 (G1269A) xenograft model.

TABLE 3

| Treatment | % TGI | P value (combo vs. lorla) | P value (combo vs. palbo) |
|---|---|---|---|
| Vehicle | 0% | NA | NA |
| Lorla | 77% | NA | NA |
| Palbo | 62% | NA | NA |
| Lorla + Palbo | 108% | 0.007 | 0.029 |

NA: not applicable

Conclusions

The combination showed enhanced anti-tumor efficacy in a tumor model representing the crizotinib-resistant patient population harboring a secondary ALK kinase domain mutation.

Example 5: Sensitivity of Patient-Derived ALKi-Resistant NSCLC Cells to ALK Inhibitors and PF-06873600

Overview

The sensitivity to ALKi and PF-06873600 single agent was characterized in three patient-derived ALKi-resistant NSCLC cell lines, including MGH048-4F (Crizo/Alec/LorlaR), MGH902-1C (Crizo/CeriR) and MGH979-6.7R8 (AlecR, G1202R).

Materials and Methods

MGH048-4F (Crizo/Alec/LorlaR), MGH902-1C (Crizo/CeriR) and MGH979-6.7R8 (AlecR, G1202R) were acquired from MGH through a research contract. Specimens from patients relapsed on various lines ALK inhibitor therapies were utilized to derive the cell lines. Cells were cultured using standard cell culture techniques. The cells were tested against increasing concentrations of several ALK inhibitors and PF-06873600. Cell viability and IC$_{50}$ were measured in standard CyQUANT cell proliferation assays.

Results

Figure 7A:
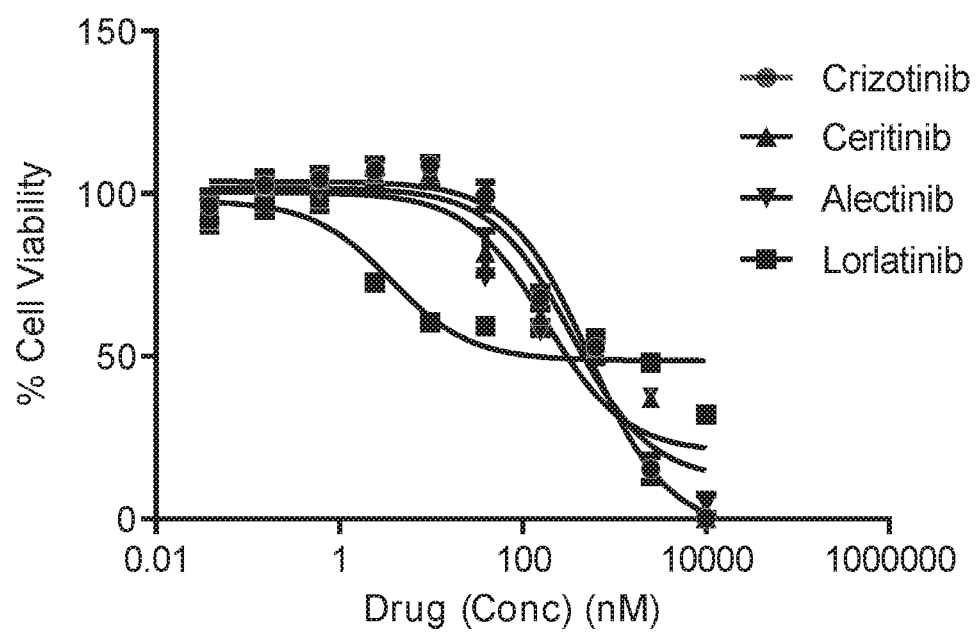
FIGS. 7A, 7B, 7C, 7D, 7E and 7F show sensitivity of patient-derived ALKi-resistant NSCLC cells to single agents of ALK inhibitors and PF-06873600.
Figure 7B:
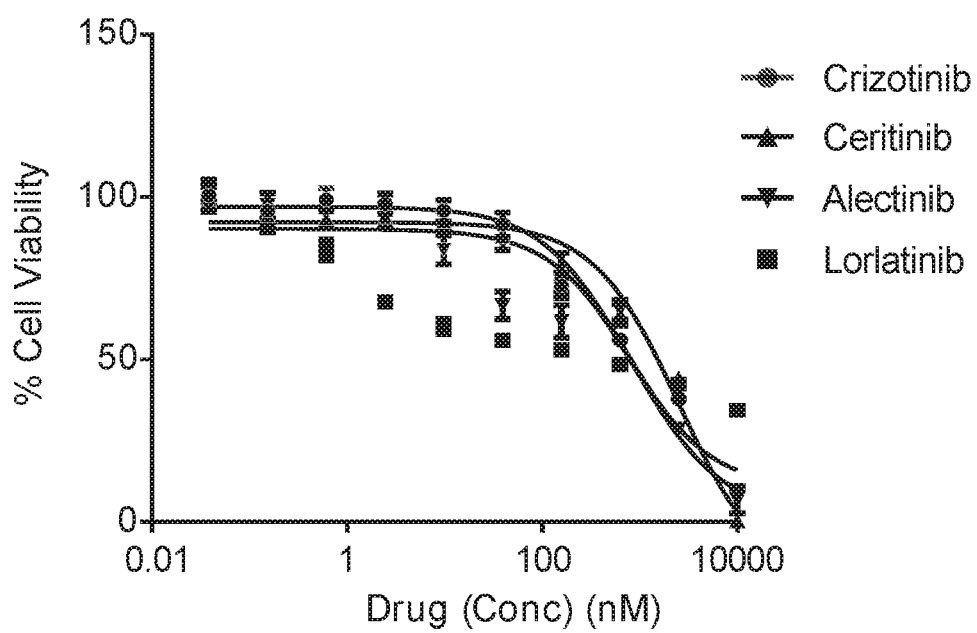

Two lines MGH048-4F (Crizo/Alec/LorlaR) and MGH902-1C (Crizo/CeriR) did not harbor a secondary ALK mutation. Hence, resistance of the cells was likely driven by ALK-independent mechanisms. When tested against multiple ALK inhibitors, these cells were resistant to crizotinib, ceritinib and alectinib (FIGS. 7A & B). They were partially sensitive to lorlatinib with an incomplete inhibition at 10 µM.

Figure 7C:
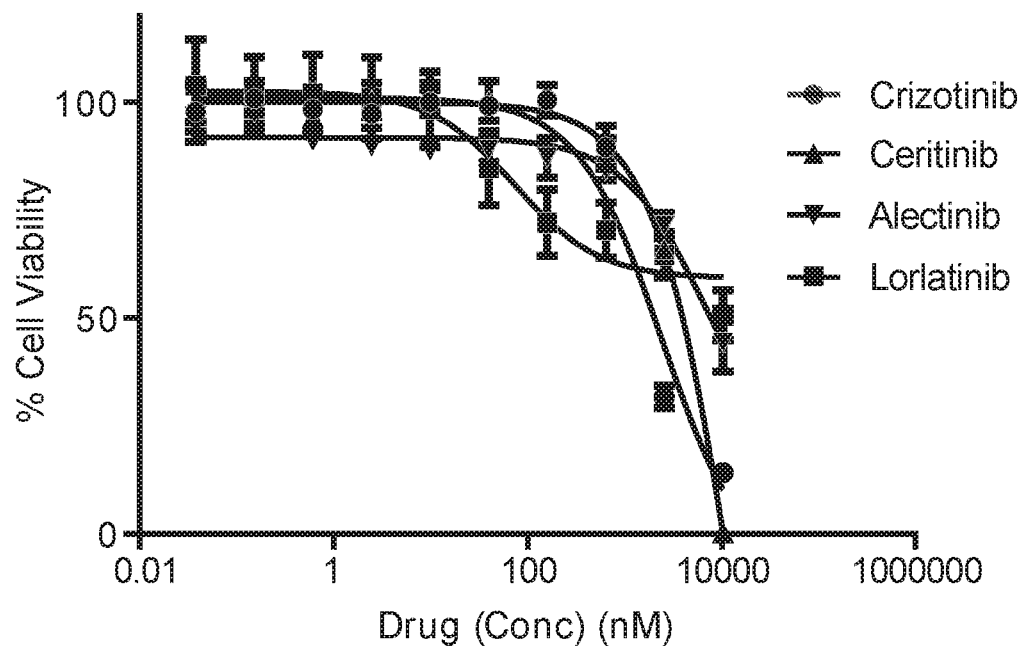

G1202R mutation known to be resistant to several ALK inhibitors, including crizotinib, ceritinib and alectinib but sensitive to lorlatinib. BaF3 cells engineered to express the G1202R mutant demonstrated high sensitivity to lorlatinib with an IC$_{50}$ of 80 nM and a complete inhibition (Zhou et. al., PF-06463922, an ALK/ROS1 Inhibitor, Overcomes Resistance to First and Second Generation ALK Inhibitors in Preclinical Models. Cancer Cell, 2015, 28, 70-81). The MGH979-6.7R8 (AlecR, G1202R) cells were resistant to crizotinib, ceritinib and alectinib as expected (FIG. 7C). Unlike the engineered BaF3 cells, however, they displayed incomplete inhibition by lorlatinib, suggesting that in addition to G1202R, ALK-independent resistance mechanisms may also be present in this cell line.

Figure 7D:
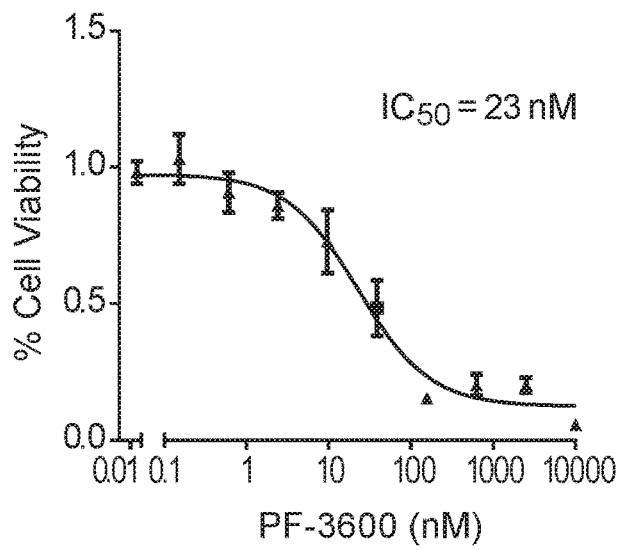
Figure 7E:
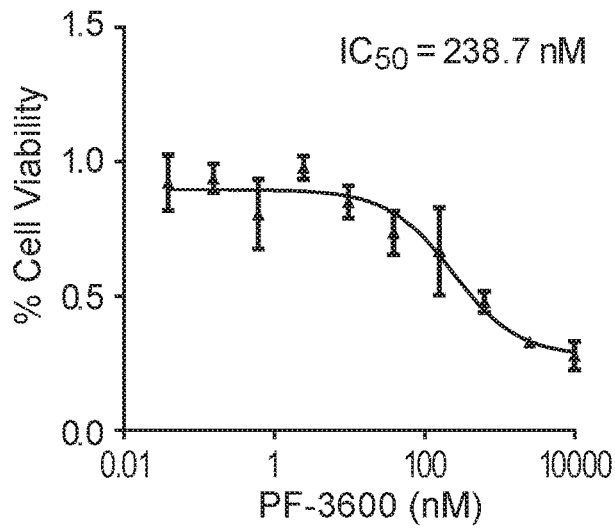
Figure 7F:
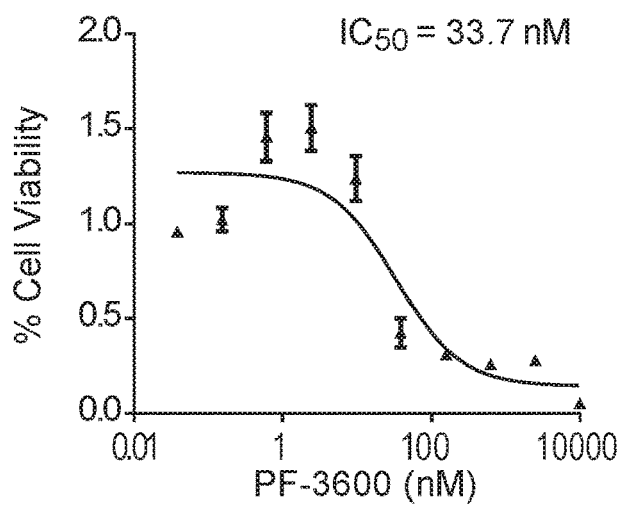

When tested against PF-06873600, the cells demonstrated sensitivity to PF-06873600 with IC$_{50}$ values ranging 23-239 nM (FIGS. 7D, 7E and 7F).

Conclusions

The patient-derived ALKi resistant cell lines displayed resistance to several ALK inhibitors but showed various degree of sensitivity to PF-06873600.

Example 6: Cell Growth Inhibition Study for Lorlatinib and PF-06873600, Alone and in Combination with PF-06873600, in MGH048-4F (Crizo/Alec/LorlaR) Cells Overview The growth inhibitory effect of lorlatinib in combination with PF-06873600 on MGH048-4F (Crizo/Alec/LorlaR) cells was assessed through real-time monitoring of cell growth.

Materials and Methods

Briefly, the MGH048-4F (Crizo/Alec/LorlaR) cells (10000 cell/well) were plated in a 12-well plate and treated with lorlatinib, PF-06873600, or combination at indicated concentrations. To increase the translatability of preclinical findings into the clinic, a proximate clinically achievable concentration for loraltinib (300 nM) and projected efficacious concentration for PF-06873600 (50-100 nM) were utilized in all studies. Cell density was monitored using IncuCyte Zoom.

Results

Figure 8:
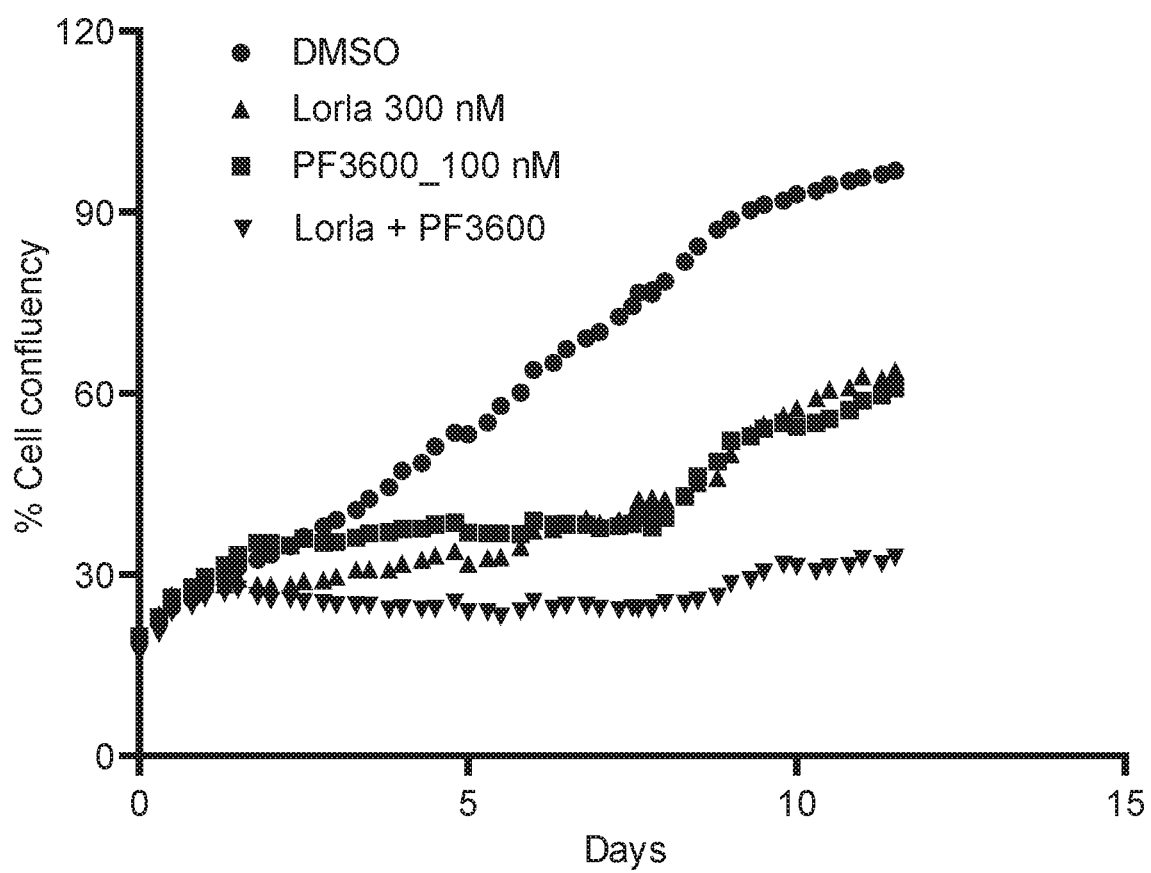
FIG. 8 shows cell growth inhibition in MGH048-4F (Crizo/Alec/LorlaR) cells by lorlatinib plus PF-06873600 vs. lorlatinib alone.

FIG. 8 shows real-time cell growth over the course of 12-day drug treatment. Single agent lorlatinib and PF-06873600 caused a moderate cell growth inhibition (47% and 44% respectively), whereas the combination led to a stronger inhibitory activity (~80%) (Table 4).

TABLE 4

| Treatment | % Cell growth inhibition |
| --- | --- |
| DMSO | 0% |
| Lorla_300 nM | 47% |
| PF3600_100 nM | 44% |
| Lorla + PF3600 | 80% |

Conclusions

A stronger cell growth inhibition was detected for lorlatinib plus PF-06873600 in MGH048-4F (Crizo/Alec/LorlaR) cells.

Example 7: Durability of Response Study for Lorlatinib and PF-06873600, Alone and in Combination with PF-06873600, in MGH902-1C (Crizo/CeriR) and MGH979-6.7R8 (AlecR, G1202R) Cells Overview The effect of lorlatinib, PF-06873600, and combinations on cell growth inhibition and durability of response were tested in MGH902-1C (Crizo/CeriR) and MGH979-6.7R8 (AlecR, G1202R) cells.

Materials and Methods

DOR studies were conducted as previously described.

Results

Figure 9A:
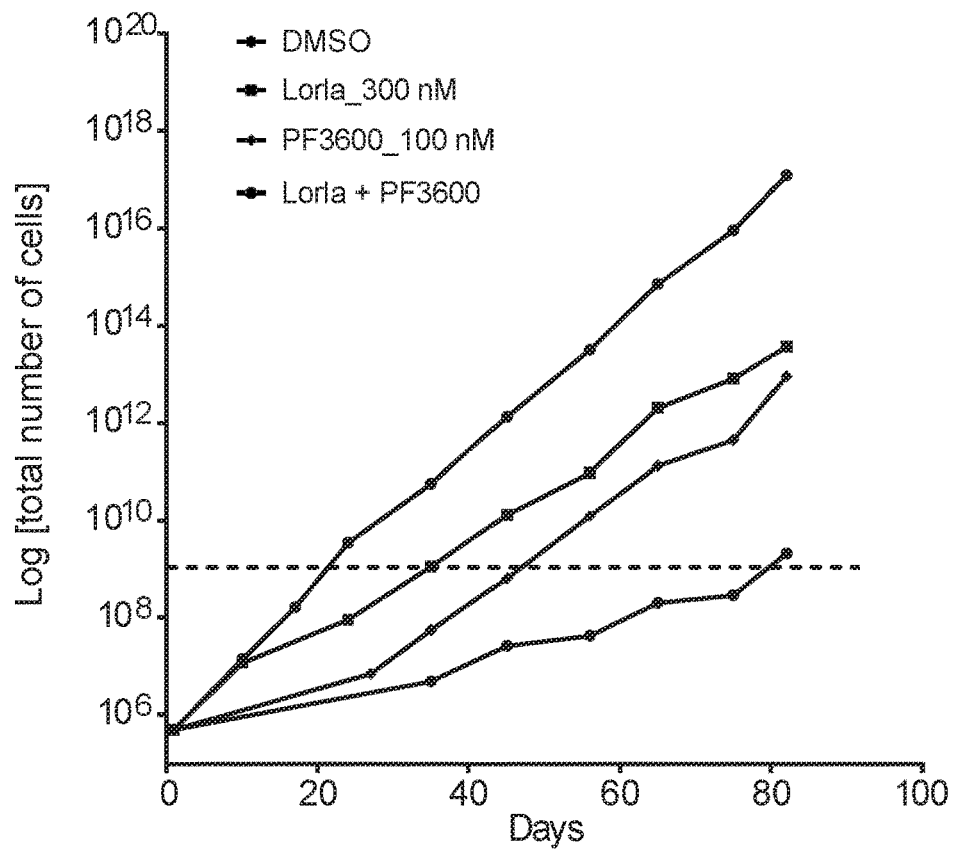
FIGS. 9A and 9B show durability of response in MGH902-1C (Crizo/CeriR) cells by lorlatinib plus PF-06873600 vs. lorlatinib alone.
Figure 9B:
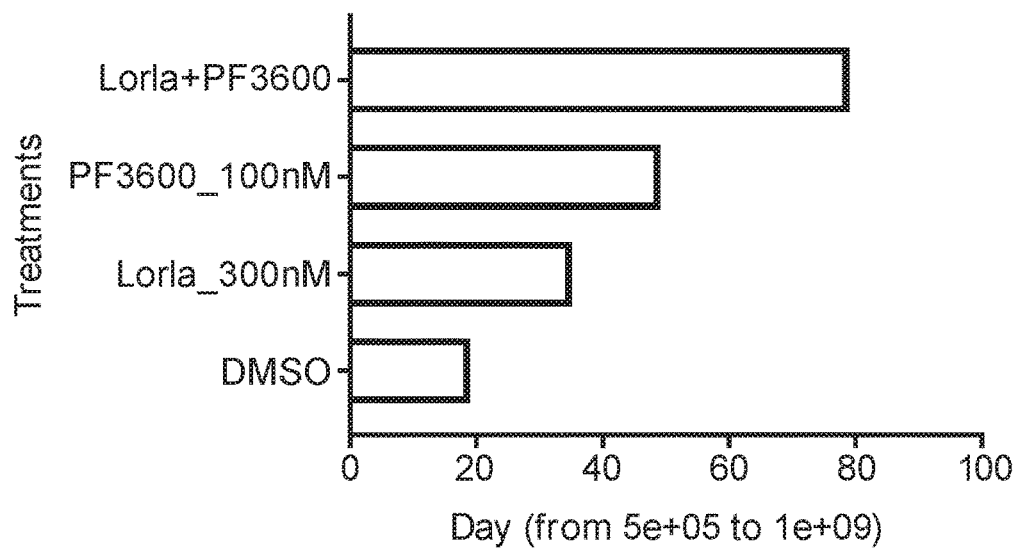
Figure 10A:
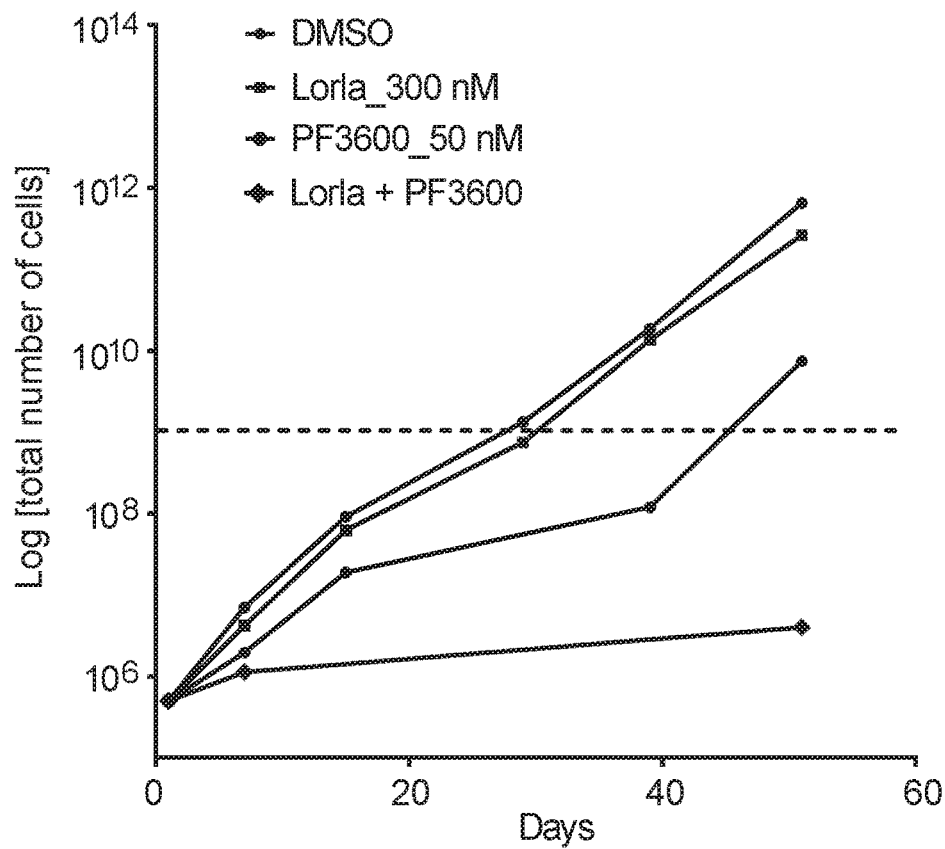
FIGS. 10A and 10B show durability of response in in MGH979-6.7R8 (AlecR, G1202R) cells by lorlatinib plus PF-06873600 vs. lorlatinib alone.
Figure 10B:
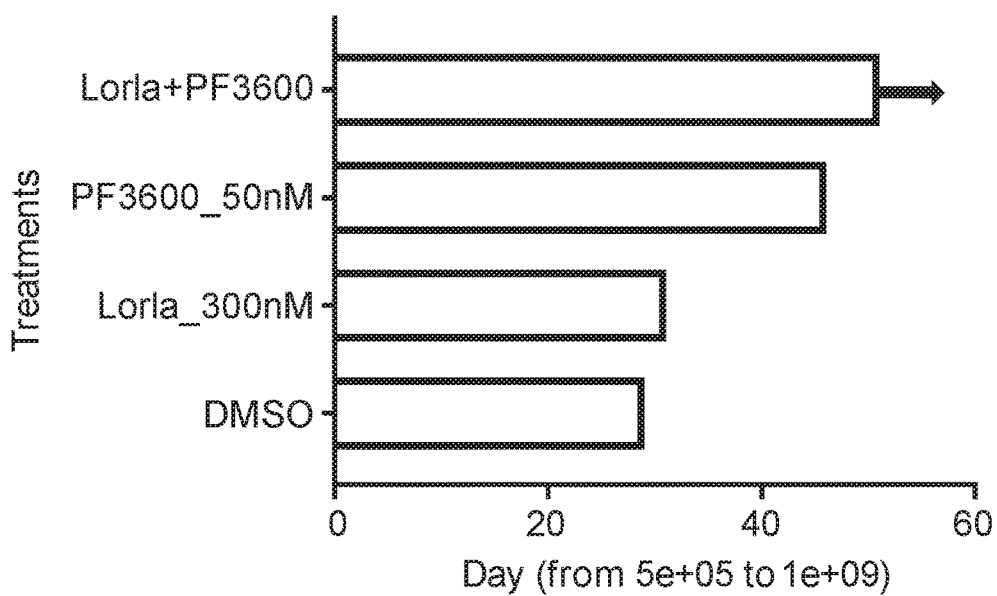

The DOR results are shown in FIG. 9 and FIG. 10. The time required to reach a specific total cell number was least with DMSO treated cells, which served as the control for this study and represented the non-drug-impeded growth rate. In MGH902-1C (Crizo/CeriR) Cells, single agent lorlatinib (300 nM) or PF-06873600 (100 nM) treatment showed a modest delay in cell growth compared to the control, requiring more time to reach the same number of cells as compared to the control. The combination of lorlatinib and PF-06873600 showed a much longer delay, suggesting further impedance of time to resistance with the combination (FIG. 9). In MGH979-6.7R8 (AlecR, G1202R) cells, lorlatinib (300 nM) demonstrated no activity while PF-06873600 (50 nM) elicited partial inhibition. In contrast, the combination treatment greatly delayed the cell growth and the cells did not reach the designated number within the study period (FIG. 10).

Table 5 shows the results that determined the number of days required for cells to grow from $5 \times 10^5$ to a designated number ($1 \times 10^9$) under different treatment conditions.

TABLE 5

| | Time elapsed (day) | |
| --- | --- | --- |
| Treatment | MGH902-1C (Crizo/CeriR) | MGH979-6.7R8 (AlecR, G1202R) |
| DMSO | 19 | 29 |
| Lorla (300 nM) | 35 | 31 |
| PF-06873600 (50 or 100 nM) | 49 | 46 |
| Lorla + PF-06873600 | 79 | >52 |

Conclusions

The combination of lorlatinib and PF-06873600 significantly increased the cell growth inhibition and durability of response as compared to single agent treatment in these two patient-derived ALK inhibitor-resistant NSCLC cell lines.

Example 8: Anti-Tumor Efficacy Study for Lorlatinib and PF-06873600, Alone and in Combination with PF-06873600, in MGH902-1C (Crizo/CeriR) and MGH979-6.7R8 (AlecR, G1202R) Xenograft Models Overview The in vivo anti-tumor efficacy of lorlatinib plus PF-06873600 combination compared to each single agent was assessed in the MGH902-1C (Crizo/CeriR) and MGH979-6.7R8 (AlecR, G1202R) xenograft models.

Materials and Methods

NSG mice (6-8-week, The Jackson Laboratory) were used for the in vivo study. All procedures were conducted in accordance with the Institute for Laboratory Animal Research Guide for the Care and Use of Laboratory Animals.

Tumor cells were supplemented with 50% Matrigel (BD Biosciences) to facilitate tumor take and growth as xenografts. Cells (~$5 \times 10^6$ in 200 µL) were implanted subcutaneously (s.c.) into the hind flank region of the mouse and allowed to grow to the designated size prior to the administration of test agent for each experiment. When tumor volumes reached 150-200 mm$^3$, mice were randomized into study groups with 10 mice per group. Animals were treated with vehicle, lorlatinib (3 mpk, PO, BID), PF-06873600 (30 mpk, PO, BID) or the combination. Each drug was administered at a dose or regimen to yield exposure equivalent to that in humans (lorlatinib) or projected to be efficacious (PF-06873600). Tumor growth was monitored twice weekly by caliper measurement, and percentage of tumor growth inhibition (% TGI) was calculated as $100*[1-(\text{Treated}_{Day\ Last}-\text{Treated}_{Day\ First})/(\text{Control}_{Day\ Last}-\text{Control}_{Day\ First})]$.

Results

Figure 11A:
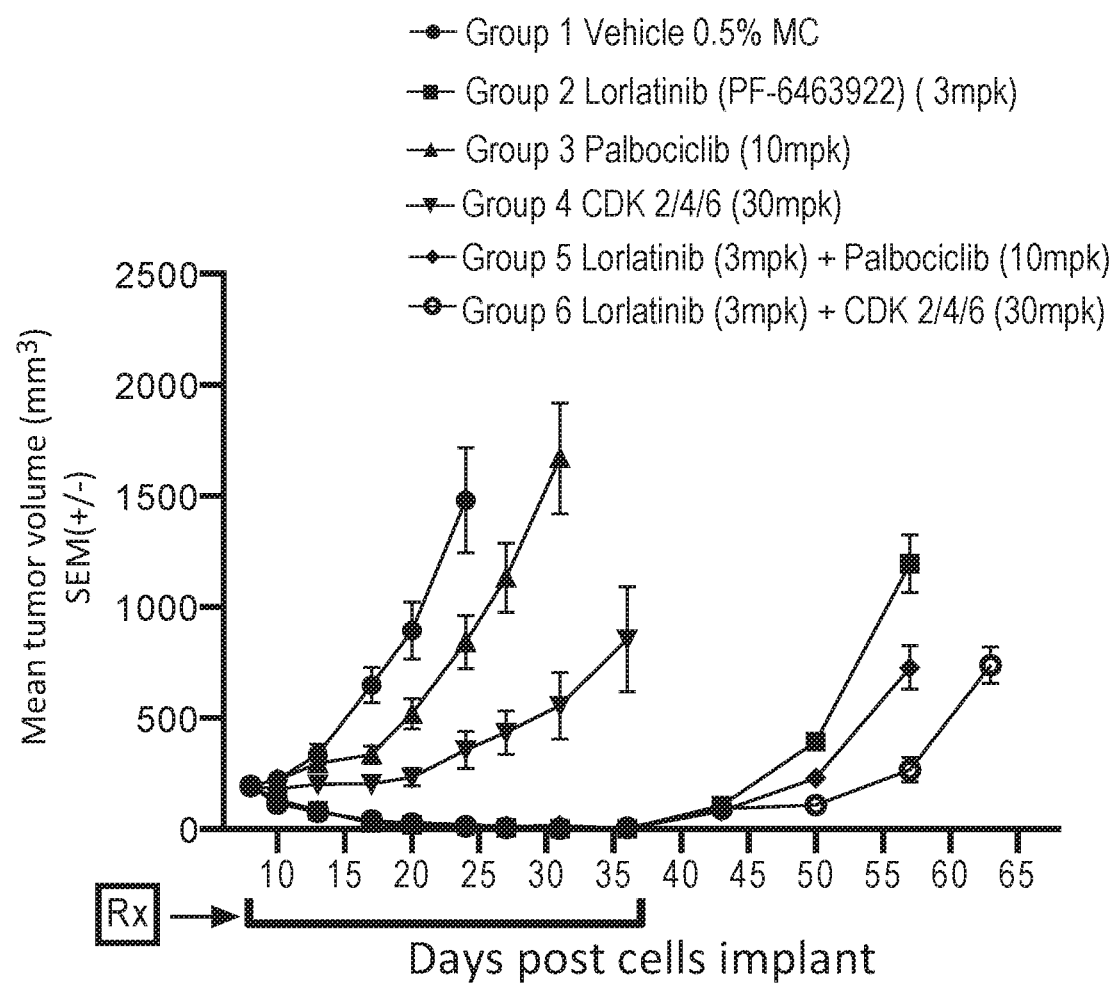

Tumor regression was observed with lorlatinib alone, which precluded the detection of combinatorial tumor growth inhibition due to small tumor volumes under drug. Combined effects in these models were then assessed by tumor re-growth delay (TRGD) upon termination of drug treatment. TRGD measured tumor re-growth post-dosing which rate was determined by the number or proliferative capacity of residual tumor cells at the time of treatment termination, reflecting an upfront treatment effect. A significant TRGD was seen for PF-06873600 plus lorlatinib in both models (FIG. 11)

Conclusions

The combination of lorlatinib and PF-06873600 showed enhanced anti-tumor efficacy (reflected by TRGD) in patient-derived tumor models representing the ALKi-resistant patient populations with or without a secondary ALK kinase domain mutation.

What is claimed is:

1. A method of treating lung cancer in a subject comprising administering to the subject an amount of an anaplastic lymphoma kinase (ALK) inhibitor and an amount a cyclin dependent kinase (CDK) inhibitor, wherein the CDK inhibitor is an inhibitor of CDK4 and CDK6 (CDK4/6 inhibitor) which is palbociclib, or an inhibitor of CDK2, CDK4 and CDK6 (CDK2/4/6 inhibitor) which is 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7 (8H)-one, and wherein the amounts together are effective in treating cancer, wherein the ALK inhibitor is lorlatinib, or a pharmaceutically acceptable salt thereof.

2. The method of claim 1, wherein the ALK inhibitor and the CDK inhibitor are administered sequentially, simultaneously, or concurrently.

3. A method of treating lung cancer in a subject comprising administering to the subject an amount of lorlatinib, or a pharmaceutically acceptable salt thereof, and an amount of palbociclib, or a pharmaceutically acceptable salt thereof, wherein the amounts together are effective in treating cancer.

4. A method of treating lung cancer in a subject comprising administering to the subject an amount of lorlatinib, or a pharmaceutically acceptable salt thereof, and an amount of 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7 (8H)-one, or a pharmaceutically acceptable salt thereof, wherein the amounts together are effective in treating cancer.

5. A combination comprising, separately or together, an ALK inhibitor and a CDK inhibitor, wherein the ALK inhibitor is lorlatinib, or a pharmaceutically acceptable salt thereof, and wherein the CDK inhibitor is a CDK4/6 inhibitor which is palbociclib, or a CDK2/4/6 inhibitor which is 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7 (8H)-one.

6. The combination of claim 5, for use in the treatment of lung cancer in a subject.

7. The combination of claim 5, wherein the combination is a synergistic combination.

8. A pharmaceutical composition comprising lorlatinib, or a pharmaceutically acceptable salt thereof, palbociclib, or a pharmaceutically acceptable salt thereof, and at least one pharmaceutically acceptable excipient.

9. A pharmaceutical composition comprising lorlatinib, or a pharmaceutically acceptable salt thereof, 6-(difluoromethyl)-8-((1R,2R)-2-hydroxy-2-methylcyclopentyl)-2-(1-(methylsulfonyl)piperidin-4-ylamino)pyrido[2,3-d]pyrimidin-7 (8H)-one, or a pharmaceutically acceptable salt thereof, and at least one pharmaceutically acceptable excipient.

* * * * *